United States Patent [19]

Iwashita et al.

[11] Patent Number: 5,708,594
[45] Date of Patent: Jan. 13, 1998

[54] AUTOMATIC INSTRUCTION STRING GENERATION METHOD AND DEVICE FOR VERIFYING PROCESSOR OPERATION MODEL AND LOGIC

[75] Inventors: Hiroaki Iwashita; Satoshi Kowatari; Tsuneo Nakata; Fumiyasu Hirose, all of Kawasaki, Japan

[73] Assignee: Fujitsu Limited, Kawasaki, Japan

[21] Appl. No.: 433,735

[22] Filed: May 3, 1995

[30] Foreign Application Priority Data

May 30, 1994 [JP] Japan ................................. 6-116705
Mar. 20, 1995 [JP] Japan ................................. 7-060487

[51] Int. Cl.$^6$ .................................................. G06F 12/00
[52] U.S. Cl. ........................ 364/578; 395/500; 364/231.8
[58] Field of Search ............................. 395/500, 183.01, 395/183.11, 183.12, 183.14, 185.01, 185.04; 364/231–238, 267.7, 578

[56] References Cited

PUBLICATIONS

"Behavioral Design and Test Assistance for Pipelined Processors" Jan. 1992, Iwashita, IEEE, pp. 8–13.

"Functional Test Generation for Pipelined Computer Implementations". David C. Lee and Daniel P. Siewiorek, 1991 IEEE, pp. 60–67.

Primary Examiner—Kevin J. Teska
Assistant Examiner—A. S. Roberts
Attorney, Agent, or Firm—Staas & Halsey

[57] ABSTRACT

First, an initial operation model $M_0$ of a pipeline is configured according to the pipeline configuration of a processor and the specification information about an instruction executed by the processor. Then, the number of the states of the initial operation model $M_0$ is minimized to configure an operation model M. Based on the operation model M and a test state set H, listed are test instruction strings for the process in which the state of the operation model M indicates a transition from a predetermined input state to any of the test states contained in the test state set H without an occurrence of a conflict in the operation model M. A next time state, reached after the state of the operation model M has reached the test state of the test instruction string, is calculated and the next time state is input as a new input state to a test instruction string listing unit.

18 Claims, 42 Drawing Sheets

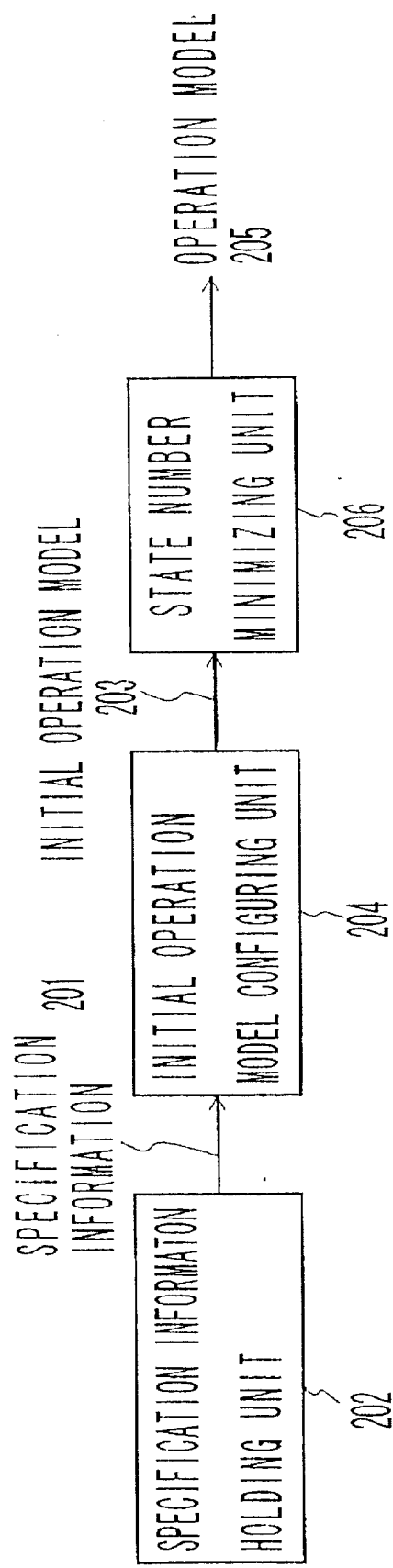
F I G. 2

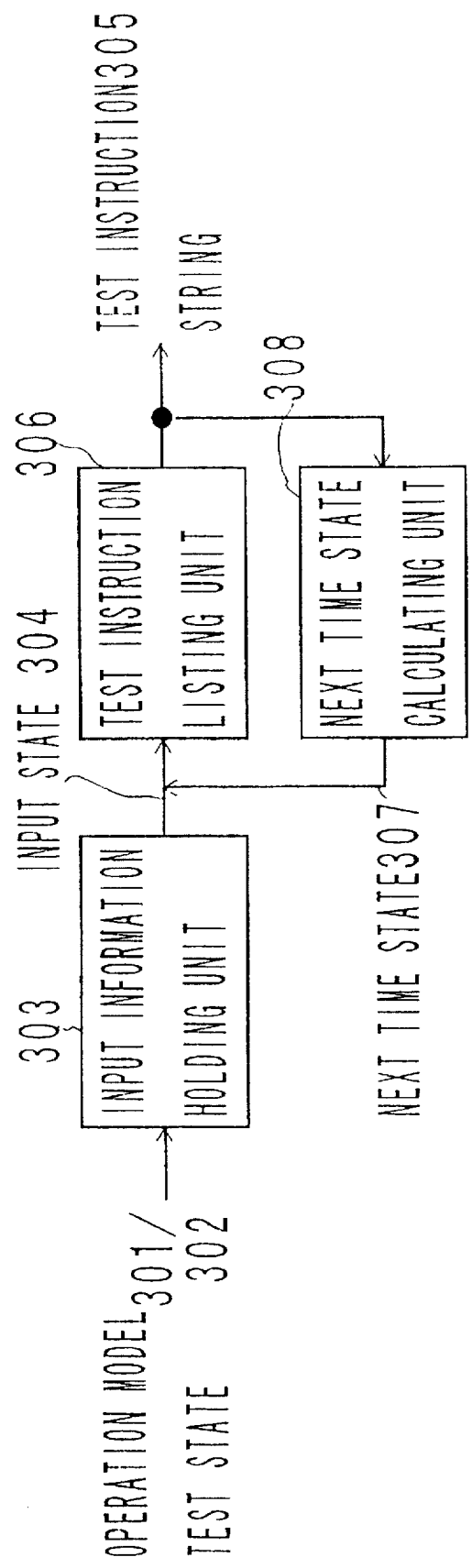
F I G. 3

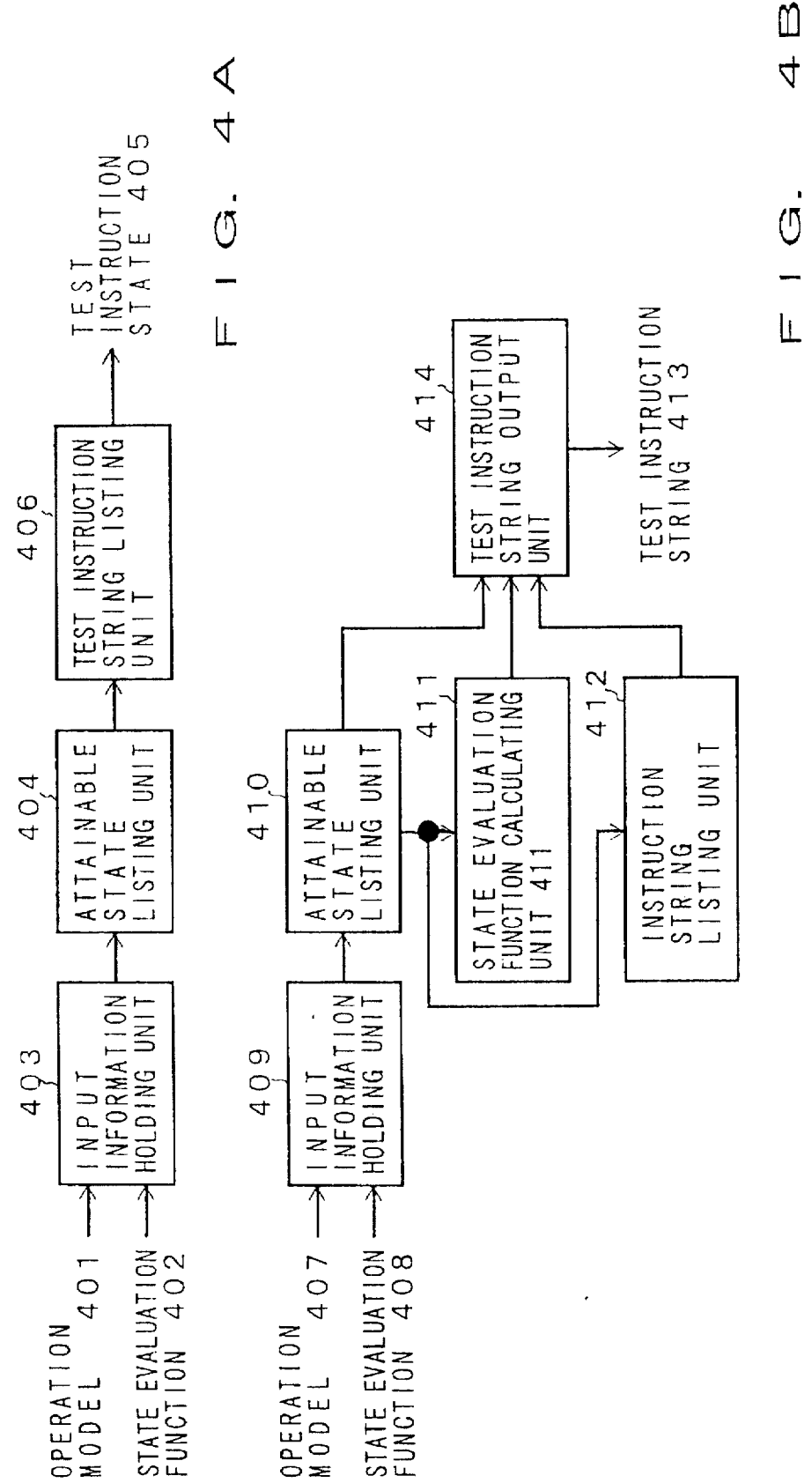

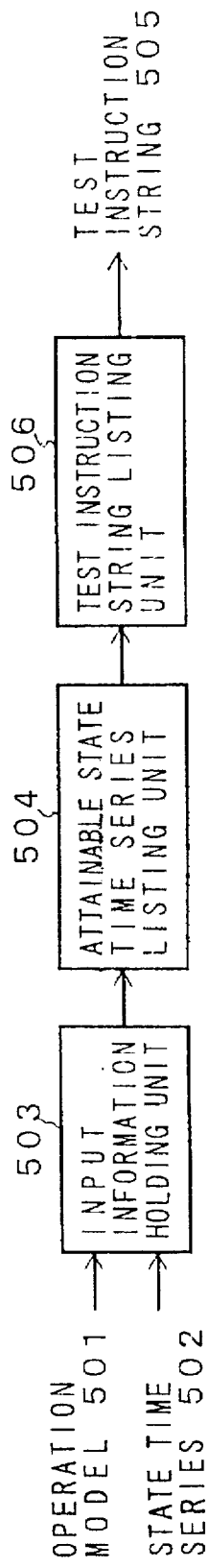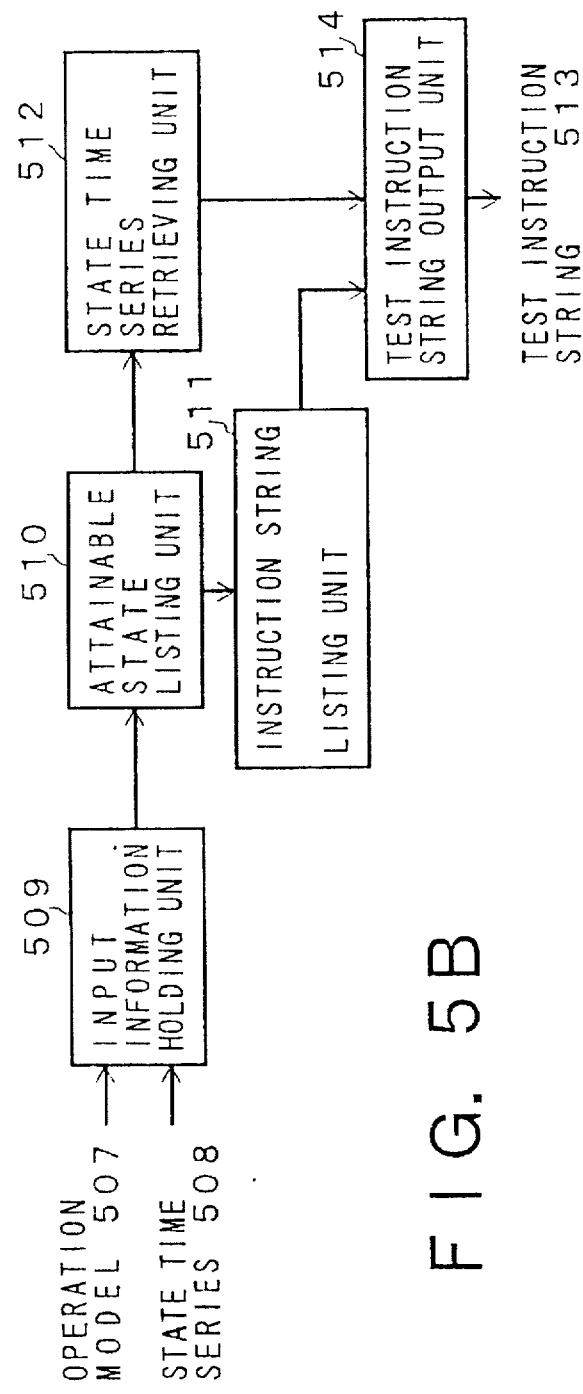
FIG. 5A
FIG. 5B

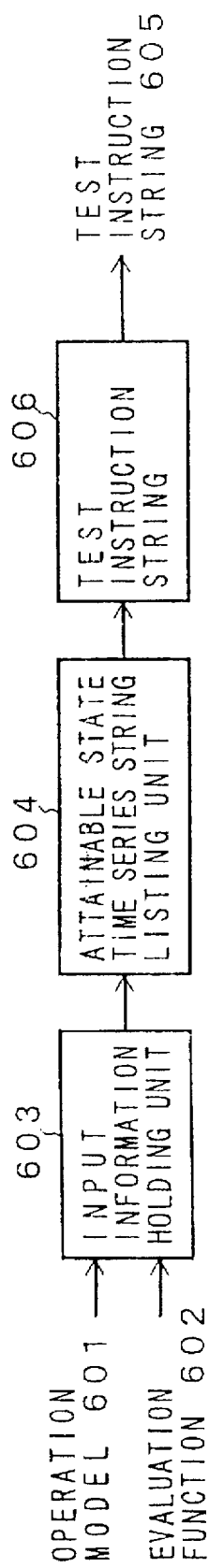
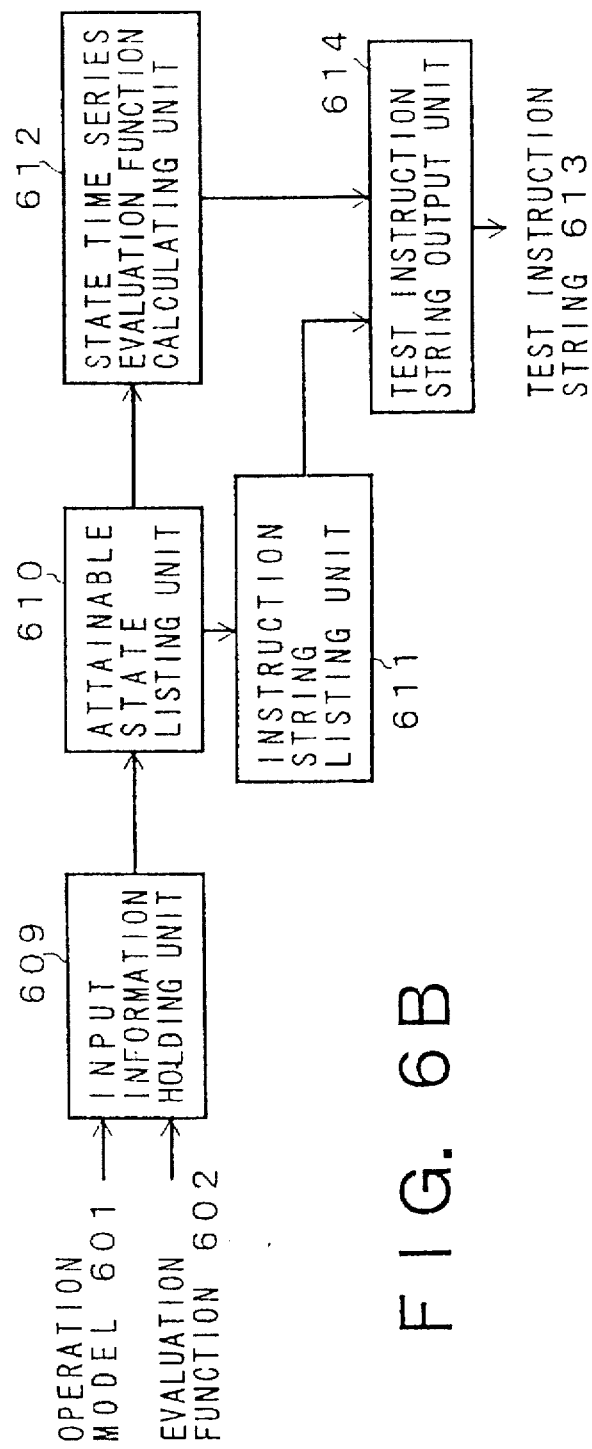
FIG. 6A
FIG. 6B

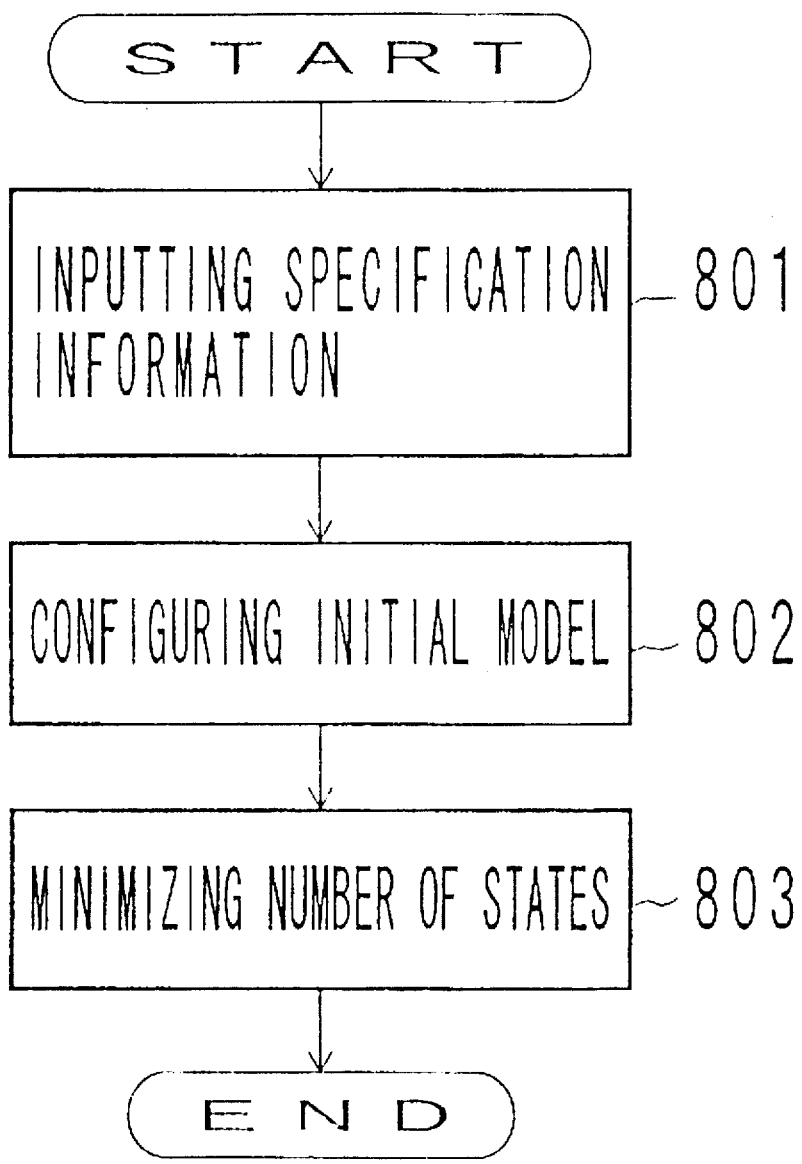
F I G. 8

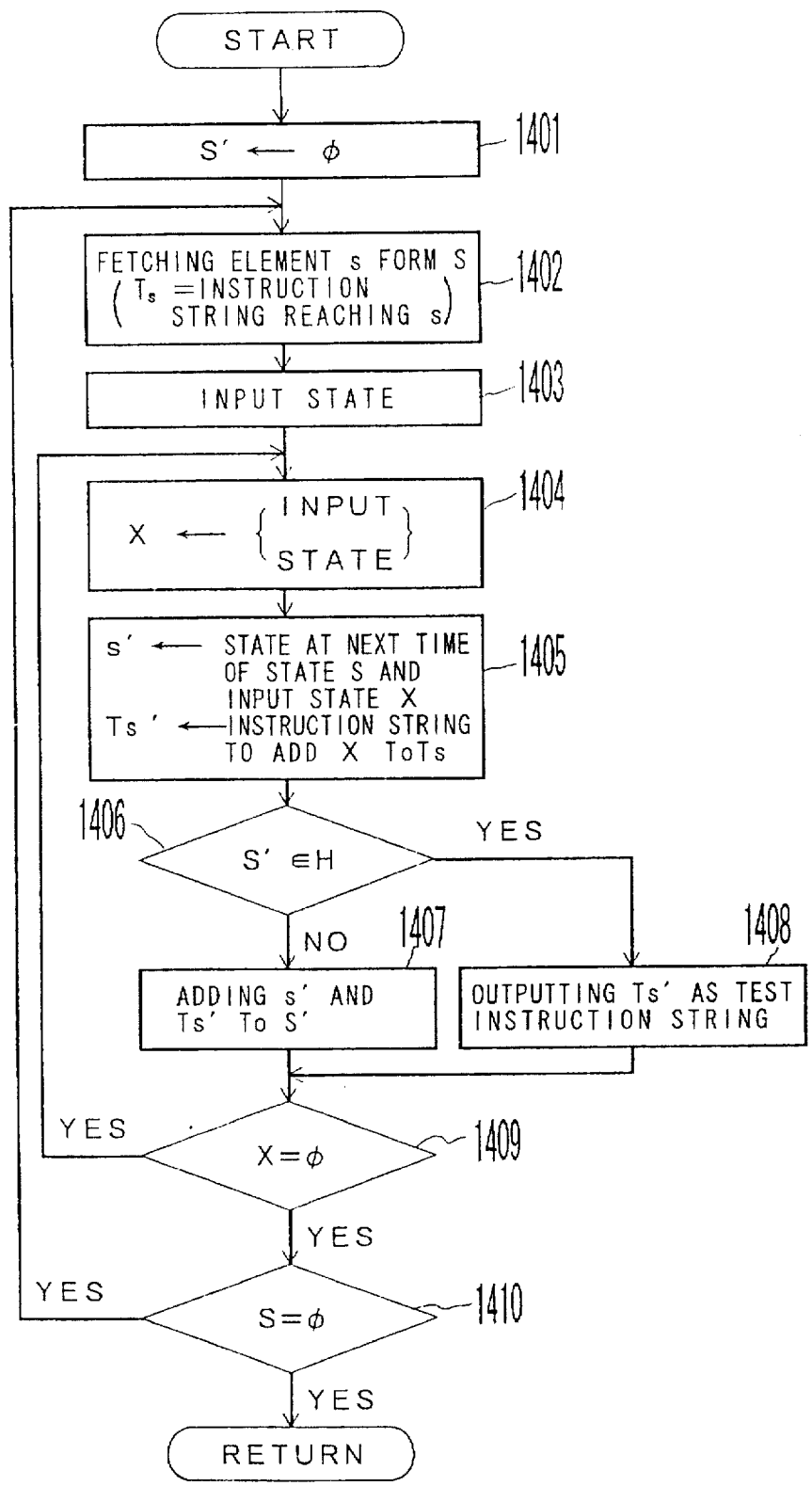
F I G. 14

| |
|---|
| LIST OF STATE VARIABLE CONNECTED TO PRECEDING STAGE |
| LIST OF STATE VARIABLE CONNECTED TO SUBSEQUENT STAGE |
| INPUT SET |
| STATE SET |
| TRANSITION FUNCTION |
| OPERATION TABLE |

FIG. 16

|        | OPERATION 1 | OPERATION 2 | OPERATION 3 | ... |
|--------|:-----------:|:-----------:|:-----------:|:---:|
| STATE 1 | √ | √ |   |   |
| STATE 2 | √ | √ |   |   |
| STATE 3 | √ |   | √ |   |
| ...    |   |   |   |   |

F I G. 1 7

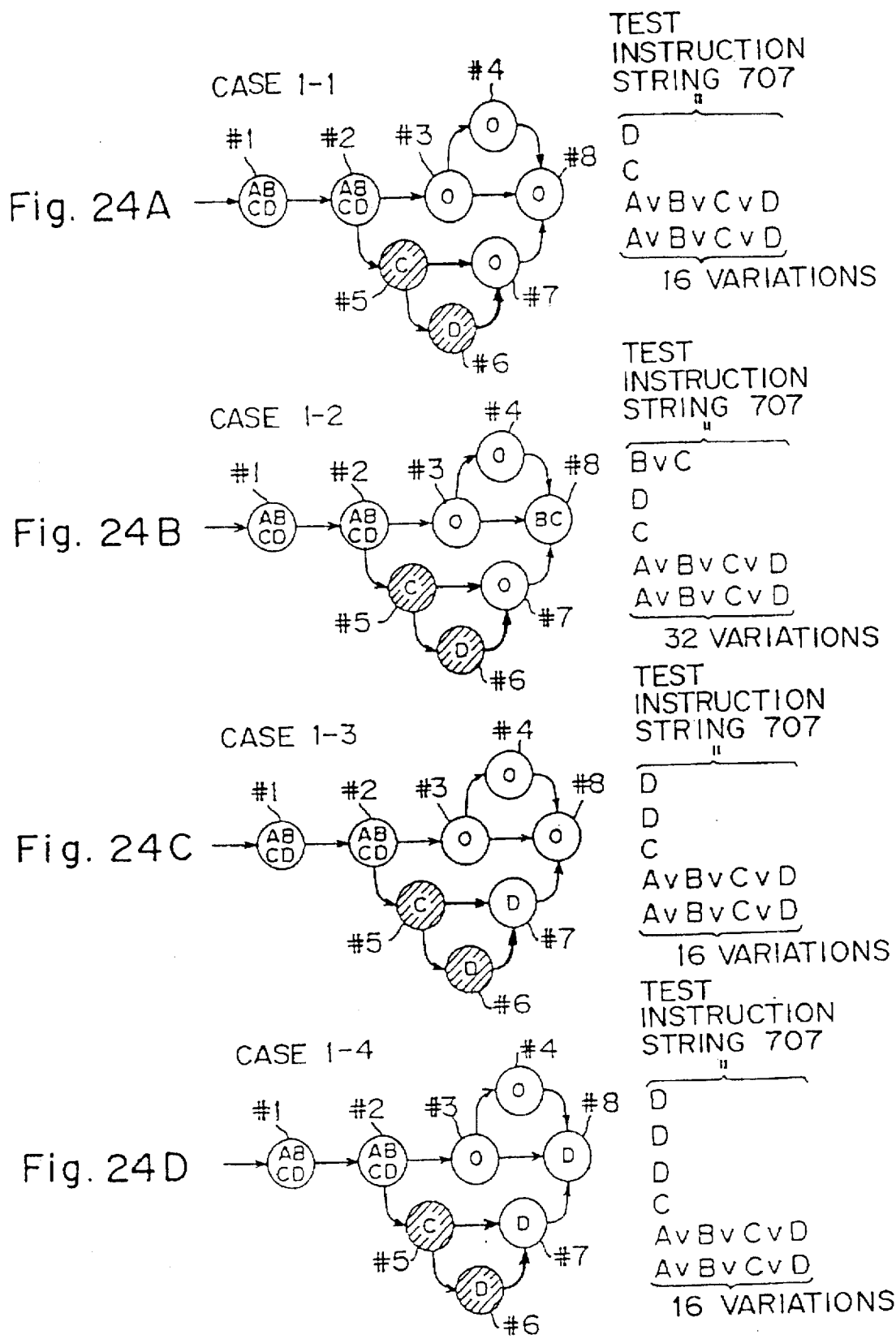

CASE 1

| STATE VARIABLE | STATE |
|---|---|
| #1 | |
| #2 | |
| #3 | |
| #4 | |
| #5 | C |
| #6 | D |
| #7 | |
| #8 | |

FIG. 29

| STATE VARIABLE | STATE |
|---|---|
| #1 | 0 |
| #2 | 0 |
| #3 | 0 |
| #4 | 0 |
| #5 | 0 |
| #6 | 0 |
| #7 | 0 |
| #8 | 0 |

| STATE VARIABLE | STATE |
|---|---|
| #1 | A |
| #2 | 0 |
| #3 | 0 |
| #4 | 0 |
| #5 | 0 |
| #6 | 0 |
| #7 | 0 |
| #8 | 0 |

| STATE VARIABLE | STATE |
|---|---|
| #1 | B |
| #2 | 0 |
| #3 | 0 |
| #4 | 0 |
| #5 | 0 |
| #6 | 0 |
| #7 | 0 |
| #8 | 0 |

| STATE VARIABLE | STATE |
|---|---|
| #1 | A |
| #2 | A |
| #3 | 0 |
| #4 | 0 |
| #5 | 0 |
| #6 | 0 |
| #7 | 0 |
| #8 | 0 |

| STATE VARIABLE | STATE |
|---|---|
| #1 | B |
| #2 | A |
| #3 | 0 |
| #4 | 0 |
| #5 | 0 |
| #6 | 0 |
| #7 | 0 |
| #8 | 0 |

| STATE VARIABLE | STATE |
|---|---|
| #1 | A |
| #2 | B |
| #3 | 0 |
| #4 | 0 |
| #5 | 0 |
| #6 | 0 |
| #7 | 0 |
| #8 | 0 |

| STATE VARIABLE | STATE |
|---|---|
| #1 | B |
| #2 | B |
| #3 | 0 |
| #4 | 0 |
| #5 | 0 |
| #6 | 0 |
| #7 | 0 |
| #8 | 0 |

$T_s' = \{B, B\}$

| STATE VARIABLE | STATE |
|---|---|
| #1 | A |
| #2 | A |
| #3 | 0 |
| #4 | 0 |
| #5 | C |
| #6 | D |
| #7 | 0 |
| #8 | 0 |

$S'$ :

$T_s' = \{D, C, A, A\}$

F I G. 34

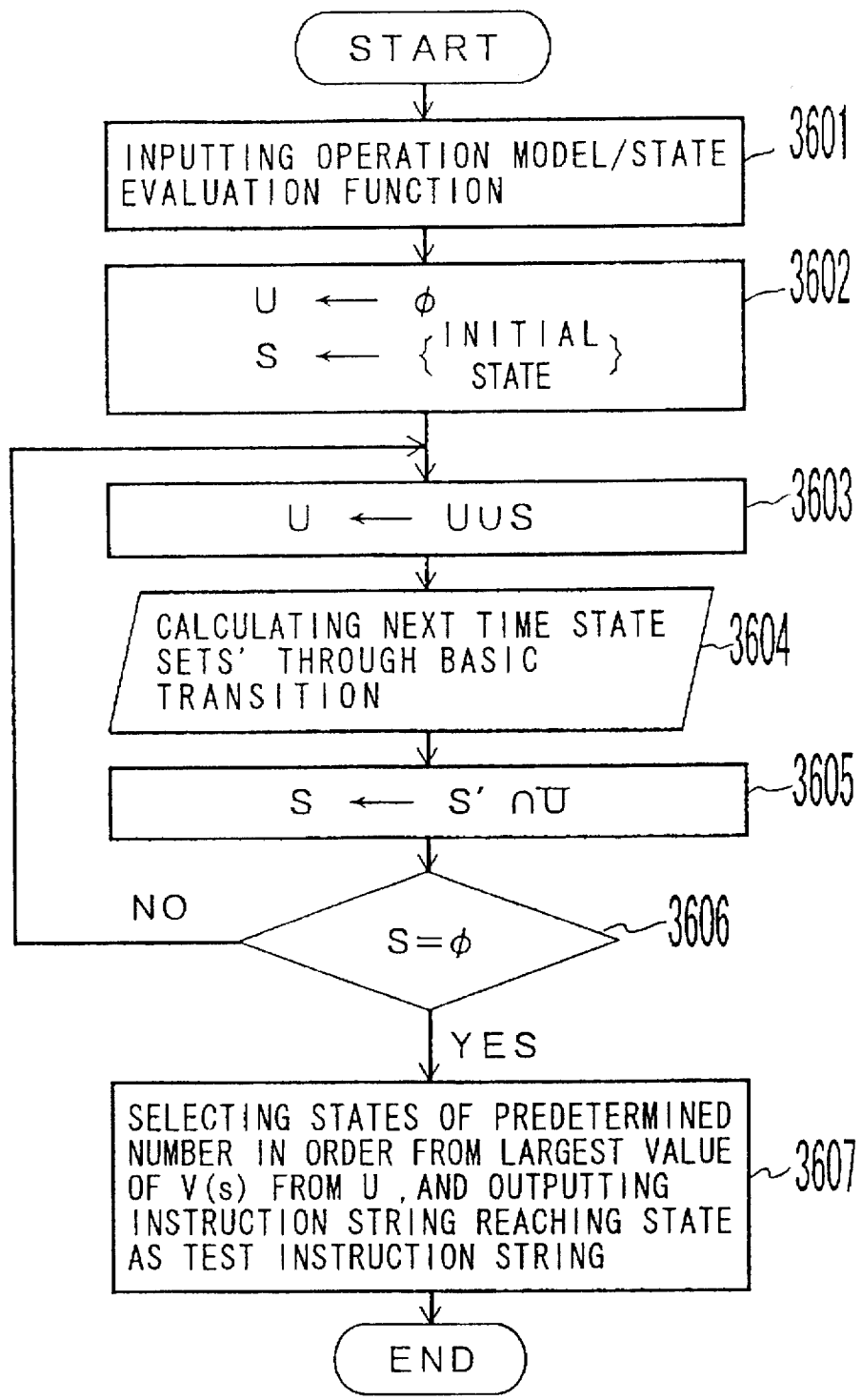
F I G. 36

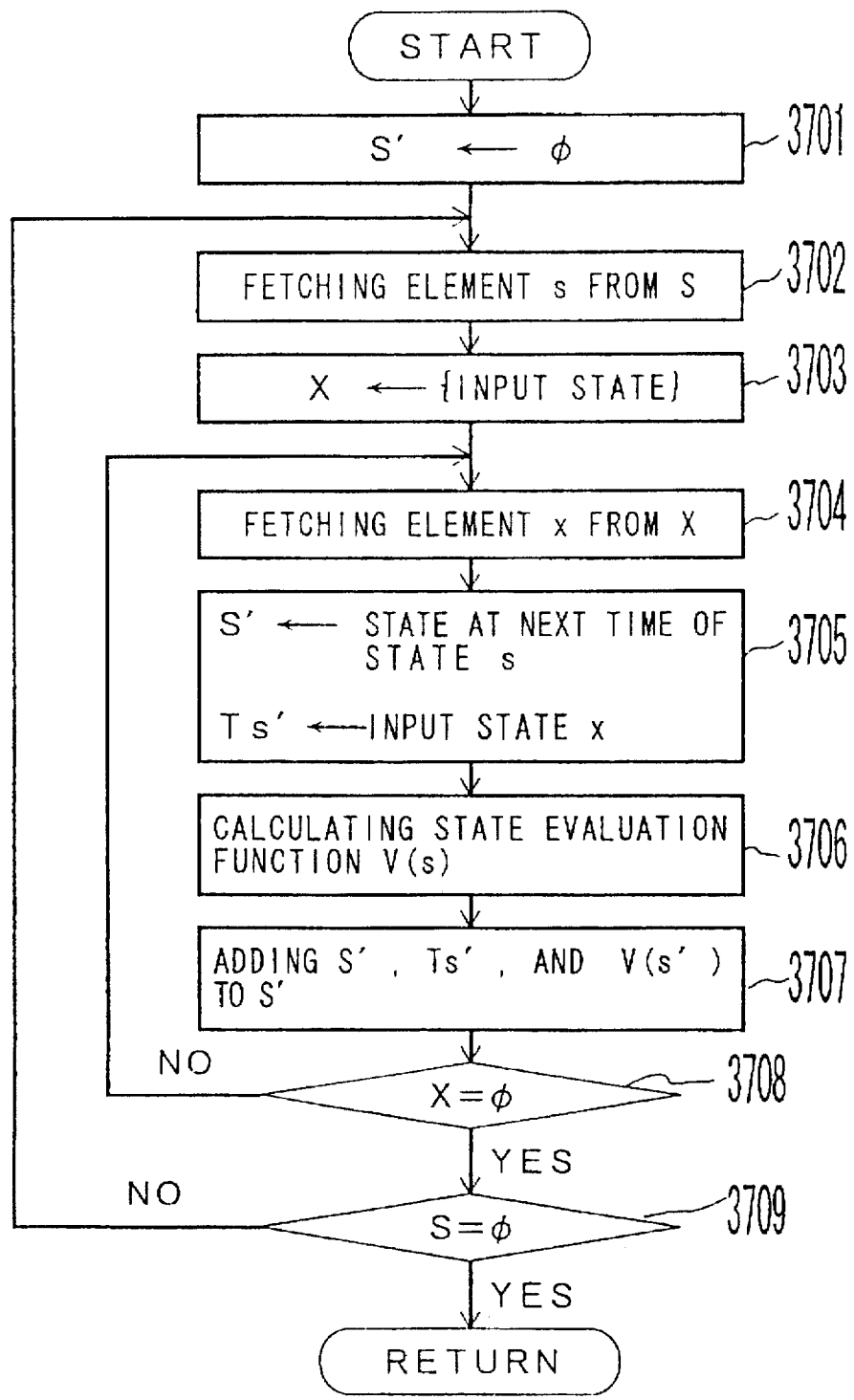
F I G. 37

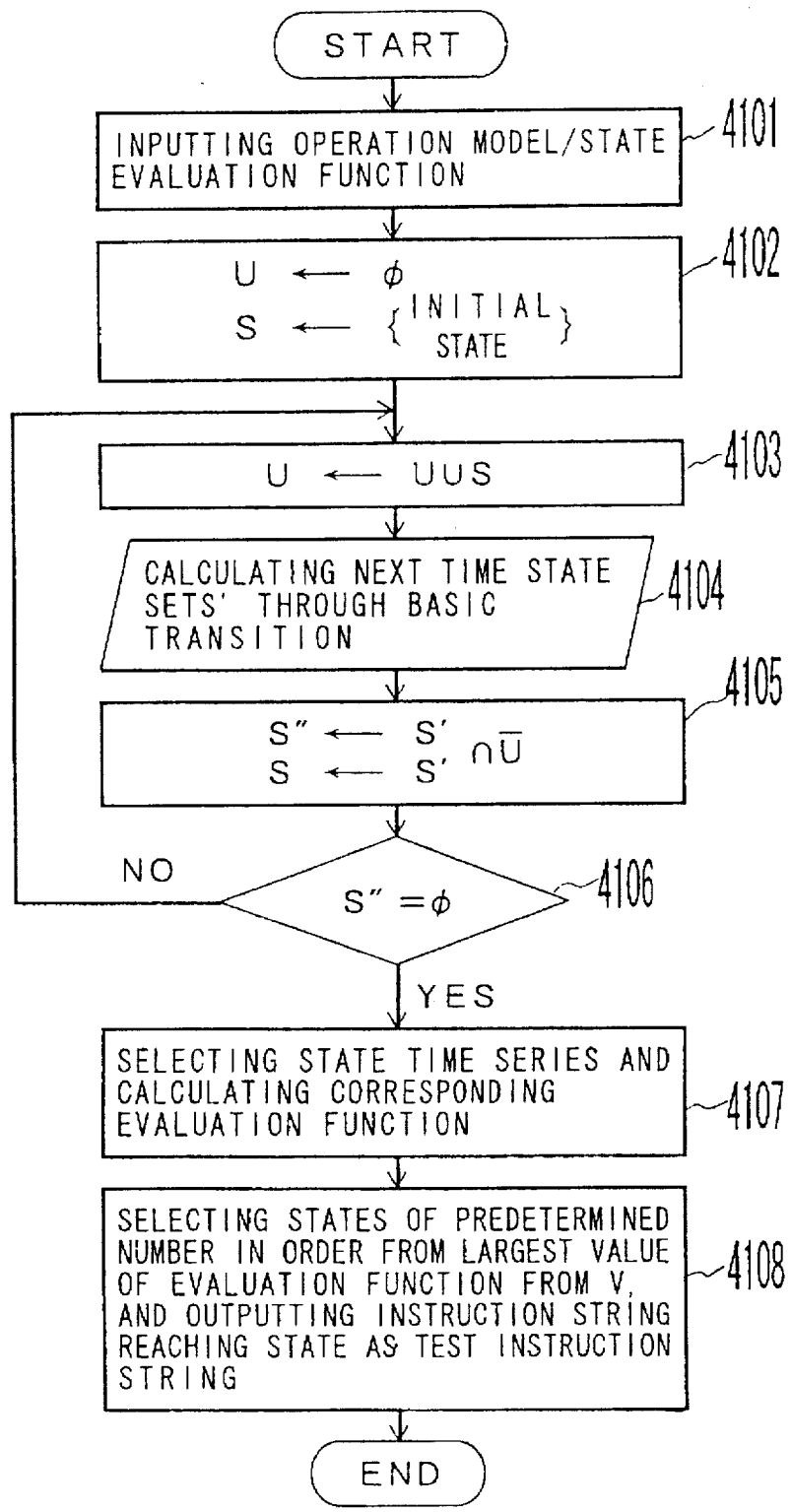
F I G. 41

AUTOMATIC INSTRUCTION STRING GENERATION METHOD AND DEVICE FOR VERIFYING PROCESSOR OPERATION MODEL AND LOGIC

BACKGROUND OF THE INVENTION

1. Field of the Invention

The present invention relates to a technology of automatically generating instruction strings for use in verifying the operation logic of a processor capable of performing a pipeline process.

2. Description of the Related Art

It is indispensable to generate test instruction strings (test program) applied to a processor to simulate a logic and verify whether or not the function or structure of the processor is designed exactly according to the specification, and to conduct a test as to whether or not the designed processor operates exactly according to the specification. A high quality test program is required to verify data with high reliability within a short time.

A pipeline process of instructions should be performed when a processor functions as high-speed processor. When a pipeline process is performed, the following conflict (pipeline hazard) may arise among a plurality of instructions to be processed simultaneously.

A request can be made for a total of N+1 or more hardware resources when the number of hardware resources having specific functions is N.

A normal execution result cannot be obtained by the rearrangement of the sequence of reading from and writing to a register or a memory between two instructions.

To solve such pipeline hazards, a mechanism is required in the processor to control the interlock of a pipeline and the rearrangement of the execution sequence of instructions.

A logic simulation is performed to verify whether or not the designed specification is correctly realized for the function or structure of the processor having such a mechanism. Furthermore, an operation test is conducted to verify the operation of a designed processor, and the verification requires the generation of test instruction strings (test program) to be applied to the processor.

Normally, a processor consists of an operation unit for performing an actual data process (ALU, register file, etc.) and a control unit for controlling the operation unit. The control unit specifically has complicated functions. Therefore, generating a test program for efficiently verifying the functions is very important but very hard.

A conventional test program is generated by combining the following methods.

Method 1: manually generating a test instruction string

Method 2: generating through a computer a number of test instruction strings at random Method 3: generating a test instruction string using an existing program A method of automatically generating a test instruction string for verifying the control mechanism of a processor from the descriptions of the specification of the processor has already been filed as two patent applications by the Applicant of the present invention, that is, Tokuganhei 4-145812 and Tokuganhei 5-217813. This method is also is also described in "Behavioral Design and Test Assistance for Pipelined Processor", IEEE 1992, pp. 8–13. However, these applications are not based on a strict operation model of the present invention.

Since the conventional technology according to the above listed method 1 requires manual work and therefore a long development period. Additionally, a manually generated test instruction string is hard to evaluate its quality and cannot objectively guarantee the user its efficiency.

Furthermore, the conventional technology according to the above listed method 2 or 3 can improve the reliability in verification by increasing the number instructions. However, a considerably long execution time is required to properly perform a logic simulation and conduct an operation test.

Additionally, the methods filed as patent applications as described above are limited to the systems of generating a test instruction string for verifying the control under which an antecedent pipeline stage is stopped when a pipeline hazard occurs. Therefore, these methods indicates the problem that they cannot sufficiently control complicated pipeline stages.

SUMMARY OF THE INVENTION

The present invention has been developed based on the above described background, and aims at automatically generating within a short time a high-quality test instruction string for verifying the operation logic of a processor in order to shorten the time required to simulate the logic of any of a number of processors and to conduct an operation test, and in order to improve the reliability of the verification.

According to the first through third aspects of the present invention, only entering basic information about a pipeline automatically generates an operation model of a processor or a test instruction string (test program). As a result, the developer of the test program can strikingly reduce the number of steps for the initial design and design alteration, thereby greatly shortening the development cycle of the processor.

Particularly, the operation model according to the second aspect of the present invention not only realizes the automatic generation of an efficient test instruction string, but also restructures an optimized pipeline depending on the generated operation model. As a result, the present invention can be used as a technology of initially designing hardware.

The third aspect of the present invention greatly improves the efficiency in extracting a test instruction string.

According to the fourth aspect of the present invention, a qualitatively represented test item e.g. a trap control can be efficiently defined using a state evaluation function with which a state can be evaluated and a corresponding test instruction string can be automatically and efficiently generated.

According to the fifth aspect of the present invention, a time-series of data in which the completion order of instructions is rearranged in a predetermined period can be specified as a time-series of states, and a test instruction string which generates a specific state for a predetermined period can be generated automatically and efficiently.

According to the sixth aspect of the present invention, a test item whose state in a specific period is qualitatively represented can be efficiently defined using an evaluation function with which a time-series of states can be evaluated and a corresponding test instruction string can be automatically and efficiently generated.

The present invention is generally featured by plural sets of automatically generated test instruction strings, each corresponding to one of different pipeline hazard occurrence cases, and by a typical element of each set extracted to verify all pipeline hazard occurrence cases.

Even when the pipeline is not interlocked, the processor may require the verification of its control mechanism because the pipeline route may be altered or a register value may be forwarded depending on the type of instruction. Since each set of the test instruction strings automatically generated by the present invention corresponds to a specific pipeline control pattern, states can be listed in which a specific control mechanism operates depending on each control pattern.

BRIEF DESCRIPTION OF THE DRAWINGS

Other objects and features of the present invention can be easily recognized by one of ordinary skill in the art by referring to the attached drawings and the descriptions of the preferred embodiments of the present inventions.

FIG. 2 is a block diagram (2) showing the principle of the present invention;

FIG. 3 is a block diagram (3) showing the principle of the present invention;

FIGS. 4A and 4B are block diagrams (4) showing the principle of the present invention;

FIGS. 5A and 5B are block diagrams (5) showing the principle of the present invention;

FIGS. 6A and 6B are block diagrams (6) showing the principle of the present invention;

FIG. 8 is a flowchart (1) showing an entire operation of the first embodiment;

FIG. 14 is a flowchart showing the calculation of the next time state set S' according to the basic transition, and the output of a test instruction string;

FIG. 16 shows the structure of a state variable;

FIG. 17 shows the structure of the data on the operation table;

FIGS. 24A through 24D show examples of the test instruction string generating a test state (case 1) reached only by a basic transition from the initial state;

FIG. 29 shows an example of the structure of the data in a test state;

FIG. 30 shows an example of the structure of the data in an initial state;

FIGS. 31A and 31B show examples (1) of the structure of the data s' and $T_s$ after the basic transition;

FIGS. 32A and 32B show examples (2) of the structure of the data s' and $T_s$ after the basic transition;

FIGS. 33A and 33B show examples (3) of the structure of the data s' and $T_s$ after the basic transition;

FIG. 34 shows an example of the structure of the data s' and $T_s$ corresponding to the test state;

FIG. 36 is a flowchart showing an entire operation of the second embodiment;

FIG. 37 is a flowchart showing the calculation of the next time state set S' according to the basic transition in the second embodiment;

FIG. 41 is a flowchart showing the operation of the fourth embodiment; and

DESCRIPTION OF THE PREFERRED EMBODIMENTS

Explanation of the Principle

The principle of the present invention is described below before explaining the practical embodiment of the present invention.

Figure 1:
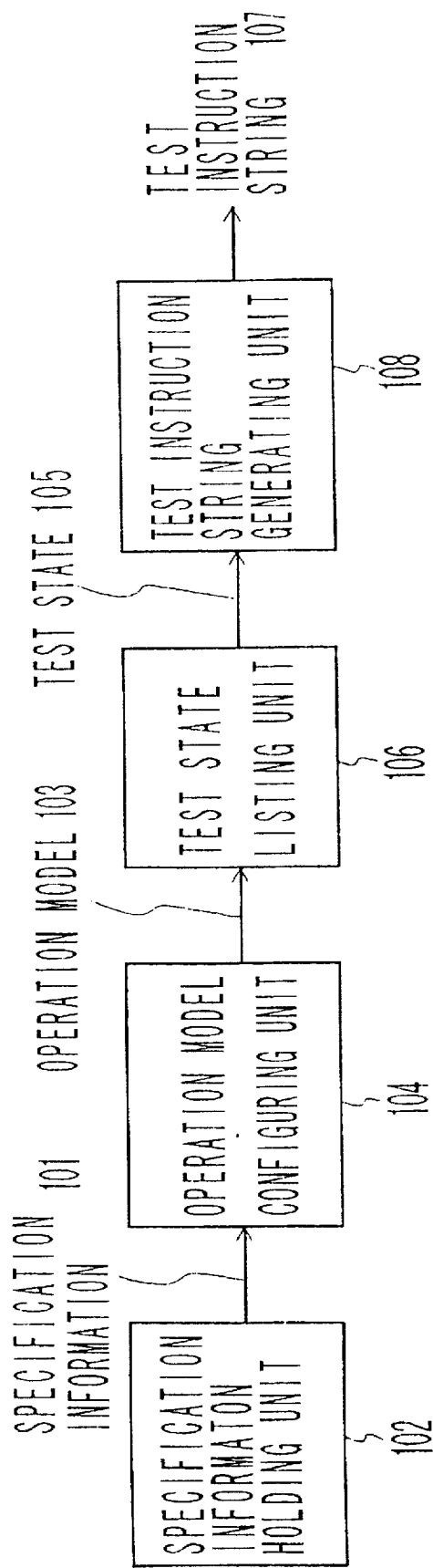
FIG. 1 is a block diagram (1) showing the principle of the present invention.

FIG. 1 is a block diagram showing the first aspect of the present invention.

A specification information holding unit 102 holds specification information 101 about the configuration of a pipeline of a processor and each instruction executed by the processor. A pipeline refers to the function of dividing an instructed process into a plurality of operation units (pipeline stages) each of which can be processed basically in a clock cycle, and of concurrently performing processes at respective pipeline stages as overlapping processes in response to a series of input data. A hardware unit in which a single instruction can be held in an instruction cycle is referred to as a pipeline unit. "Specification information about each instruction executed by a processor" refers to the information which defines the pipeline operation of a processor, for example, a path of a pipeline process of each instruction, information about the share of hardware resources at each pipeline stage of each instruction, and information about the execution of reading from and writing to a register or memory.

An operation model configuring unit 104 configures an operation model 103 which represents the operations of pipelines according to the specification information 101 stored in the specification information holding unit 102 and represents the states of respective components of pipelines (respective pipeline units) and the transition of the states using a plurality of state variables. In the operation model 103, an instruction input to each pipeline unit corresponds to a state input externally or from another state variable to a state variable.

A test state listing unit 106 lists test states 105 in which conflicts occur among the states represented by a plurality of state variables contained in the operation model 103 configured by the operation model configuring unit 104.

A test instruction string generating unit 108 generates a test instruction string 107 corresponding to a process in which the operation model 103 configured by the operation model configuring unit 104 indicates a transition from its initial state to each test state 105 listed by the test state listing unit 106.

According to the first aspect of the present invention with the above described configuration the operation model 103 representing the operation of the pipeline of the processor based on the input specification information 101 is automatically configured. Correctly and simply configuring the operation model 103 improves the quality of an output test instruction string 107 and efficiently conducts a processor test according to instruction strings.

After the test states 105 are listed according to the specification information 101, the test instruction string 107 is generated corresponding to the transition process from the initial state to the test state 105. A test program can be generated by optionally selecting the test state 105 depending on the purpose.

FIG. 2 is a block diagram showing the second aspect of the present invention.

A specification information holding unit 202 holds specification information 201 about the configuration of a pipeline of a processor and each instruction executed by the processor.

A initial operation model configuring unit 204 configures an operation model as an initial operation model 203 which represents the operations of pipelines according to the specification information 201 stored in the specification information holding unit 202 and represents the states of respective components of pipelines and the transition of the states using a plurality of state variables.

A state number minimizing unit 206 minimizes the number of the states defined for each state variable by grouping a plurality of states assigned to each state variable contained in the initial operation model 203 configured by the initial operation model configuring unit 204 based on the attributes of the states, and configures a minimized operation model 205.

With the above described configuration according to the second aspect of the present invention, an operation model directly corresponding to the input specification information 201 is generated as the initial operation model 203, and then a plurality of states of each state variable contained in the operation model are grouped and a plurality of states are processed as a single process, thereby reducing the number of states of the operation model. As a result, a simplified processor operation model 205 can be obtained with the specification of the configuration of a pipeline and the instruction flow in the pipeline retaining unchanged. According to the operation model 205, the time required to generate a test instruction string can be shortened.

FIG. 3 is a block diagram showing the third aspect of the present invention.

An input information holding unit 303 holds as an input information an operation model 301 (corresponding to the operation models 103 and 205) configured according to the first or second aspect of the present invention, and a test state 302 in which conflicts occur among the states of a plurality of state variables contained in the operation model 301.

A test instruction listing unit 306 lists a test instruction string 305 corresponding to processes in which the state of the operation model 301 indicates a transition from a predetermined input state 304 to any of the test states 302 stored in the input information holding unit 303 without including the state in which conflicts occur among the states of a plurality of state variables contained in the operation model 301 stored in the input information holding unit 303.

A next time state calculating unit 308 calculates a next time state 307 reached after the states of a plurality of state variables contained in the operation model 301 stored in the input information holding unit 303 has changed into the test state of the test instruction string 305 listed by the test instruction listing unit 306. Then, the next time state calculating unit 308 inputs the next time state 307 to the test instruction listing unit 306 as the predetermined input state 304.

With the configuration according to the third aspect of the present invention, the test instruction string 305 is automatically generated by repeatedly performing the process of listing the test instruction string 305 which reaches the test state 302 after a state transition excluding the test state 302 and the process of obtaining the state at the next time (next instruction cycle) of the test state 302 based on the input operation model 301 and the test state 302 of the operation model 301. Setting the state in which a complicated state transition is made next time as the test state 302 makes a state transition excluding the test state 302 simple, thereby efficiently extracting the test state 302.

FIG. 4A is a block diagram showing the fourth aspect of the present invention.

An input information holding unit 403 holds as input information an operation model 401 (corresponding to the operation models 103 and 205) configured according to the first or second aspect of the present invention and a state evaluation function 402 output in response to the states of a plurality of state variables contained in the operation model 401.

An attainable state listing unit 404 lists states which can be reached from an initial state of a plurality of state variables contained in the operation model 401 input as input information and in which a value of the state evaluation function 402 satisfies a predetermined condition.

A test instruction string listing unit 406 lists as the test instruction state 405 an instruction string which reaches the state listed by the attainable state listing unit 404.

FIG. 4B is a block diagram practically showing the fourth aspect of the present invention.

An input information holding unit 409 stores as input information an operation model 407 (corresponding to the operation models 103 and 205) configured according to the first or second aspect of the present invention, and a state evaluation function 408 output in response to an input states of a plurality of state variables contained in the operation model 407.

An attainable state listing unit 410 lists states which can be reached from the initial state of a plurality of state variables contained in the operation model 407 input as input information.

A state evaluation function calculating unit 411 calculates a value of the state evaluation function 408 corresponding to the state listed by the attainable state listing unit 410.

A instruction string listing unit 412 lists an instruction string which reaches the state listed by the attainable state listing unit 410.

A test instruction string output unit 414 selects a state in which the value calculated by the state evaluation function calculating unit 411 satisfies a predetermined condition from the states listed by the attainable state listing unit 410. Then, the test instruction string output unit 414 outputs the selected state as a test instruction string 413.

With the above described configuration according to the fourth aspect of the present invention, the state evaluation functions 402 and 408 can be specified as input information, not as a set of test states, specifying test items for the operation models 401 and 407.

Important in a pipeline processor is a mechanism of controlling instructions by clearly distinguishing, at the occurrence of a trap, instructions executed before the execution of an instruction which causes a trap from those executed after the trap-causing instruction. Particularly, to realize a precise trap, the instructions executed before the trap-causing instruction should be completed when control is passed to a trap handler, and the instructions executed after the execution of the trap-causing instruction should be started when control is passed to the trap handler. To verify these states, a test instruction string should be generated such that test items include the state in which the largest possible number of instructions are contained in a pipeline and the state in which a trap is caused.

According to the fourth aspect of the present invention, these qualitatively represented test items can be efficiently defined by the state evaluation functions 402 and 408 with which the states are evaluated, and the corresponding test instruction strings 505 and 513 are generated automatically and efficiently.

FIG. 5A is a block diagram of the fifth aspect of the present invention.

An input information holding unit 503 holds as input information an operation model 501 (corresponding to the operation models 103 and 205) configured according to the first or second aspect of the present invention and state time series 502 of a plurality of state variables contained in the operation model 501.

An attainable state time series listing unit 504 lists states which can be reached from the initial state of a plurality of state variables contained in the operation model 501 input as input information. That is, the attainable state time series listing unit 504 lists the state time series 502 input as input information.

A test instruction string listing unit 506 lists as the test instruction string 505 an instruction string realizing the state time series listed by the attainable state time series listing unit 504.

FIG. 5B is a block diagram practically showing the fifth aspect of the present invention.

An input information holding unit 509 holds as input information an operation model 509 (corresponding to the operation models 103 and 205) configured according to the first or second aspect of the present invention and state time series 508 of a plurality of state variables contained in the operation model 507.

An attainable state listing unit 510 lists states which can be reached from the initial state of a plurality of state variables contained in the operation model 507 input as input information.

A instruction string listing unit 511 lists a instruction string which reaches the state listed by the attainable state listing unit 510.

A state time series retrieving unit 512 traces backward the states listed by the attainable state listing unit 510 and retrieves the state time series matching the state time series 508 input as input information.

The test instruction string output unit 514 selects from the instruction string listing unit 511 an instruction string reaching the last state in the state time series retrieved by the state time series retrieving unit 512, and outputs the selected instruction string as the test instruction string 513.

With the above described configuration according to the fifth aspect of the present invention, the state time series 502 and 508 can be specified as input information specifying test items for the operation models 501 and 507.

For example, in a specific type of pipeline processor, a buffer is provided between an instruction execution result write unit and a register file and is used to rearrange an actual writing back operation according to the step order in the program, thereby realizing a precise trap. To verify such a pipeline mechanism, a state is generated in which the completion order of the instructions is rearranged within a few instruction cycles, then the buffer holds the data and generates a test instruction string which generates a trap.

According to the fifth aspect of the present invention, a state change can be specified as the state time series 502 and 508, and the test instruction strings 505 and 513 for generating a specified state for a predetermined time can be generated automatically and efficiently.

FIG. 6A is a block diagram showing the sixth aspect of the present invention.

An input information holding unit 603 holds as input information an operation model 601 (corresponding to the operation models 103 and 205) configured according to the first or second aspect of the present invention and a state evaluation function 602 output in response to the states of a plurality of state variables contained in the operation model 601.

An attainable state time series listing unit 604 lists a state time series which can be reached from an initial state of a plurality of state variables contained in the operation model 601 input as input information and in which a value of the evaluation function 602 satisfies a predetermined condition.

A test instruction string listing unit 606 lists as the test instruction state 605 an instruction string which realizes the state time series listed by the attainable state time series listing unit 604.

FIG. 6B is a block diagram practically showing the sixth aspect of the present invention.

An input information holding unit 609 stores as input information an operation model 607 (corresponding to the operation models 103 and 205) configured according to the first or second aspect of the present invention, and a state time series evaluation function 608 of a plurality of state variables contained in the operation model 607.

An attainable state listing unit 610 lists states which can be reached from the initial state of a plurality of state variables contained in the operation model 607 input as input information.

A instruction string listing unit 611 lists a instruction string which reaches the states listed by the attainable state listing unit 610.

A state time series evaluation function calculating unit 612 calculates the evaluation function 608 for the state time series obtained by tracing backward the states listed by the attainable state listing unit 610.

A test instruction string output unit 614 selects a state time series in which the value calculated by the state time series evaluation function calculating unit 612 satisfies a predetermined condition from the time series obtained by tracing backward from the states listed by the attainable state listing unit 610. Then, the test instruction string output unit 614 selects the instruction string reaching the last state of the selected state time series from the instruction string listing unit 611, and outputs the selected instruction string as the test instruction string 613.

With the configuration according to the sixth aspect of the present invention, the evaluation functions 602 and 608 can be specified as input information for use in specifying test items for the operation models 601 and 607.

For example, some pipeline processors have register renaming mechanisms of dynamically renumbering registers between the program registers and the physical registers. Such processors have the problem of insufficient number of physical registers (renaming space) for the renaming process. If a processor is designed to solve the problem, a test instruction string requiring the largest possible renaming space should be generated to exactly verify the successful protection against the insufficiency.

According to the sixth aspect of the present invention, test items, which qualitatively represent a state in a predetermined period, can be efficiently determined using the evaluation functions 602 and 608 for use in evaluating a state time series. The corresponding test instruction strings 605 and 613 can be generated automatically and efficiently.

Explanation of the Preferred Embodiments

The preferred embodiments of the present invention are explained below in detail by referring to the attached drawings.

<1st Embodiment>

Figure 7:
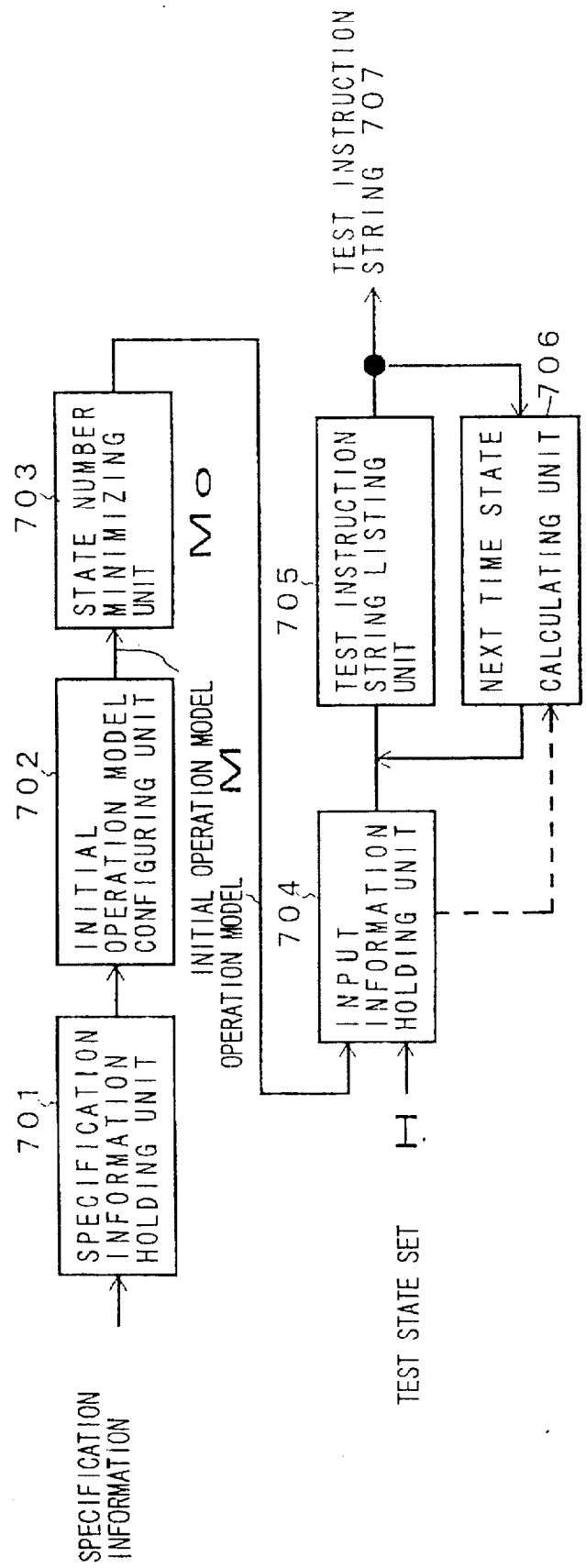
FIG. 7 shows the entire configuration of the first embodiment of the present invention.

FIG. 7 shows the general configuration of the first embodiment of the present invention. The functions realized by the configuration can be obtained by a computer system comprising such components as a processor, memory, and control programs realized by them.

In FIG. 7, a specification information holding unit 701 holds specification information about the pipeline configuration of a processor to be verified and about each instruction executed by the processor.

An initial operation model configuring unit 702 configures initial operation model $M_0$ of a pipeline from the specification information held in the specification information holding unit 701.

A state number minimizing unit 703 configures an operation model M by minimizing the number of the states of the initial operation model $M_0$.

An input information holding unit 704 holds input information comprising the above described operation model M and a test state set H for the model.

A test instruction string listing unit 705 lists a test instruction string 707 corresponding to the process in which the operation model M indicates a transition from a predetermined input state to any of the test states in the test state set H held by the input information holding unit 704 according to the operation model M held in the input information holding unit 704 and the test state set H excluding the state in which no conflicts occur among the states of a plurality of state variables contained in the operation model M held in the input information holding unit 704.

A next time state calculating unit 706 calculates a next time state reached after the states of a plurality of state variables contained in the operation model M stored in the input information holding unit 704 has changed into the test state of the test instruction string 707 listed by the test instruction listing unit 705. Then, the next time state calculating unit 706 inputs the next time state to the test instruction listing unit 705 as a new input state.

The operation of the first embodiment with the above described configuration is explained in detail by referring to the operation flowcharts shown in FIGS. 8 through 15, the data configuration shown in FIGS. 16 and 17, and the explanatory views of the operation shown in FIGS. 18 through 28.

First, as shown in step 801 in FIG. 8, specification information is input to the specification information holding unit 701.

Figure 18:
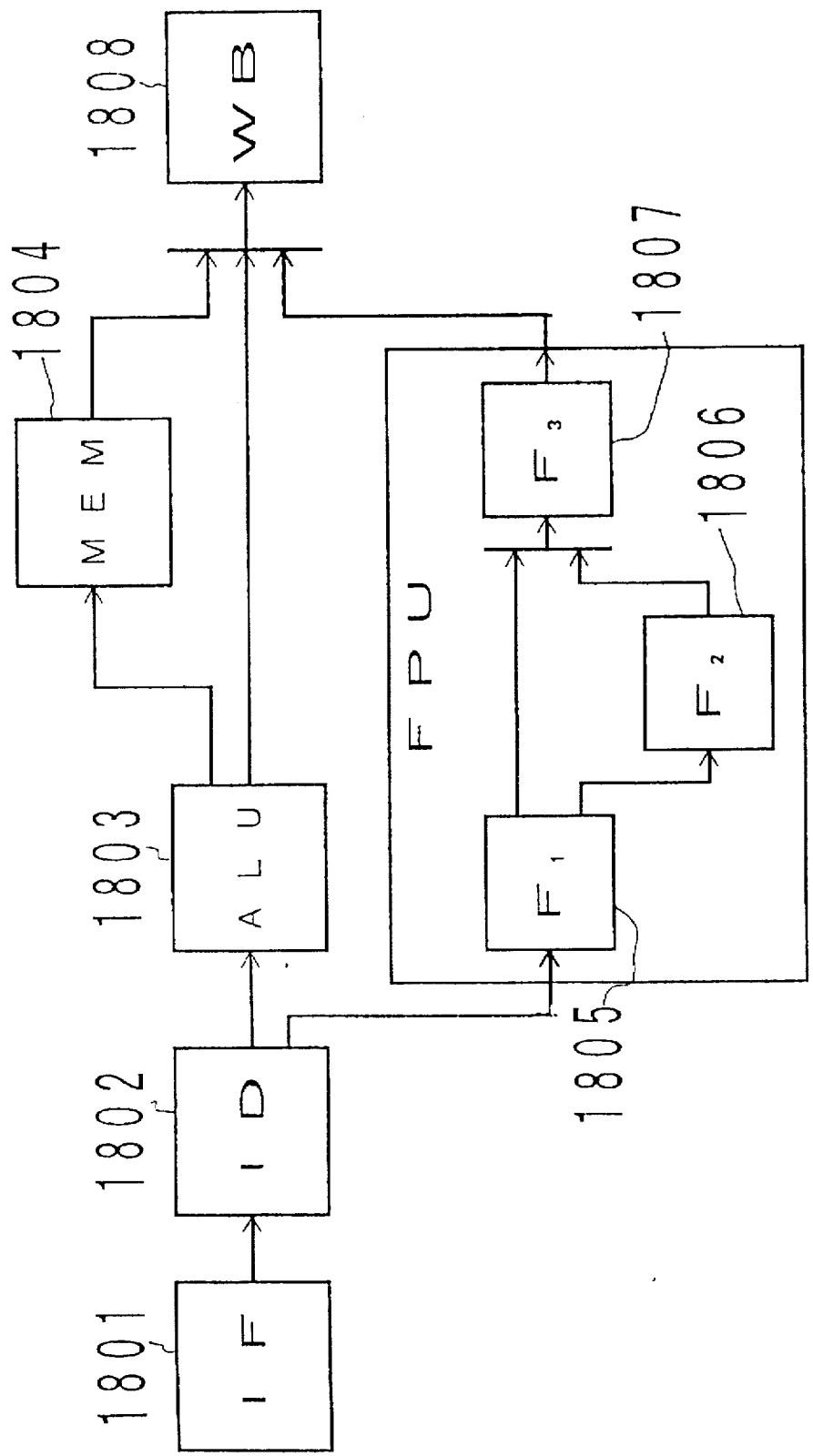
FIG. 18 shows an example of the configuration of the pipeline represented by specification information.

FIG. 18 shows an example of configuration of a pipeline represented by the specification information.

In a pipeline process, a process performed by an instruction is divided into a plurality of time-independent process stages, and each process state of each instruction is performed by each corresponding process unit. In each instruction cycle, the process stages are performed in parallel in respective process units in response to a plurality of instructions.

In FIG. 18, an instruction fetch unit (IF unit) 1801 processes an instruction fetch stage (IF stage) of each instruction. The unit fetches an instruction from the memory not shown in FIG. 18.

An instruction decode unit (ID unit) 1802 processes an instruction decode stage (ID stage) of each instruction. The unit decodes a fetched instruction and reads an operand for the instruction from the register.

An arithmetic logic operation unit (ALU unit) 1803 processes an arithmetic logic operation stage (ALU stage) of each instruction. If a decoded instruction is an arithmetic operation instruction or a logical operation instruction, the unit performs an integer or logical operation for the instruction.

A memory access unit (MEM unit) 1804 processes a memory access stage (MEM stage) of each instruction. The unit reads from or writes to a memory not shown in FIG. 18 the data of an address calculated by the ALU unit 1803.

A floating point operation unit (FPU unit) comprising $F_1$ unit 1805, $F_2$ unit 1806, and $F_3$ unit 1807 processes the floating point operation stage (FPU stage) of each instruction. When a decoded instruction is a floating point operation instruction, the unit performs a floating point operation for the operand of the instruction.

A write-back unit (WB unit) 1808 processes the write-back stage (WB stage) of each instruction. This unit writes to the register not shown in FIG. 18 data obtained from the memory not shown in FIG. 18 by the MEM unit 1804 or data calculated by the ALU unit 1803.

With the configuration of the above described pipeline, a single instruction is fetched in an instruction cycle, and any stage except the FPU stage is completed in an instruction cycle. The number of instruction cycles required to process the FPU stage depends on the instruction to be executed. If an instruction is executed by the $F_3$ unit 1807 after being executed by the $F_1$ unit 1805, then the FPU stage for the instruction requires two instruction cycles. If an instruction is executed by the $F_3$ unit 1807 after being executed by the $F_1$ unit 1805 and then by the $F_2$ unit 1806, then the FPU stage for the instruction requires three instruction cycles.

The specification information about the pipeline configuration shown by the above example and described in a predetermined format is input to the specification information holding unit 701.

Figure 19:
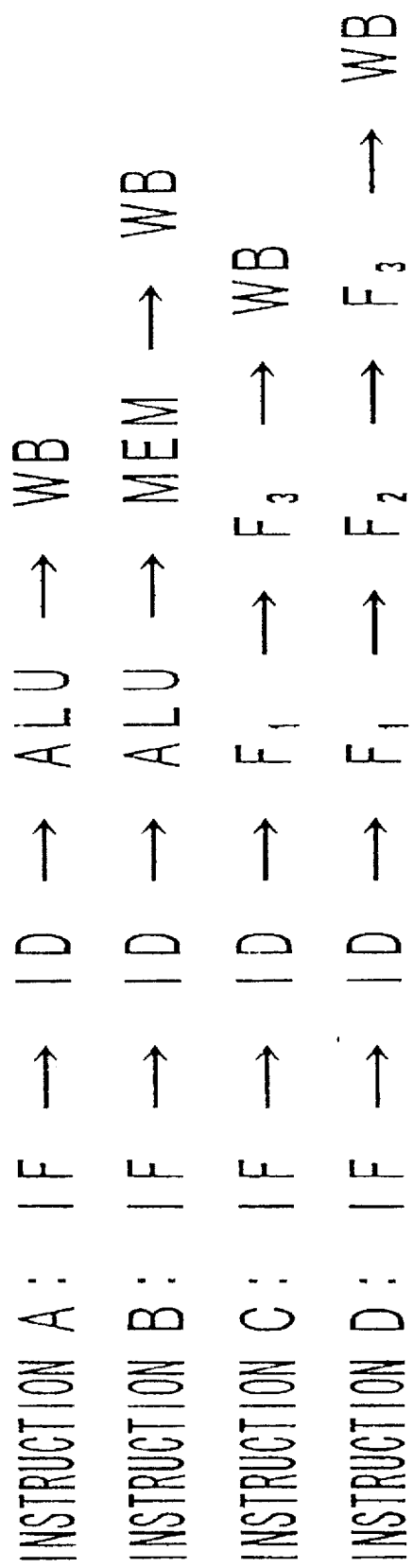
FIG. 19 shows an example of the execution format of an instruction represented by specification information.

FIG. 19 shows an example of the execution format of an instruction represented by specification information. The specification represented by the specification information is as follows. That is, according to instruction A, in synchronism with the process of the instruction cycle, the corresponding IF stage, ID stage, ALU stage, and WB stage are processed in this order. According to instruction B, in synchronism with the process of the instruction cycle, the corresponding IF stage, ID stage, ALU stage, MEM stage, and WB stage are processed in this order. According to instruction C, in synchronism with the process of the instruction cycle, the corresponding IF stage, ID stage, FPU stage consisting of an execution timing of the $F_1$ unit 1805 and an execution timing of the $F_3$ unit 1807, and WB stage are processed in this order. According to instruction D, in synchronism with the process of the instruction cycle, the corresponding IF stage, ID stage, FPU stage consisting of an execution timing of the $F_1$ unit 1805, an execution timing of the $F_2$ unit 1806, and an execution timing of the $F_3$ unit 1807, and WB stage are processed in this order.

The specification information about the execution formats of the instructions shown by the above examples and described in predetermined formats is input to the specification information holding unit 701.

Figure 20:
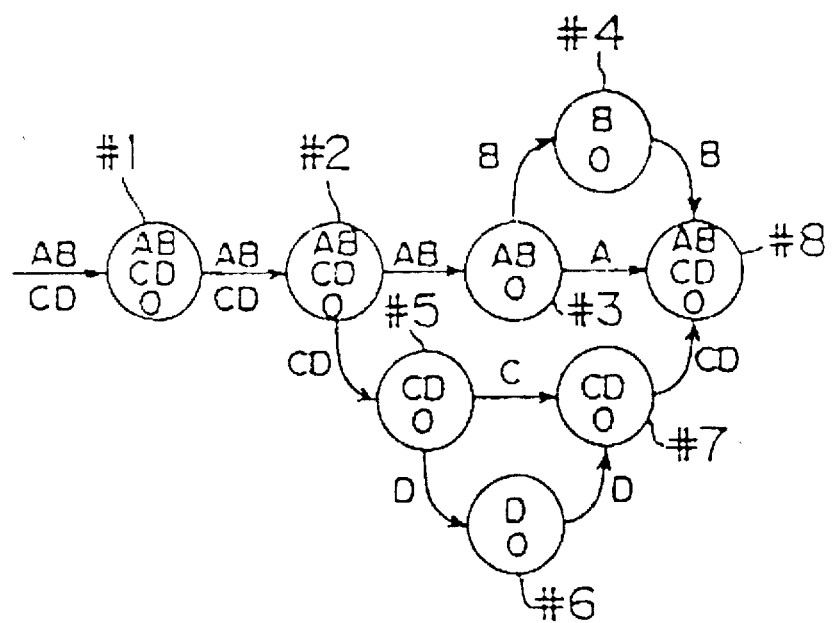
FIG. 20 shows an example of the initial operation model $M_0$.

As shown by step 802 in FIG. 8, the initial operation model configuring unit 702 shown in FIG. 7 configures the initial operation model $M_0$ according to the specification information held in the specification information holding unit 701. The initial operation model $M_0$ conceptually represented in FIG. 20 is configured according to the specification information shown in FIGS. 18 and 19. The algorithm configuring the initial operation model $M_0$ from the specification information is indicated as follows.

First, according to the specification information (refer to FIG. 18) about the configuration example of a pipeline, a state variable defined as the structure shown in FIG. 16 is reserved for each unit configuring the pipeline. At this time, the pipeline in each unit is also considered, and a state variable corresponds to a unit holding a single instruction for each instruction cycle. In the configuration example shown in FIG. 18, a state variable is reserved for each of the IF unit 1801, ID unit 1802, ALU unit 1803, MEM unit 1804, and WB unit 1808. Likewise, a single state variable is reserved for each of the $F_1$ unit 1805, $F_2$ unit 1806, and $F_3$ unit 1807 forming the FPU unit. In the example of the initial operation model $M_0$ shown in FIG. 20, the circles referred to by #1 through #8 represent state variables, and each circle corresponds one to one to each unit referred to by numbers 1801 through 1808 in the configuration example of the pipeline shown in FIG. 18.

Then, determined is each component shown in FIG. 16 and forming part of the thus reserved state variable.

In FIG. 16, the "list of state variables connected to the preceding stage" stores a list of state variables corresponding to the units which may store the states of the process performed by the units corresponding to the state variables at a next time. For example, when the ALU unit 1803 is considered in the examples shown in FIGS. 18 and 19, two states, that is, instructions A and B, are executed by the unit. At the time one unit before the present time when the ALU unit 1803 executes these states, the ID unit 1802 executes these states. Therefore, state variables corresponding to the ID unit 1802 are entered in the "list of state variables connected to the preceding stage" of the state variables for the ALU unit 1803. When the $F_3$ unit 1807 is considered, two states, that is, instructions C and D, are executed by the unit. At the time one unit before the present time when the $F_3$ unit 1807 executes these states, the $F_1$ unit 1805 executes instruction C and the $F_2$ unit 1806 executes instruction D. Therefore, state variables corresponding to the $F_1$ unit 1805 and $F_2$ unit 1806 are entered in the "list of state variables connected to the preceding stage" of the state variables for the $F_3$ unit 1807.

In FIG. 16, the "list of state variables connected to the subsequent stage" stores a list of state variables corresponding to the units which may process next time the states stored by the units of the process performed by the units corresponding to the state variables. For example, when the ALU unit 1803 is considered in the examples shown in FIGS. 18 and 19, two states, that is, instructions A and B, are executed by the unit. The units which may be executed next time are WB unit 1808 and the MEM unit 1804. Therefore, state variables corresponding to the WB unit 1808 and the MEM unit 1804 are entered in the "list of state variables connected to the subsequent stage" of the state variables for the ALU unit 1803.

The "list of state variables connected to the preceding stage" and the "list of state variables connected to the subsequent stage" of respective state variables defines arrows connecting respective state variables in respective circles in the example shown by the initial operation model $M_0$ in FIG. 20.

In FIG. 16, the "input set" of state variables stores sets of states input externally of the pipeline to the unit corresponding to the state variables. In the initial operation model $M_0$, the "input set" of state variables corresponding to an instruction fetch unit refers to all instruction sets executable in the pipeline, while the "input set" of state variables corresponding to other units refers to a space set. More practically, in the examples shown in FIGS. 18 and 19, four states, that is, instructions A, B, C, and D are entered in the "input set" of state variables corresponding to the IF unit 1801. In the example of the initial operation model $M_0$ shown in FIG. 20, the "input set" of state variables corresponding to the IF unit 1801 defines an arrow input to the state variable corresponding to the IF unit 1801 represented by the circle referred to by #1, and also defines the state (instruction) added to the arrow.

In FIG. 16, the "state set" of state variables stores a set of states processed by a unit corresponding to the state variables. The set also stores the information indicating that there is no states (instructions) to be processed. In the initial operation model $M_0$, the "state set" of each state variable comprises all instructions which may be entered in a unit corresponding to each state variable, and information indicating no instructions.

If the ALU unit 1803 is considered in the examples shown in FIGS. 18 and 19, two states, that is, instructions A and B, are executed in the unit. Therefore, entered in the "state set" of state variables corresponding to the ALU unit 1803 are the two states, that is, instructions A and B, and the information indicating no instructions. In the example of the initial operation model $M_0$ shown in FIG. 20, the above described "state set" is represented as characters in the circles corresponding to respective state variables. The characters A through D correspond to four states, that is, instructions A through D respectively. The character O corresponds to the information indicating that there are no instructions. In the operation model M obtained in a state number minimizing process, each "state set" of state variables stores a set of grouped states.

In FIG. 16, the "transition function" of a state variable stores a function for use in obtaining a state to be processed next time by the unit corresponding to the state variable from the state output from the unit connected to the preceding stage of the unit corresponding to the state variable or input externally of the pipeline. For example, in the example shown in FIGS. 18 and 19, the "transition function" of a state variable corresponding to the WB unit 1808 specifies that instruction A is fetched as an instruction to be processed next time if the ALU unit 1803 connected to the preceding stage of the WB unit 1808 outputs instruction A, that instruction B is fetched as an instruction to be processed next time if the MEM unit 1804 connected to the preceding stage of the WB unit 1808 outputs instruction B, and that instruction C is fetched as an instruction to be processed next time if the $F_3$ unit 1807 connected to the preceding stage of the WB unit 1808 outputs instruction C. In the example of the initial operation model $M_0$ shown in FIG. 20, the above described "transition function" is represented by an arrow labelled with the combination of any of A, B, C or D.

In FIG. 16, the "operation table" of state variables stores an operation table having the data structure shown in FIG. 17. When the units corresponding to state variables are in respective states 1, 2, and 3, . . . (if the units are executing respective instructions), the operation table defines whether or not the units corresponding to the state variables perform the operations 1, 2, 3, . . . , affecting the control of the pipeline such as a read from or a write to registers, or whether or not the corresponding units occupy specific hardware resources. For example, in the example shown in FIGS. 18 and 19, the "operation table" of the state variables corresponding to the MEM unit 1804 defines that the main memory is occupied for all states. The operation table is used in the state number minimizing process described later.

Each set of "transition function" forming part of the data structure shown in FIG. 16 corresponding to each state variable can be efficiently represented and processed using a binary decision graph (BDD). Each component forming part of the data structure shown in FIG. 16 can be a pointer to data which defines the function of each component.

As shown by step 803 in FIG. 8, the state number minimizing unit 703 shown in FIG. 7 forms the operation model M by reducing the number of states of the initial operation model $M_0$ configured as described above.

Figure 9:
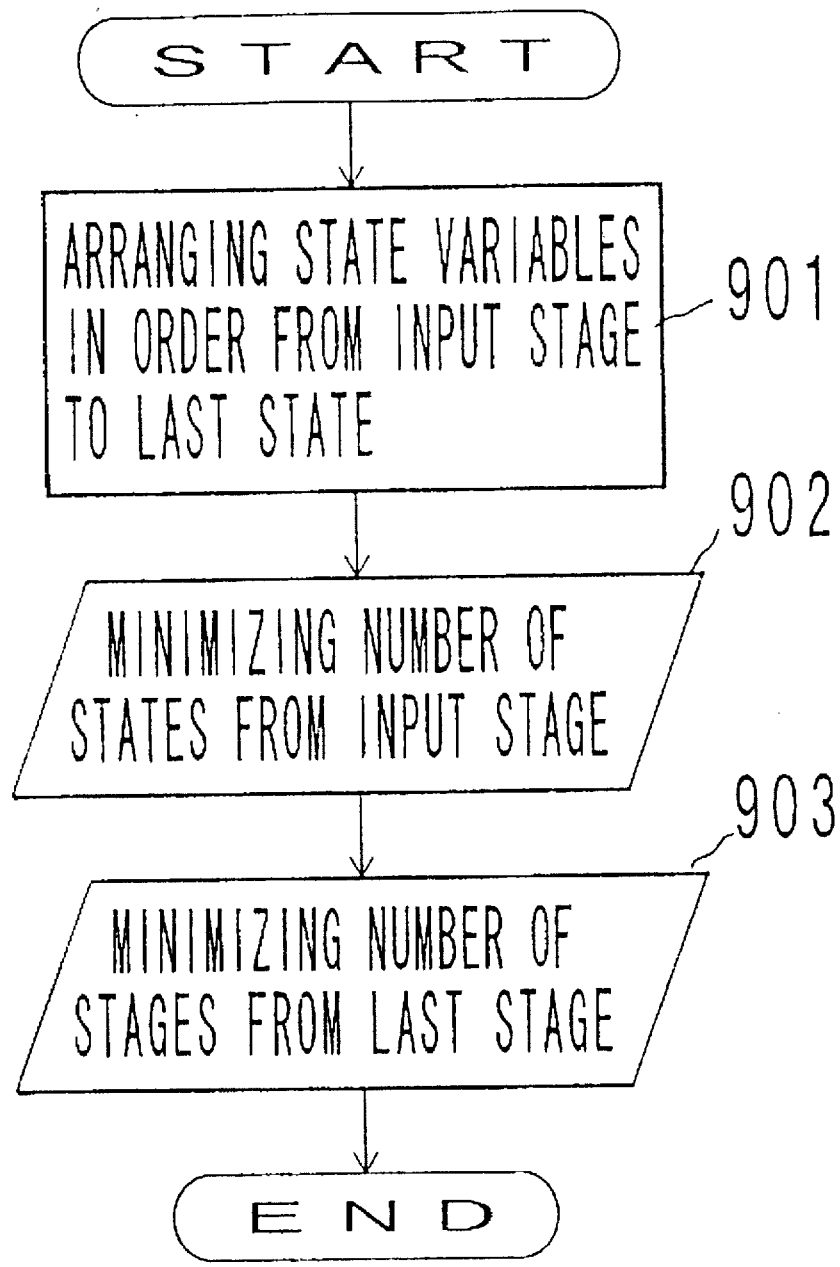
FIG. 9 is a flowchart showing the operation of the state-number minimizing process.

FIG. 9 is a flowchart showing in detail the operation of the state number minimizing process in step 803.

In step 901 shown in FIG. 9, numbered in order is each state variable of the initial operation model $M_0$ configured in step 802 shown in FIG. 8. Practically, each state variable is assigned sequence information in the order from the state variable of the input stage to the state variable of the last stage. In the example of the initial operation model $M_0$ shown in FIG. 20, the sequence of the state variables determined by the numbering process is #1, #2, #3, #5, #4, #6, #7, and #8.

Figure 10:
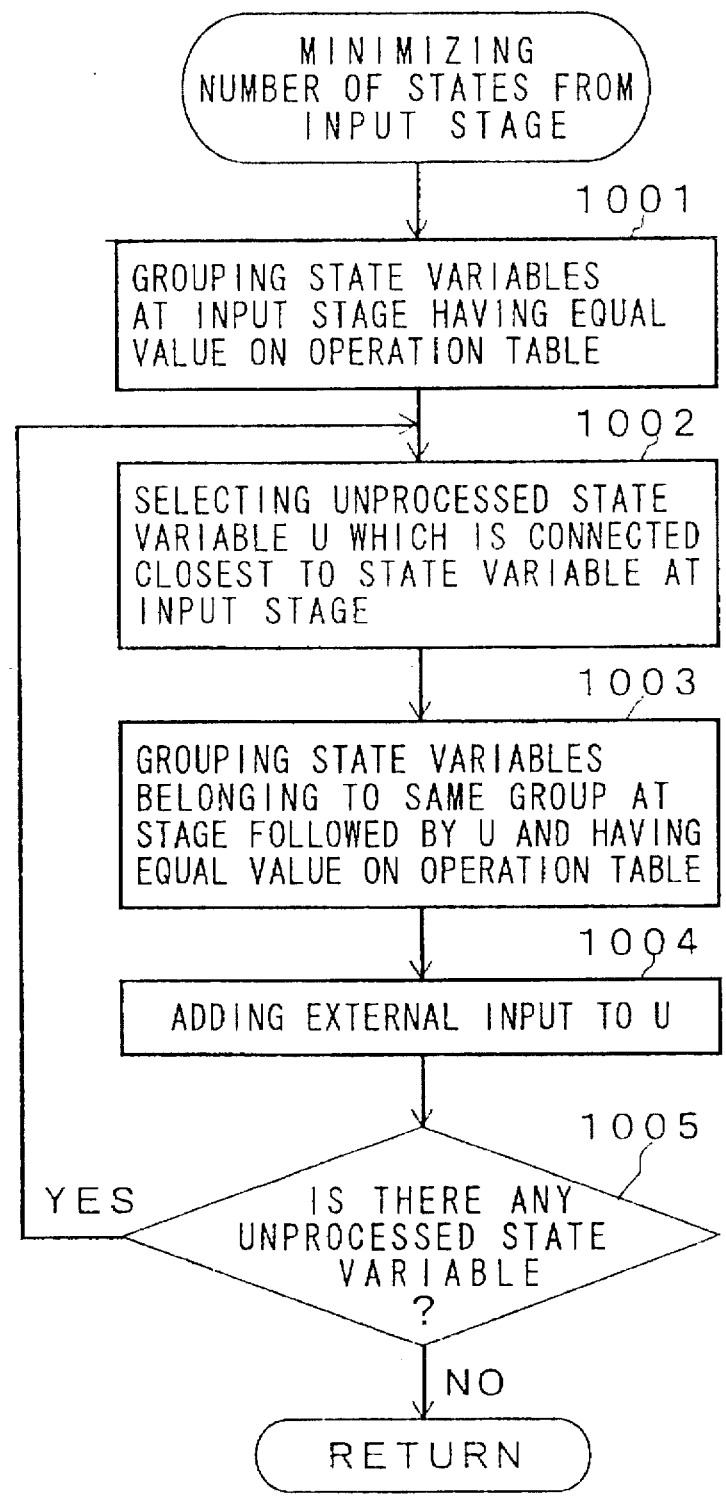
FIG. 10 is a flowchart showing the operation of the state-number minimizing process from the input stage.

Then, in step 902 shown in FIG. 9, the process of minimizing the number of states of each state variable is performed in the order from the state variable of the input stage to the state variable of the last stage. FIG. 10 is a flowchart showing in detail the operation for the process.

First, in step 1001 shown in FIG. 10, put in the same group are the states having equal values on the "operation table" among the states of the "state set" of state variables at the input stage. That is, in the pipeline unit for the stage variable at the input stage, put in the same group are the same states of operations such as occupying the same resources, reading from or writing to a register among the states (instructions) realized by the unit. As a result, the grouped states are replaced with a new state. That is, in the "state set" of state variables, the grouped states are deleted and a new state indicating the grouping result is entered. In the "operation table" of the state variables, the descriptions relating to the grouped states are deleted and the descriptions of a new state indicating the grouping result is added. The descriptions are the same as those commonly given for the grouped states.

Figure 21:
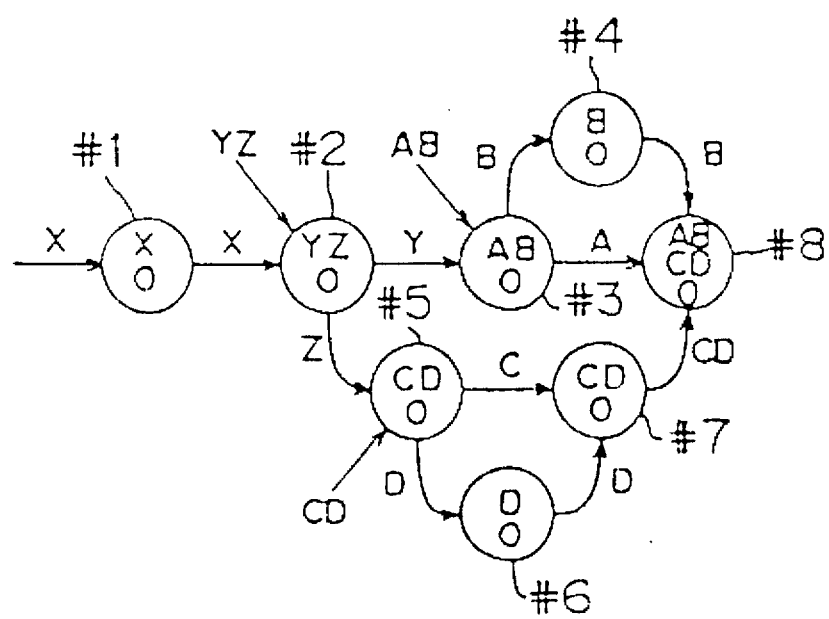
FIG. 21 shows an example of the operation model $M_2$.

As shown in the example shown in FIG. 18, the state variable at the input stage normally corresponds to an instruction fetch unit (the IF unit 1801 in FIG. 18). The values on the "operation table" of all states corresponding to all instructions fetched by the unit are all the same. Therefore, as shown in FIG. 21, all instructions (all states) are replaced with a new state X in the state variable at the input stage represented by #1. Then, in the state set of the state variable #1, the grouped states A, B, C, and D (refer to FIG. 20) are deleted and a new stage X indicating the grouping result is entered. In the "operation table" of state variables, the descriptions of the states A, B, C, and D forming the group are deleted and the descriptions of a new state X indicating the grouping result are added. The descriptions are the same as those commonly described for the grouped states A, B, C, and D. The information indicating that there are no states (instructions) to be processed is represented by character O and remains non-grouped.

Then, according to the sequence determined in step 901 shown in FIG. 9, the processes in steps 1002 through 1005 are repeatedly performed in the order from the state variable at the second stage of the input stage to the state variable of the last stage.

In step 1002, selected is a state variable U which is connected nearest to the state variable of the input stage and has never been processed according to the sequence determined in step 901 shown in FIG. 9.

In step 1003, the states belonging to the same group in the "state set" of state variables in the "list of state variables connected to the preceding stage" of the state variable U, and having the same value on the "operation table" of the state variable U are put in the same group among the states in the "state set" of the state variable U. As a result, as in step 1001, the grouped states are replaced with a new state. That is, in the "state set" of the state variable U, the grouped states are deleted and a new state indicating the grouping result is entered. On the "operation table" of the state variable U, the descriptions of the grouped states are deleted and the descriptions of a new state indicating the grouping result is added. The added descriptions are the same as those commonly described relating to the grouped states. The result of the above described grouping process is the same as or more detailed than that obtained by grouping the state variables connected to the preceding stage of the grouped state variables.

In step 1004, if the "state set" of state variables processed in the grouping process in step 1003 contains a state different from that contained in the "state set" of state variables connected to the preceding stage of the state variables, that is, if the "state set" of state variables processed in the grouping process in step 1003 contains the detailed state of the state contained in the "state set" of state variables connected to the preceding stage of the state variables processed in the grouping process, then it is assumed that the above described different state is input externally of the pipeline to the state variable processed in the grouping process in step 1003, and then added is a state corresponding to the external input to the "input set" of the state variable. The external input is added so that a "transition function" can determine a new state if a state variable processed in the grouping process in step 1003 is provided with a state contained in the "state set" of state variables connected to the preceding stage of the state variables. As a result of the grouping process in step 1003, the process in step 1004 is performed on actually grouped state variables and state variables not processed in the grouping process.

The processes in 1002 through 1003 are repeatedly performed until it is determined in step 1005 that there are no state variables which have never been processed, that is, until the state variables at the last stage have been processed.

The operation model $M_1$ shown in FIG. 21 can be obtained from the initial operation model $M_0$ shown in, for example, FIG. 20 by performing the state number minimizing process at the input stage in step 902 shown in FIG. 9 as shown in the operational flowchart shown in FIG. 10. In the operation model $M_1$, states A, B, C, and D are replaced with a new state X by grouping the states A, B, C, and D for the state variable #1 of the input stage. Likewise, states A and B can be replaced with a new state Y by grouping states A and B for the state variable #2. States C and D can be replaced with a new state Z by grouping states C and D. In this case, states Y and Z newly included in the "state set" of the state variable #2 are different from state X contained in the "state set" of the state variable #1 connected to the preceding state variable #2. Thus, states Y and Z are added as external inputs to the "input set" of the state variable #2. Furthermore, as a result of grouping the state variable #2, states A and B contained in the "state set" of the state variable #3 show different contents from states Y and Z contained in the "state set" of the state variable #2 connected to the preceding stage of the state variable #3. Thus, states A and B are added as external input to the "input set" of the state variable #3. Likewise, as a result of grouping the state variable #2, states C and D contained in the "state set" of the state variable #5 are different from states Y and Z contained in the "state set" of the state variable #2 connected to the preceding stage of the state variable #5. Accordingly, states C and D are added as external input to the "input set" of the state variable #5.

Through the state number minimizing process from the input stage in step 902 shown in FIG. 9, the state (instructions) of a state variable indicating the same operation from the input stage to the unit corresponding to the state variable can be put in the same group. As a result, the time required to generate a test instruction string described later can be shortened.

Figure 11:
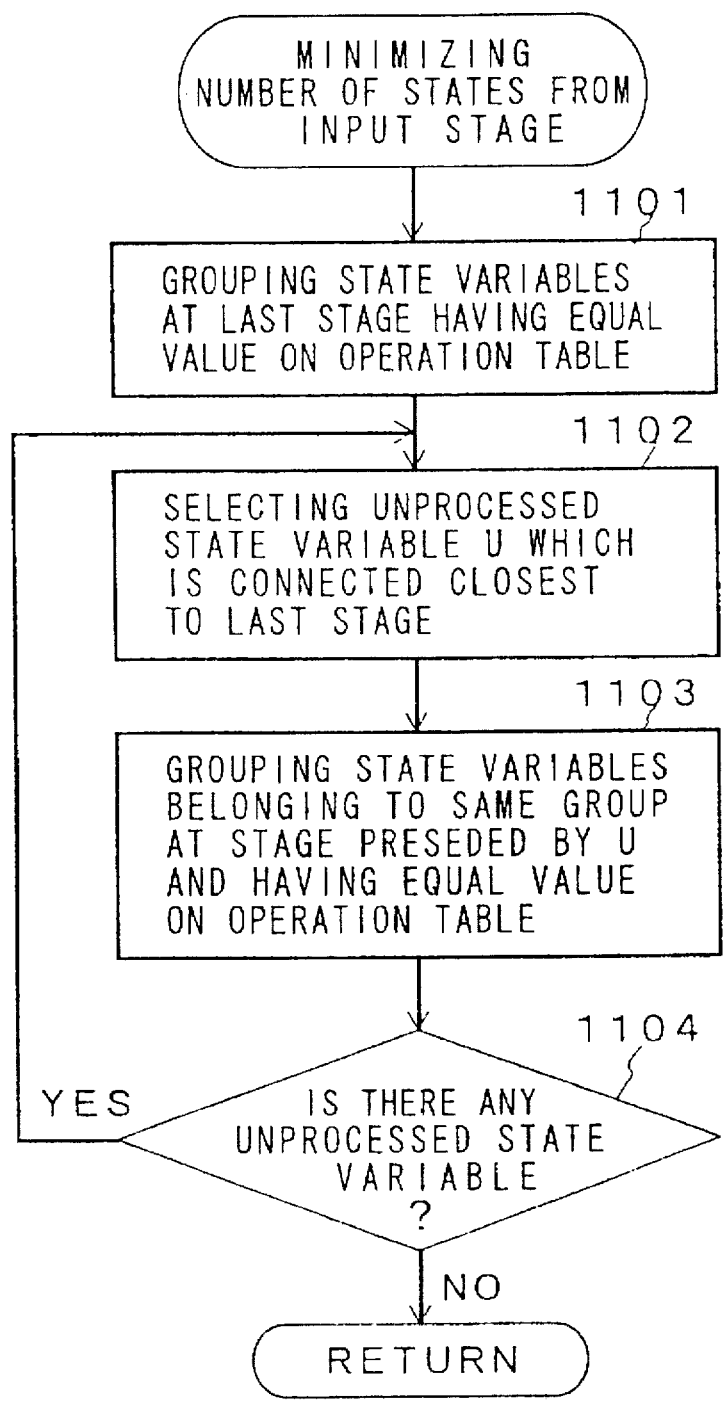
FIG. 11 is a flowchart showing the operation of the state-number minimizing process from the last stage.

After the state number minimizing process from the input stage in step 902 in FIG. 9, a process of reducing the number of states of each state variable is performed in step 903 in the order from the state variable of the last stage to the state variable of the input stage. FIG. 11 is a flowchart showing the detailed operation corresponding to the process.

In step 1101 shown in FIG. 11, the states indicating the same value on the "operation table" among the states contained in the "state set" for the state variables at the last stage are put in the same group. That is, in the pipeline unit corresponding to the state variables at the last stage, put in the same group are the same states of operations such as occupying the same resources, reading from or writing to a register among the states (instructions) realized by the unit. As a result, the grouped states are replaced with a new state. That is, in the "state set" of state variables, the grouped states are deleted and a new state indicating the grouping result is entered. In the "operation table" of the state variables, the descriptions relating to the grouped states are deleted and the descriptions of a new state indicating the grouping result is added. The descriptions are the same as those commonly given for the grouped states.

Then, in the reverse order of the sequence determined in step 901 shown in FIG. 9, the processes in steps 1102 through 1104 are repeatedly performed in the order from the state variable at the preceding stage of the last stage to the state variable of the input stage.

In step 1102, selected is a state variable U which is connected nearest to the state variable of the last stage and has never been processed in the reverse order of the sequence determined in step 901 shown in FIG. 9.

In step 1103, the states belonging to the same group in the "state set" of state variables in the "list of state variables connected to the subsequent stage" of the state variable U, and having the same value on the "operation table" of the state variable U are put in the same group among the states in the "state set" of the state variable U. As a result, the grouped states are replaced with a new state. That is, in the "state set" of the state variable U, the grouped states are deleted and a new state indicating the grouping result is entered. On the "operation table" of the state variable U, the descriptions of the grouped states are deleted and the descriptions of a new state indicating the grouping result is added. The added descriptions are the same as those commonly described relating to the grouped states. The result of the above described grouping process is the same as or more detailed than that obtained by grouping the state variables connected to the subsequent stage of the grouped state variables.

The processes in 1102 through 1103 are repeatedly performed until it is determined in step 1104 that there are no state variables which have never been processed, that is, until the state variables at the last stage have been processed.

Figure 22:
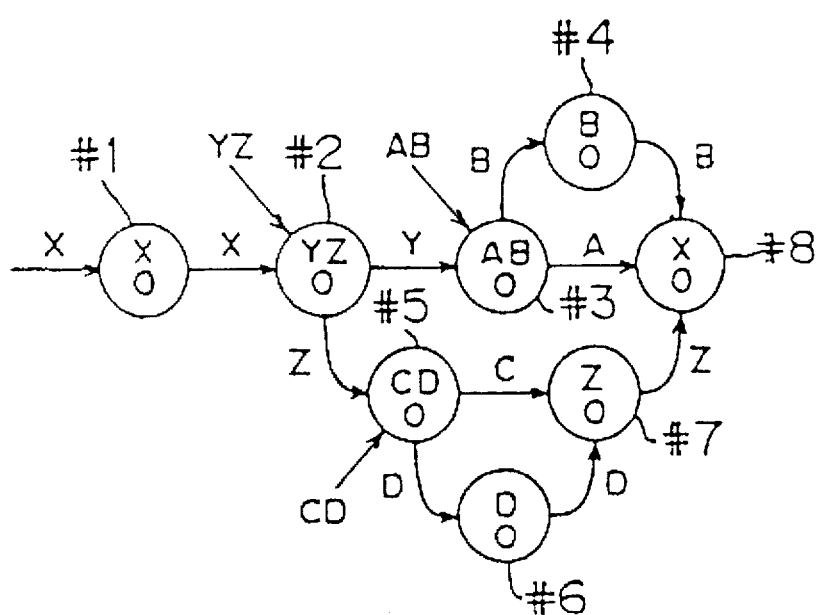
FIG. 22 shows an example of the operation model $M_2$.

The operation model $M_2$ shown in FIG. 22 can be obtained from the initial operation model $M_1$ shown in, for example, FIG. 21 by performing the state number minimizing process at the last stage in step 903 shown in FIG. 9 as shown in the operational flowchart shown in FIG. 11. In the operation model $M_2$, states A, B, C, and D are replaced with a new state X by grouping the states A, B, C, and D for the state variable #8 at the last stage. Likewise, states C and D can be replaced with a new state Z by grouping states C and D for the state variable #7.

Through the state number minimizing process from the last stage in step 903 shown in FIG. 9, the state (instructions) of a state variable indicating the same operation from the unit corresponding to the state variable to the unit at the last stage can be put in the same group. As a result, the time required to generate a test instruction string described later can be shortened.

The state number minimizing process in step 803 shown in FIG. 8 terminates when the state number minimizing process terminates at the last stage in step 903 shown in FIG. 9. As a result, the state number minimizing unit 703 outputs the operation modes (for example, the operation model $M_2$ shown in FIG. 22) as an operation model M.

Next, the portion comprising the input information holding unit 704, test instruction string listing unit 705, and next time state calculating unit 706 shown in FIG. 7 generates the test instruction string 707, which is an instruction string for testing the processor pipeline, from the above described operation model M and the set H in a predetermined test state.

The operations performed by these units are described below in detail by referring to the operation flowcharts shown in FIGS. 12 through 15 and the operation explanatory views shown in FIGS. 23 through 28.

Figure 12:
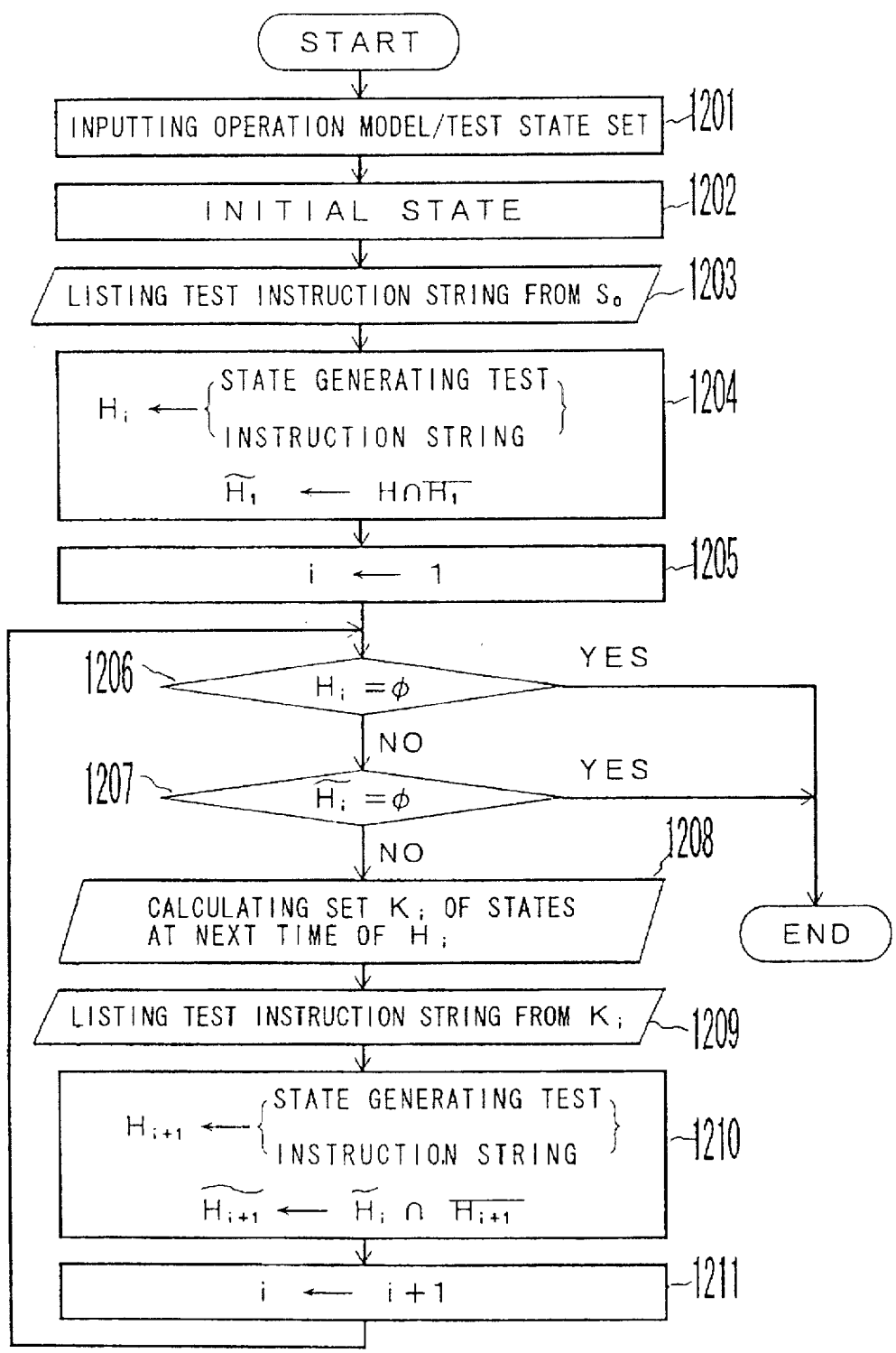
FIG. 12 is a flowchart (2) showing an entire operation of the first embodiment.

As shown in step 1201 in FIG. 12, the input information holding unit 704 shown in FIG. 7 receives and stores the operation model M output by the state number minimizing unit 703 and the set H in a predetermined test state.

The operation model M is stored in the input information holding unit 704 as a set of structures of state variables shown in FIG. 16. For example, the operation model M for the pipeline structure shown in FIG. 18 is stored as a set of eight structures of eight state variables #1 through #8 shown in FIGS. 20, 21, and 22.

Figure 23:
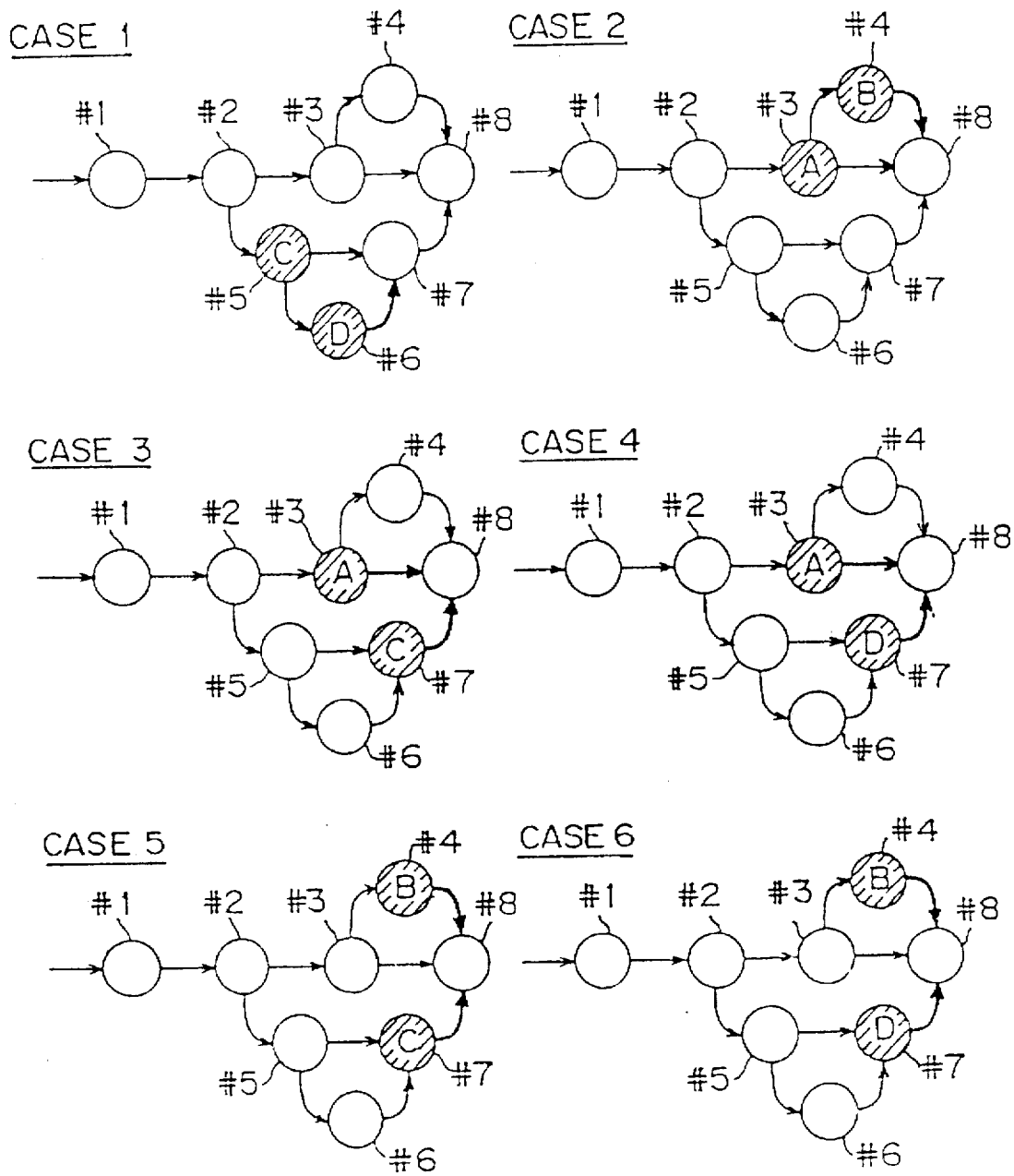
FIG. 23 shows an example of set H in a test state.
Figure 25A:
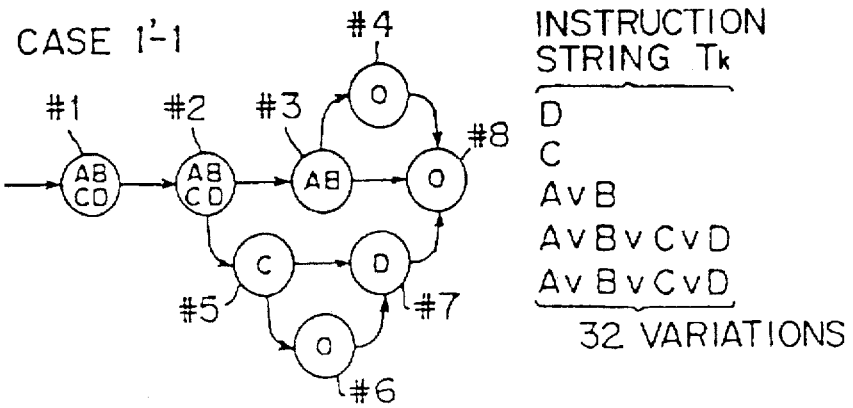
FIGS. 25A through 25D shows the next time state of each of case 1-1, 1-2, 1-3, and 1-4.
Figure 25B:
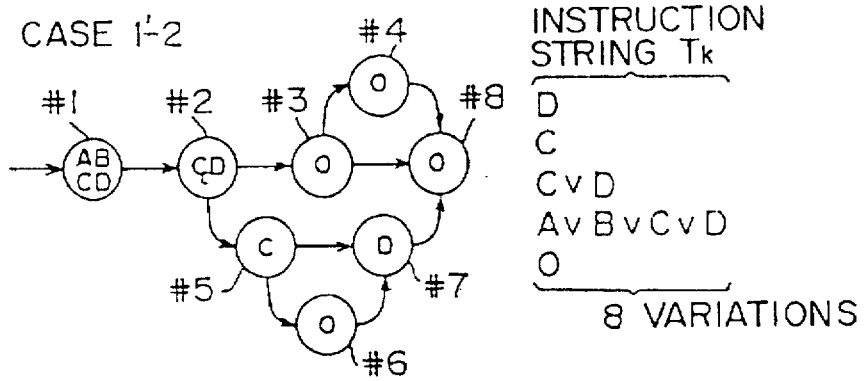
Figure 25C:
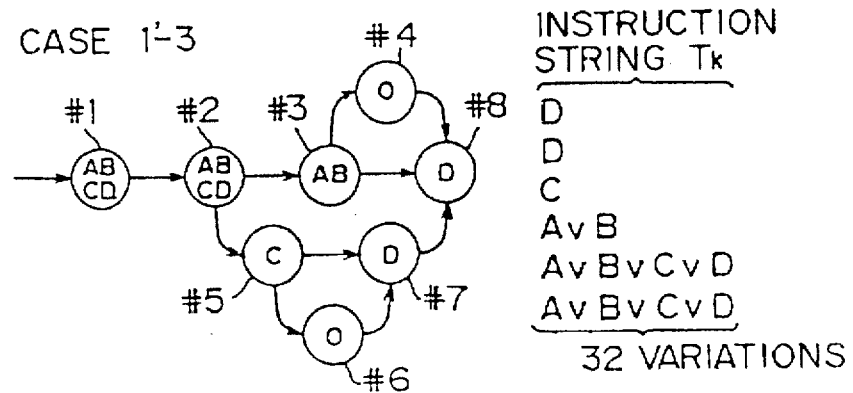
Figure 25D:
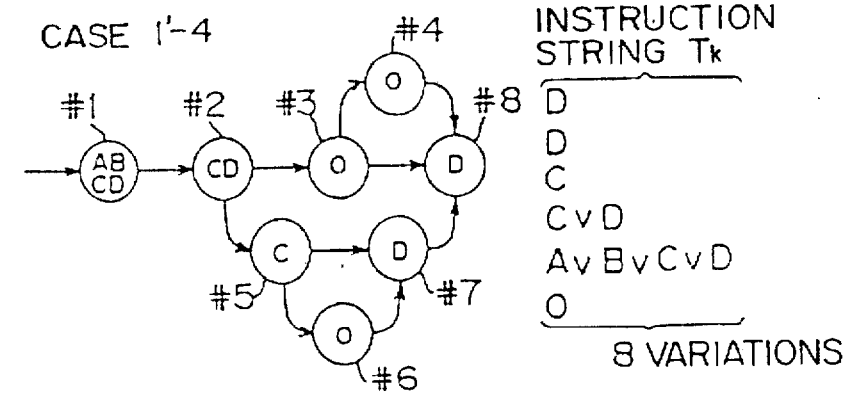

On the other hand, the set H in the test state is a set of states which can generate a pipeline hazard. For example, if it is assumed for comprehensibility that the operation model M of the pipeline structure shown in FIG. 18 is the initial operation model $M_0$ shown in FIG. 20 which has not been processed in the above described state number minimizing process, then the test states of the six cases shown in FIG. 23 can be set as examples of the set H of test states for the initial operation model $M_0$. In FIG. 23, the test state shown in case 1 is a state in which the state of the state variable #6 is D and the state of the state variable #5 is C. At the next time (next instruction cycle) after the present time (present instruction cycle) at which the above state is generated, a conflict or a hazard occurs at the stage variable #7. That is, at an instruction cycle after the instruction cycle in which an $F_2$ unit 1606 executes instruction D and an $F_1$ unit 1605 executes instruction C, instructions C and D are simultaneously entered in an $F_3$ unit 1607 as shown in FIG. 18. In this case, the $F_3$ unit 1607 is required to solve the conflict between instructions C and D according to the designed specification. The test states shown in cases 2 through 6 can also be solved as in case 1. Generally, the test states can be set for the state variables entered in the "list of state variables connected to the preceding state" (FIG. 16).

For example, a test state shown in FIG. 23 can be intentionally generated by the test instruction string 707 (FIG. 7) automatically generated by a portion comprising the input information holding unit 704, test instruction string listing unit 705, and next time state calculating unit 706. As a result, it is tested whether or not the processor can correctly function on such a test state.

Even if the operation model M does not refer to the initial operation model $M_0$ shown in FIG. 20, but to the operation model $M_2$ processed in the state number minimizing process as shown in FIG. 22, the set H of the test state as shown in FIG. 23 can be set.

The input information holding unit 704 shown in FIG. 7 stores each test state shown in FIG. 23 as data in which a test state corresponds to each state variable forming part of the operation model M. For example, if the operation model M corresponds to the pipeline structure shown in FIG. 18, then the test state in case 1 shown in FIG. 23 is stored in the input information holding unit 704 as the data structure shown in FIG. 29. That is, in FIG. 29, the state variables #1 through #8 are defined corresponding to the respective units in the pipeline. Thus, the state variable #6 is set to state D and the state variable #5 is set to state C. The state variables not assigned states can take optional states. The test states of cases 2 through 6 shown in FIG. 23 are stored in the input information holding unit 704 as the data structure similar to that in case 1 shown in FIG. 29. A set of these test states is the set H of test states.

As described above, after the input information holding unit 704 has stored the operation model M and the set H of the test states, an initial state is defined as a set $S_O$ in step 1202, and the initial state set sO is input to the test instruction string listing unit 705 shown in FIG. 7. The initial state is a state in which the states of all state variables forming the operation model M indicate no instructions to be processed.

Figure 30:
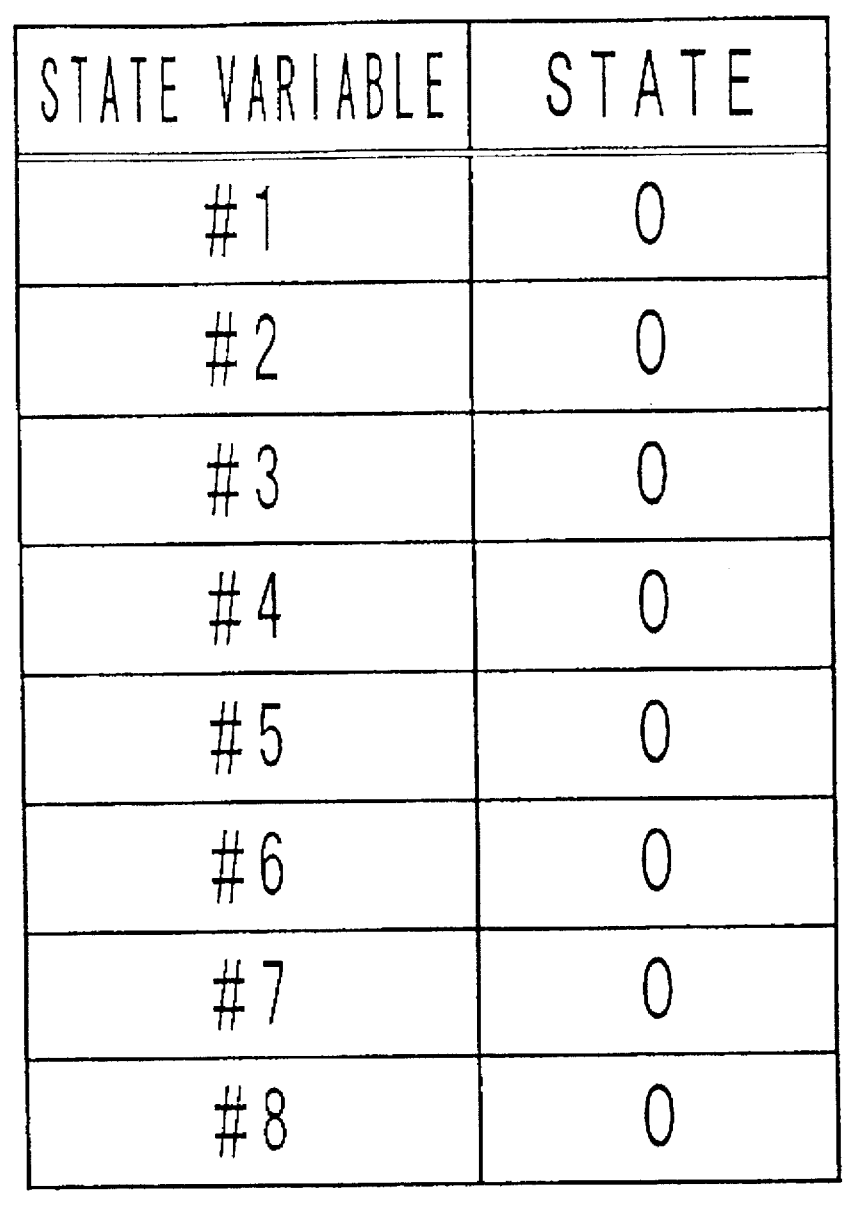

For example, if the operation model M corresponds to the pipeline structure shown in FIG. 18, then the test instruction string listing unit 705 stores the above described initial state as the data structure shown in FIG. 30. In FIG. 30, the character O set for each state variable indicates that there are no instructions to be processed in the corresponding pipeline unit.

The test instruction string listing unit 705 shown in FIG. 7 lists test instruction strings from the initial state contained in the initial state set $S_O$ in step 1203. In this process, extracted from all test instruction strings for the operation model M are the test instruction strings generating a test state (included in the set H in the test state) which can be reached only through a basic transition from the initial state shown in FIG. 30 contained in the initial state set $S_0$. A basic transition refers to a transition which does not contain a transition in which a change of a state of each state variable forming part of the operation model M becomes stagnant in any instruction cycle through an interlock due to a pipeline hazard.

Figure 13:
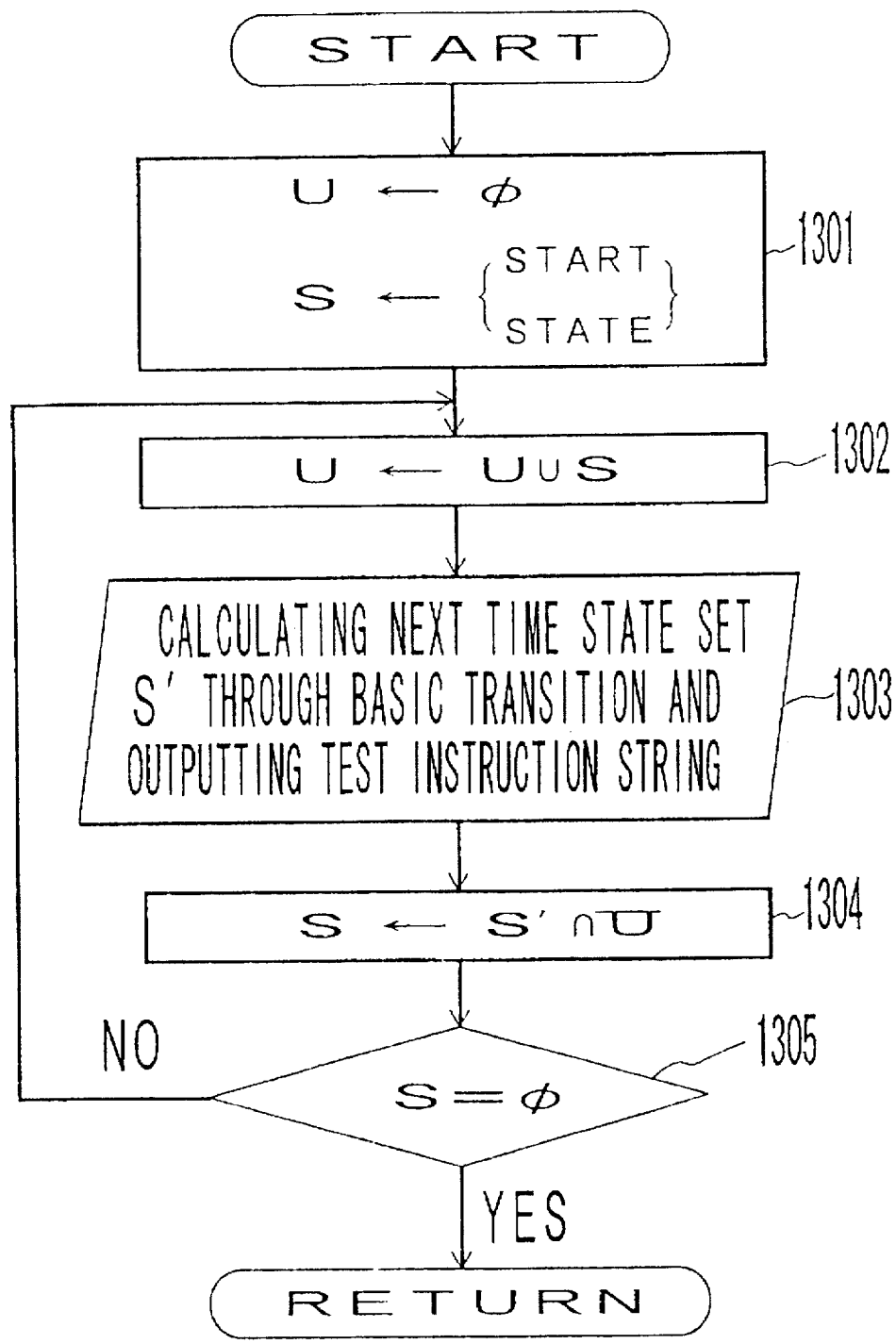
FIG. 13 is a flowchart showing the operation of the test instruction string listing process.

FIG. 13 is a flowchart showing the operation of the process in step 1203 shown in FIG. 12.

In step 1301, the state set U is a free set $\phi$. The initial state defined in step 1202 shown in FIG. 12 and contained in the initial state set $S_O$ shown in FIG. 30 is set in the state set S.

Then, the processes in steps 1302 through 1305 are repeatedly performed. The execution of a series of processes corresponds to the period of an instruction cycle in a pipeline corresponding to the operation model M.

In step 1302 during a series of the above described processes, added are the contents of the set S of the states first reached at a time (1-instruction cycle) preceding the present time in the operation model M to the set U of the states reached by the present time (instruction cycle). The time of each state is based on the time (instruction cycle) corresponding to the initial state. The process is represented as calculating a logical sum of the state sets U and S, and then processing the operation result as a new state set U. The initial value of the state set S is the initial state set $S_0$ set in step 1301. The resultant state set U is used in step 1304 described later.

In step 1303, each state at the next time (next instruction cycle) reached through a basic transition is calculated from each state contained in the set S of the state first reached at a time (instruction cycle) before the present time in the operation model M. Then, the set of non-test states among respective states is obtained as the next time state set S'.

In step 1303, if the next time state reached through the basic transition refers to a test state, then the instruction string reaching the state is output as the test instruction string 707 from the test instruction string listing unit 705 shown in FIG. 7. Thus extracted is a test instruction string generating a test state reached only through the basic transition from the initial state shown in FIG. 30 contained in the initial state set $S_O$. At this time, since the test state generates a pipeline hazard, the state corresponding to the test state cannot invoke a basic transition at the next time. Therefore, the state is not added to the next state set S'.

In step 1304, the state not contained in the set U of the state reached by the present time (instruction cycle) among the states contained in the next time state set S' is the set S of the state first reached at the next time. The process is represented as calculating an exclusive logic product of the state set S' by state set U, and then processing the operation result as a new state set S.

In step 1305, it is determined whether or not the set S of the state first reached at the next time is a free set $\phi$.

If the determination in step 1305 indicates NO, then a series of the processes in steps 1302 through 1305 are repeatedly performed to retrieve from the set S of the state first reached at the next time the test state which can be reached through the basic transition at the next time.

By repeating the series of the processes in steps 1302 through 1305 shown in FIG. 13, extracted from all test instruction strings to be processed in the operation model M are all test instruction strings generating all test states reached only through the basic transition from the initial state contained in the initial state set $S_0$ as shown in FIG. 30.

FIG. 14 is a flowchart showing the operation of the process in step 1303 shown in FIG. 13.

In step 1401, the next time state set S' is a free set $\phi$.

In step 1402, fetched from the set S of the state first reached at a time (an instruction cycle) before the present time are a state s which is an element of the set and an instruction string $T_s$ reaching the state s. If the state set S refers to an initial state, then the state s is stored in the memory not shown in FIG. 14 in the test instruction string listing unit 705 shown in FIG. 7 as data in the initial state shown in, for example, FIG. 30. No instruction string $T_s$ reaches the state s because the initial state shown in FIG. 30 indicates no instructions for processing the states of all state variables forming the operation model M.

In step 1403, a set of input states set in the "input set" (FIG. 16) of all state variables forming the operation model M stored in the input information holding unit 704 shown in FIG. 7 is defined as an input state set X. The input state set X contains the state in which there are no input instructions. For example, if it is assumed that the operation model M for the pipeline structure shown in FIG. 18 refers to the initial operation model $M_0$ shown in FIG. 20 which has not been processed in the state number minimizing process for comprehensibility, then the input state set X is a set of all executable instructions stored in the "input set" of state variables corresponding to the instruction fetch unit. That is, X={A, B, C, D, O}, where the character O indicates the state in which there are no input instructions. Even if the operation model M does not refer to the initial operation model $M_0$ shown in FIG. 20, but to the operation model $M_2$ processed in the state number minimizing process as shown in FIG. 22, the input state set X can be defined as a set of input states in the "input set" of all state variables forming the operation model $M_2$.

In step 1404, fetched from the input state set X defined in step 1403 is an input state which is an element of the set. For, example, if it is assumed that the operation model M for the pipeline structure shown in FIG. 18 refers to the initial operation model $M_0$ shown in FIG. 20 which has not been processed in the state number minimizing process, then instruction A is fetched as an input state x from the input state set X={A, B, C, D }.

In step 1405, the state s' at the next time (next instruction cycle) of each state variable can be calculated using the "transition function" of each state variable forming part of the operation model M stored in the input information holding unit 704 shown in FIG. 7 according to a state s fetched from the state set S in step 1402 and an input state x fetched from the input state set X in step 1404. An instruction string to add the input state x to the instruction string $T_s$ reaching the state s is calculated as the instruction string $T_s'$ reaching the next time state s'. For example, if it is assumed that the operation model M for the pipeline structure shown in FIG. 18 refers to the initial operation model $M_0$ shown in FIG. 20 which has not been processed in the state number minimizing process, and if the state s is the initial state as indicated by the data shown in FIG. 30 and the input state x refers to instruction A, then the next time state s' calculated using the "transition function" of each state variable forming part of the initial operation model $M_0$ and the instruction string $T_s'$ reaching the state can be represented by the data shown in FIG. 31A. In this case, the state of the operation model M, which is the initial operation model $M_0$, is changed from the initial state in which there are no instructions to be processed for all state variables forming the model to the state in which the state variable #1 corresponding to the IF unit 1601 shown in FIG. 19 has executed instruction A. Even if the operation model M does not refer to the initial operation model $M_0$ shown in FIG. 20, but to the operation model $M_2$ processed in the state number minimizing process as shown in FIG. 22, the next time state s' and the instruction string $T_s'$ reaching the state can be calculated using the "transition function" of each state variable forming part of the operation model $M_2$.

In step 1406, it is determined whether or not the next time state s' calculated in step 1405 is contained in the set H of the test states stored in the input information holding unit 704. For example, if it is assumed that the operation model M for the pipeline structure shown in FIG. 18 refers to the initial operation model $M_0$ shown in FIG. 20 which has not been processed in the state number minimizing process, and if the next time state s' refer to the state indicated by the data shown in FIG. 31A, then it is checked whether or not the state matches each test state shown in, for example, FIG. 23, and stored in the input information holding unit 704 in the data format shown in FIG. 29. In the case of the test state (shown in FIG. 23) in case 1 shown in FIG. 29, a state variable not assigned any state can take an optional state.

In step 1406, if it is determined that the next time state s' does not match any test state, then the next time state s' and the instruction string $T_s'$ reaching the state are added to the next time state set S' in step 1407. For example, the data shown in FIG. 31A and indicating the next time state s' and the data of the instruction string $T_s'$ reaching the state are added to the list of the next time state set S' in the memory not shown in FIG. 14 in the test instruction string listing unit 705 shown in FIG. 7.

In step 1409, it is determined whether or not there are no input states x to be fetched from the input state set X defined in step 1403.

If the determination in step 1409 indicates NO, then the process in step 1404 is performed again. For example, if it is assumed that the operation model M for the pipeline structure shown in FIG. 18 refers to the initial operation model $M_0$ shown in FIG. 20 which has not been processed in the state number minimizing process, and if the state s is the initial state as indicated by the data shown in FIG. 30 and the input state x refers to instruction B, then the next time state s' calculated using the "transition function" of each state variable forming part of operation model M which is the initial operation model $M_0$ and the instruction string $T_s'$ reaching the state can be represented by the data shown in FIG. 31B.

Figure 29:
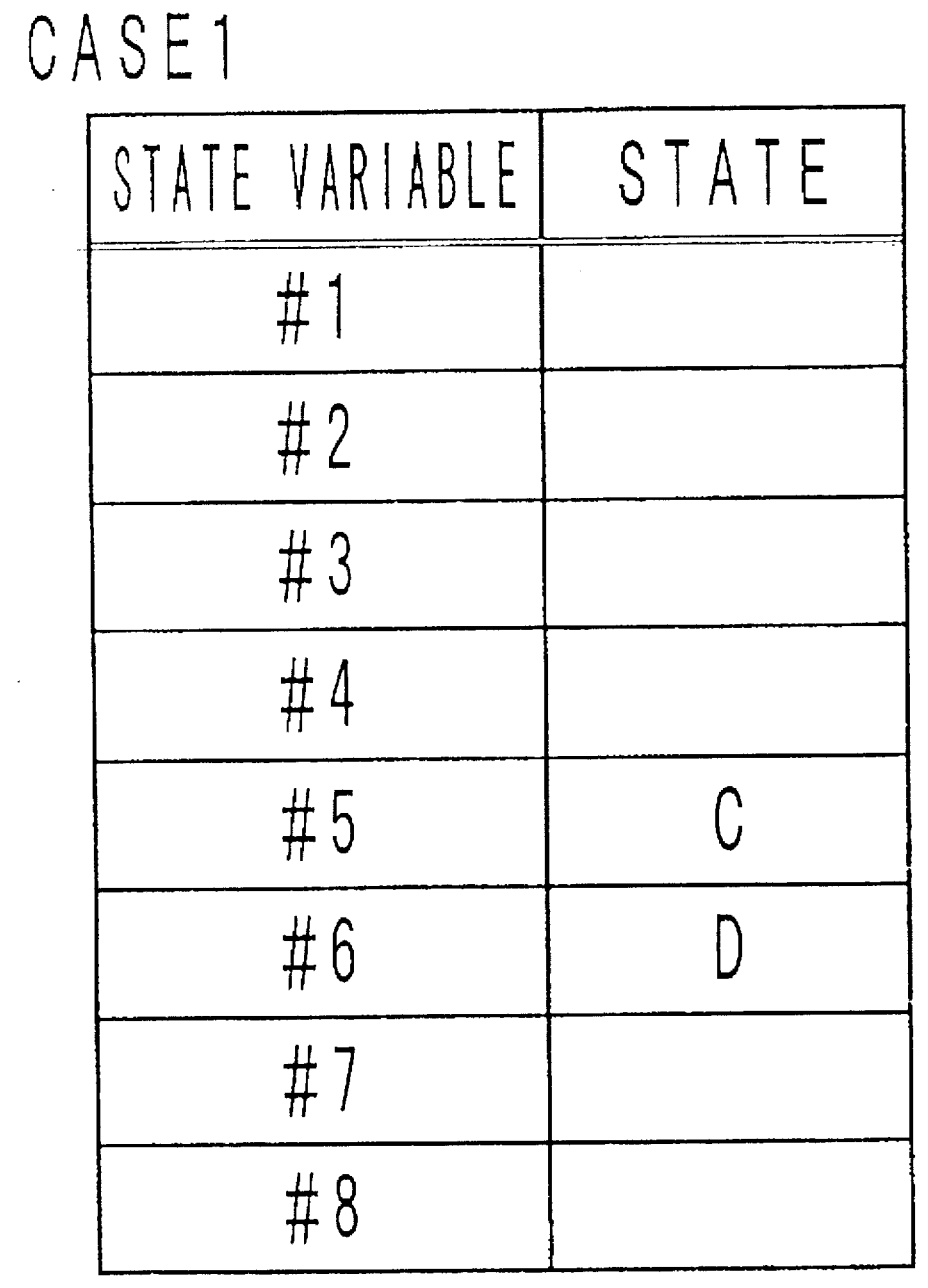

The process in step 1406 is performed, and it is checked whether or not the next time state s' indicated by the data shown in FIG. 31B matches each test state shown in, for example, FIG. 23, and stored in the input information holding unit 704 in the data format shown in FIG. 29.

If, in step 1406, it is determined again that the next time state s' matches none of the test states, then the process in step 1407 is performed again, and, for example, the data shown in FIG. 31B indicating the next time state s' is added to the next time state set S'.

Then, in step 1409, it is determined again whether or not there are no input states x to be fetched from the input state set X defined in step 1403.

As a result of repeatedly processing a series of processes in steps 1404 through 1409, it is determined whether or not there are no states s to be fetched from the set of states first reached at a time (one instruction cycle) before the present time if it is determined in step 1409 that there are no input states x to be fetched from the input state set X defined in step 1403. If the state set S refers to the initial state, then the state s should be the only initial state indicated by the data shown in FIG. 30. Therefore, the determination in step 1410 indicates YES. As a result, the process in step 1303 shown in FIG. 13 terminates.

In step 1304 shown in FIG. 13, among the state s' contained in the next time state set S' thus calculated and the instruction string $T_{s'}$ reaching the state, the state not included in the set U of the states reached by the present time (instruction cycle) and the instruction string reaching the states are put in the set S of the states first reached next time. If the input state x indicates a state in which there are no instructions to input the input states x, or if the occurrence of an interlock in the pipeline stops the entire operation of the pipeline, then the state contained in the next time state set S' can be contained in the set U of the states reached by the present time (instruction cycle). Thus required is the process in step 1304.

Then followed is the flowchart of the operation shown in FIG. 14 corresponding to the process in step 1303 shown in FIG. 13 at the next time (next instruction cycle).

Then in step 1402, fetched from the set S of the states first reached a time (one instruction cycle) before the present time is the data shown in, for example, FIG. 31A as its element state s and the instruction string $T_s$, reaching the state s. In step 1404, for example, instruction A is fetched from the input state set X defined in step 1403 as the input state x which is an element of the set. In this example, if the process in step 1405 is performed, then the next time state s' calculated using the "transition function" of each state variable forming part of the operation model M which is the initial operation model $M_0$ and the instruction string $T_{s'}$ reaching the state can be represented by the data shown in FIG. 32A. In this example, if the state of the operation model M which is the initial operation model $M_0$ changes from the state in which the state variable #1 corresponding to the IF unit 1601 shown in FIG. 16 executes instruction A as indicated by the data shown in FIG. 31A to the state in which the state variable #2 corresponding to the ID unit 1602 shown in FIG. 19 executes instruction A output by the IF unit 1601 as indicated by the data shown in FIG. 32A and the state variable #1 corresponding to the IF unit 1601 executes new instruction A.

When the process in step 1406 is performed in this example, it is checked whether or not the next time state s' indicated by the data shown in, for example, FIG. 32A matches each test state shown in, for example, FIG. 23 and stored in the input information holding unit 704 in the data format shown in FIG. 29. Then, if it is determined that the next time state s' matches none of the test states in step 1406, executing the process in step 1407 adds data shown in, for example, FIG. 32A indicating the next time state s' and the instruction string $T_{s'}$ reaching the state to the next time state set S'.

Then, if the determination in step 1409 indicates NO, then the process in step 1404 is performed again. If the process in step 1404 is performed again in the above described example, then instruction B other than the already fetched instruction A is fetched as the input state x from the input state set X. If the process in step 1405 is performed in this example, the next time state s' calculated by the "transition function" of each state variable forming part of the operation model M which is the initial operation model $M_0$ and the instruction string $T_{s'}$ reaching the state are indicated by the data shown in FIG. 32B.

The process in step 1406 is performed, and it is checked whether or not the next time state s' indicated by the data shown in FIG. 32B matches each test state shown in, for example, FIG. 23, and stored in the input information holding unit 704 in the data format shown in FIG. 29. If, in step 1406, it is determined again that the next time state s' matches none of the test states, then the process in step 1407 is performed again, and, for example, the data shown in FIG. 32B indicating the next time state s' and the instruction string $T_{s'}$ reaching the state is added to the next time state set S'.

As a result of repeatedly processing a series of processes in steps 1404 through 1409, it is determined whether or not there are no states s to be fetched from the set of states first reached at a time (one instruction cycle) before the present time if it is determined in step 1409 that there are no input states x to be fetched from the input state set X defined in step 1403. If the process in step 1410 is performed in the above described example, then the state set S contains the states shown in, for example, FIG. 31B in addition to the already processed states shown in FIG. 31A. Accordingly, the determination in step 1410 indicates NO.

If the determination in step 1410 indicates NO, then the processes in steps 1402 through 1409 are performed again. As a result, the next time state s' and the instruction string $T_{s'}$ shown in FIGS. 33A and 33B are calculated from the state shown in FIG. 31B fetched as a state s and all input states x contained in the input state set X. Since states s' are not contained in the test state set H, the states s' and the instruction string $T_{s'}$ reaching the state are added to the next time state set S'.

Thus, calculated is the set U of states reached as the time (instruction cycle) passes. If the next time state s' is calculated as the data shown in, for example, FIG. 34 during the process in step 1405 shown in FIG. 14, then the state matches the test state in case 1 shown in FIGS. 29 and 23. As a result, the determination in step 1406 indicates YES and the process in step 1408 is performed. In step 1408, the instruction string $T_s$={D, C, A, A} reaching the next tile state s' is output as the test instruction string 707 from the test instruction string listing unit 705 shown in FIG. 7 as shown in, for example, FIG. 34. In this case, since the test state generates a pipeline hazard, the next time state s' corresponding to the test state as shown in FIG. 34 cannot invoke a basic transition at the next time. Therefore, the state and the instruction string reaching the state are not added to the next state set S'.

After the process in step 1408, the process in step 1409 is performed to search for another state s' at the next time.

The process in step 1303 shown in FIG. 13 terminates if it is determined that there are no states s to be fetched from the state set S after repeating a series of processes in steps 1402 through 1410.

If the process in step 1203 shown in FIG. 12 performed by repeating a series of processes in steps 1302 through 1305 in FIG. 13 including the processes on the operational flowchart shown in FIG. 14 is performed in the test instruction string listing unit 705 shown in FIG. 7, then extracted from all test instruction strings to be processed in the operation model M are all test instruction strings 707 generating all test states reached only by a basic transition from the initial state shown in, for example, FIG. 30 contained in the initial state set initial state set $S_0$. FIGS. 24A through 24D show examples of the test instruction strings 707 generating the test states in case 1 shown in FIG. 23 reached only by the basic transition from the initial state shown in FIG. 30. The test instruction string={D, C, A, A } shown in case 1-1 in FIG. 24A corresponds to the example shown in FIG. 34.

If the test state set H contains the test states shown in FIG. 23, then the test state in case 2 shown in FIG. 23 can be reached only by the basic transition from the initial state shown in FIG. 30. The test instruction string 707 not shown in these figures but generating the test states can be extracted when the test instruction string listing unit 705 shown in FIG. 7 performs the process in step 1203 shown in FIG. 12.

The test instruction string 707 extracted when the test instruction string listing unit 705 shown in FIG. 7 performs the process in step 1203 shown in FIG. 12 does not generate all test states shown, for example, in FIG. 23 and contained in the test state set H input to the input information holding unit 704, but generates the test state reached only by the basic transition from the initial state. The test instruction string listing unit 705 and the next time state calculating unit 706 shown in FIG. 7 extract the test instruction string 707 generating the test state other than the test state reached by the basic transition from the initial state by performing the processes in steps 1204 through 1211 shown in FIG. 12.

Practically, the next time state calculating unit 706 shown in FIG. 7 calculates the state at the time (next instruction cycle) after the generation time (generate instruction cycle) at which a test state corresponding to each test instruction string 707 extracted when the test instruction string listing unit 705 shown in FIG. 7 performs the process in step 1203 in FIG. 12 according to the design specification determined as the transition function of each state variable forming part of the operation model M. At this time, the state of the state variable associated with the above described test state among the state variables forming the operation model M is changed such that the pipeline hazard caused by the above described test state can be solved according to the design specification determined as a transition function of the state variable.

Then, the test instruction string listing unit 705 shown in FIG. 7 extracts the test instruction string 707 generating the test state reached only by the basic transition from a new state calculated by the next time state calculating unit 706.

Described below in detail are the processes in steps 1204 through 1211 shown in FIG. 12 in which the above operations are realized.

The processes in steps 1204 through 1208, 1210, and 1211 are performed by the next time state calculating unit 706 shown in FIG. 7. The process in step 1209 is performed by the test instruction string listing unit 705 shown in FIG. 7.

First, in step 1204, the test state corresponding to the test instruction string 707 extracted when the test instruction string listing unit 705 shown in FIG. 7 performs the process in step 1203 shown in FIG. 12 is put in the test state set $H_1$. Then, the test state included in the set H of the test states stored in the input information holding unit 704 but not included in the test state set $H_1$ is put in the test state set $H_1$. The characters "$^-H_1$" is represented in step 1204 in FIG. 12 as characters provided with the character "$^-$" above $H_1$. The set $^-H_1$ of the test states is used in step 1210 described later.

Next, in step 1205, the value of variable i indicating the repetition is initialized to 1.

Then, in step 1211, a series of processes in steps 1206 through 1211 are repeatedly performed with the value of variable i incremented by 1.

First, if it is determined in step 1206 that there are no test states in the test state set $H_i$, or of it is determined in step 1207 that there are no test states in the test state set $^-H_{i+1}$, then the extraction of the test instruction string 707 terminates. The initial value of $H_i$ is $H_1$. The initial value of $^-H_i$ is $^-H_1$. These are calculated in step 1204. Afterwards, $H_i$ and $^-H_i$ are calculated in step 1210.

Then, the next time state calculating unit 706 in FIG. 7 calculates the set $K_i$ of the state at the time (next instruction cycle) after the test state set $H_i$ in step 1208.

Figure 15:
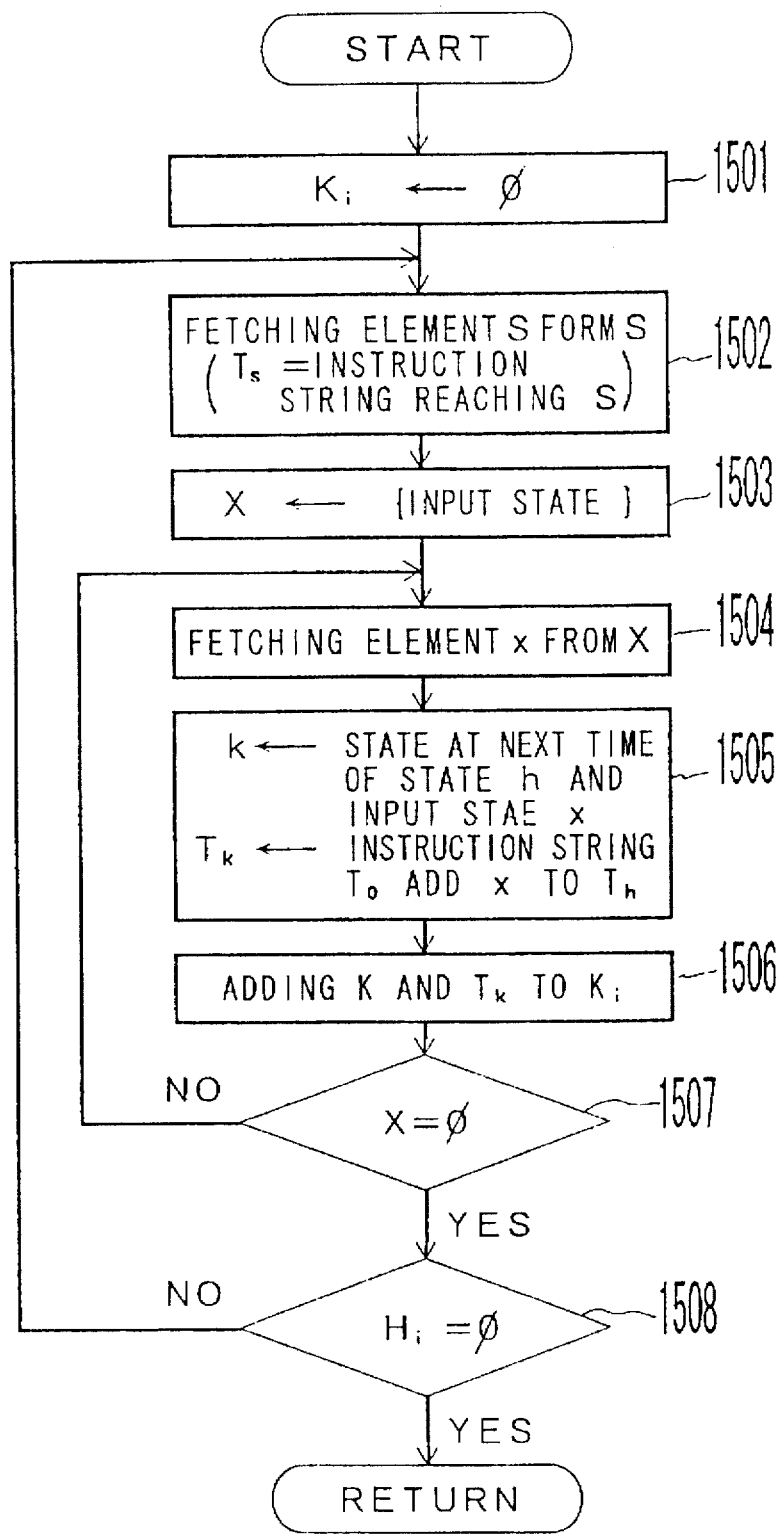
FIG. 15 is a flowchart showing the operation of calculating a next time state set.

FIG. 15 is a flowchart showing the operation of the process in step 1208 shown in FIG. 12.

In step 1501, the next time state set $K_i$ is a free set $\phi$.

In step 1502, fetched from the set $H_i$ of the test states to be processed are a state h which is an element of the set and an instruction string $T_h$ reaching the state h. For example, if it is assumed that the operation model M for the pipeline structure shown in FIG. 18 refers to the initial operation model $M_0$ shown in FIG. 20 which has not been processed in the state number minimizing process, and if the value of the variable i shown in FIG. 12 is 1, then a part of the instruction string $T_h$ reaching the state h contained in the test state set $H_i=H_1$ contains 80 variations of the test instruction string 707 as states h as shown in FIGS. 24A through 24D. These test states correspond to the test state in case 1 shown in FIG. 23. In the above example, a state corresponding to the test state of case 2 shown in FIG. 23 also exists as the state h contained in the test state set $H_i$ and the instruction string $T_h$ reaching the state h although not shown in the attached figures.

In step 1503, as in the case in step 1403 shown in FIG. 14, the set of input states set as the "input set" (FIG. 16) of all state variables forming the operation model M stored in the input information holding unit 704 shown in FIG. 7 is defined as an input state set X.

In step 1504, as in the case in step 1404 shown in FIG. 14, fetched from the input state set X defined in step 1503 is the input state x which is an element of the set.

In step 1505, the state k at the next time (next instruction cycle) of each state variable can be calculated using the "transition function" set as the design specification for each state variable forming part of the operation model M stored in the input information holding unit 704 shown in FIG. 7 according to a state h fetched from the test state set $H_i$ in step 1502 and an input state x fetched from the input state set X in step 1504. An instruction string to add the input state x to the instruction string $T_h$ reaching the state h is calculated as the instruction string $T_k'$ reaching the next time state k. At this time, the state of the state variable associated with the above described test state h among the state variables forming the operation model M is changed such that the pipeline hazard caused by the above described test state h can be solved according to the design specification determined as a transition function of the state variable. For example, if it is assumed that the operation model M for the pipeline structure shown in FIG. 18 refers to the initial operation model $M_0$ shown in FIG. 20 which has not been processed in the state number minimizing process, and if the value of the variable i shown in FIG. 12 is 1 and the state h is contained in any of the examples shown in FIGS. 24A through 24D, then the "transition function" of the state variable #7 corresponding to the $F_3$ unit 1607 shown in FIG. 19 changes the state of the state variable #7 itself so that the pipeline hazard that instruction C is input from the state variable #5 corresponding to the $F_1$ unit 1605 shown in FIG. 19 to the state variable #7 and simultaneously instruction D is input from the state variable #6 corresponding to the $F_2$ unit 1606 shown in FIG. 19 to the state variable #7 can be properly solved. Practically, applied is the "transition function" having the function rule of first executing the instruction (instruction D in the example shown in FIG. 24) which starts the pipeline process first between the two instructions above. Even if the operation model M does not refer to the initial operation model $M_0$ shown in FIG. 20, but to the operation model $M_2$ processed in the state number minimizing process as shown in FIG. 22, the next time state s' and the instruction string $T_k$ reaching the state can be calculated using the "transition function" of each state variable forming part of the operation model $M_2$.

In step 1506, added to the next time state set $K_i$ are the next time state k and the instruction string $T_k$ reaching the state. The data is precessed in the next time state calculating unit 706 shown in FIG. 7 in the format of the data shown in FIG. 31A, and added to the list of the next time state set $K_i$ in the memory (not shown in the attached drawings) in the next time state calculating unit 706.

In step 1507, it is determined whether or not there are no input states x to be fetched from the input state set X defined in step 1503.

If the determination in step 1507 indicates NO, then a series of processes in steps 1504 through 1506 are performed again.

As a result of repeatedly processing a series of processes in steps 1504 through 1507, it is determined in step 1508 whether or not there are no states h to be fetched from the set $H_i$ of the test states to be processed if it is determined in step 1507 that there are no input states x to be fetched from the input state set X defined in step 1503.

If the determination in step 1508 indicates NO, then the processes in steps 1502 through 1507 are performed again. As a result, the next time state k and the instruction string $T_k$ are calculated from each test state shown in FIGS. 24A through 24D and fetched as a state h and all input states x contained in the input state set X. Then, the states k are added to the next time state set Ki.

If there are no states h to be fetched from the test state set $H_i$ to be processed, and the determination in step 1508 indicates YES, then the process in step 1208 shown in FIG. 12 terminates.

Figure 26:
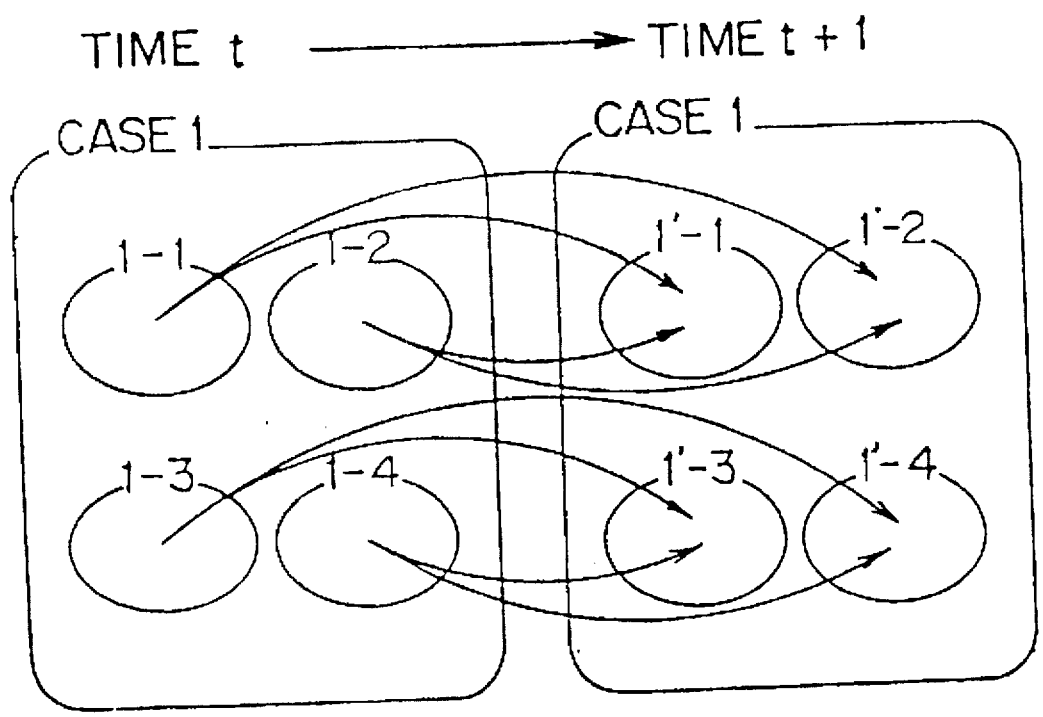
FIG. 26 shows the relation between case 1 and case 1'.
Figure 27A:
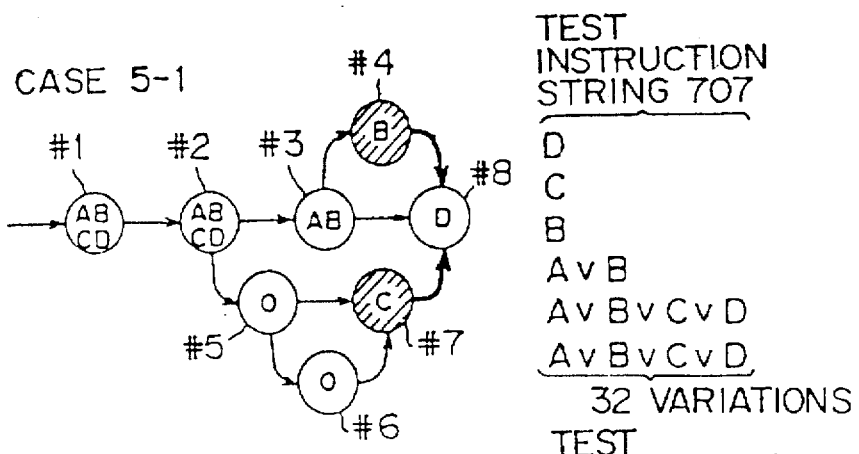
FIGS. 27A and 27B show examples of the test instruction string generating a test state (case 5) reached only by a basic transition from the states of cases 1'-1, 1'-2, 1'-3, and 1'-4.
Figure 27B:
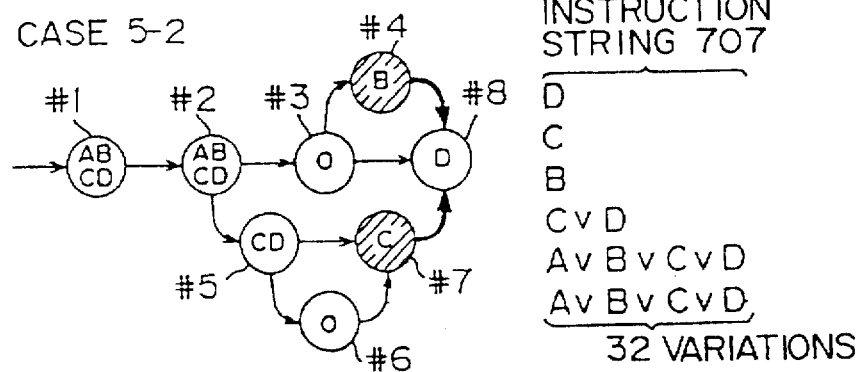

If it is assumed that the operation model M for the pipeline structure shown in FIG. 18 refers to the initial operation model $M_0$ shown in FIG. 20 which has not been processed in the state number minimizing process, and if the value of the variable i shown in FIG. 12 is 1 and a part of an element of the test state set Hi=H1 contains the test states shown in FIGS. 24A through 24D, then calculated is the data shown in FIGS. 25A through 25D as the next time state k after the time when the test states shown in 24A through 24D are generated and the instruction string $T_k$ reaching the state k as a result of the execution of the above described process in step 1208. FIG. 26 shows the transition from each case shown in FIGS. 24A through 24D to each case shown in FIGS. 25A through 25D.

Figure 28:
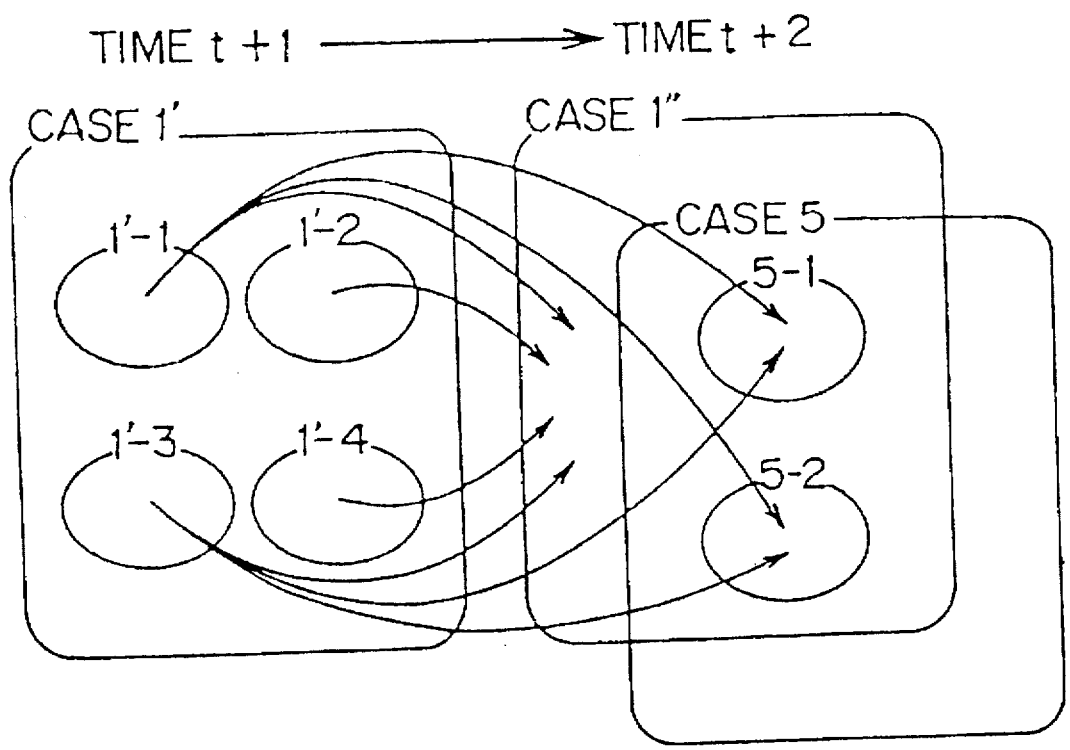
FIG. 28 shows the relation between case 1' and case 5.

Next, in step 1209 shown in FIG. 12, the test instruction string listing unit 705 shown in FIG. 7 lists test instruction strings from each state contained in a new state set $K_i$ calculated by the next time state calculating unit 706 in step 1208 shown in FIG. 12. In this process, extracted from all test instruction strings to be processed in the operation model M is the test instruction string 707 generating the test state reached only by the basic transition from each state contained in the state set $K_i$. FIGS. 13 and 14 are the operational flowcharts showing the process in step 1209 shown in FIG. 12 similar to the process in step 1203 shown in FIG. 12. As a result of the process, for example, the data shown in FIGS. 27A through 27D is calculated as examples of the test instruction string 707 generating the test state of case 5 shown in FIG. 23 and reached only by the basic transition from the states shown in FIGS. 25A through 25D. FIG. 28 shows the transition from each case shown in FIGS. 25A through 25D to each case shown in FIGS. 27A through 27D.

Thus output is a new test instruction string 707 from the test instruction string listing unit 705 shown in FIG. 7.

Then, in the next time state calculating unit 706 shown in FIG. 7, contained in the test state set $H_{i+1}$ is the test state corresponding to the test instruction string 707 extracted when the test instruction string listing unit 705 shown in FIG. 7 performs in step 1210 shown in FIG. 12 the process in step 1209 shown in FIG. 12. The test state contained in the test state set $^-H_i$ never extracted before but not contained in the newly extracted test state set $H_{i+1}$ is put in the test state set $^-H_{i+1}$. The characters "$^-H_{i+1}$" are represented as the characters "$H_{i+1}$" provided with the character "$^-$" above "$H_{i+1}$"

Then, after the value of the variable i is incremented by 1 in step 1211, the processes in steps 1206 through 1211 are repeatedly performed.

If a series of the above described processes are repeatedly performed until the determination in step 1206 or 1207 indicates then the test instruction string listing unit 705 can output the test instruction string 707 corresponding to all test states contained in the test state set H stored in the input information holding unit 704.

<2nd Embodiment>

Described below is the second preferred embodiment of the present invention.

According to the second embodiment of the present invention, a state evaluation function can be specified instead of a test state set at a specific time according to the first embodiment when a test item is specified for an operation model. The configuration is designed by replacing each of the units 704 through 707 in the configuration according to the first embodiment shown in FIG. 7.

Accordingly, in the second embodiment, the configuration and function of the unit for generating the operation model M are the same as those shown by the units 701 through 703 in FIG. 7 according to the first embodiment though not shown in the attached drawings.

First, an input information holding unit 3501 stores input information comprising the operation model M and the state evaluation function for the model.

An attainable state listing unit 3502 lists all states reached from the initial state in the operation model M stored in the input information holding unit 3501. Simultaneously, it calculates the state evaluation function for each state.

A test instruction string listing unit 3503 selects a predetermined state from each of the states reached from the initial state and listed by the attainable state listing unit 3502 based on the value of the state evaluation function calculated for each state, and lists a test instruction string 3504 reaching the state.

The operation according to the second embodiment having the above mentioned configuration is described below in detail by referring to the operational flowchart shown in FIGS. 36 and 37.

FIG. 36 is the flowchart showing the entire operation according to the second embodiment.

Figure 35:
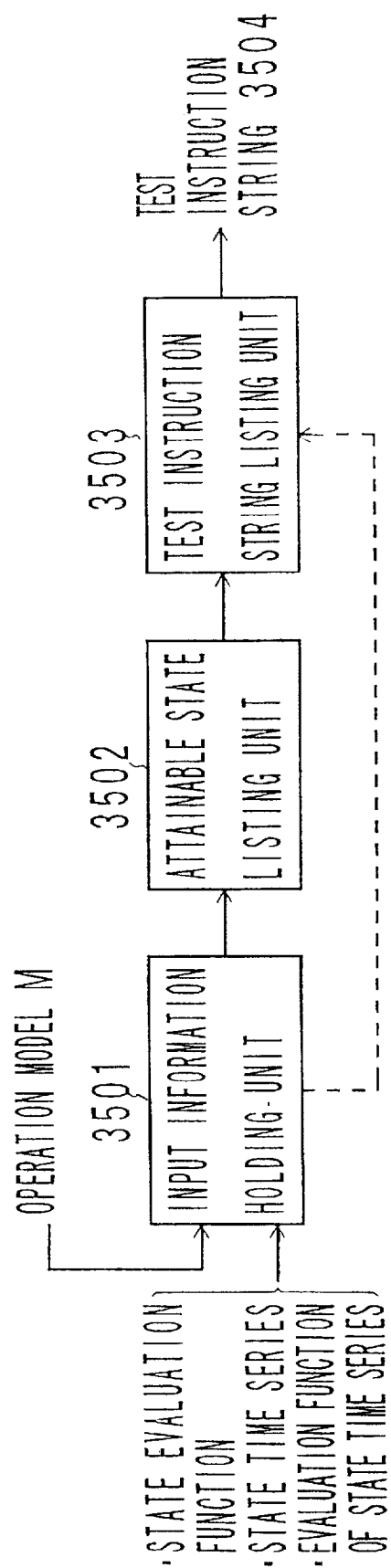
FIG. 35 shows the entire configuration of the second thorough fourth embodiments of the present invention.

First, as shown in the process in step 3601 shown in FIG. 36, the input information holding unit 3501 shown in FIG. 35 stores the operation model M output by the state number minimizing unit 703 shown in FIG. 7 according to the first embodiment and a predetermined state evaluation function.

The operation model M is stored in the input information holding unit 3501 as a set of the structures of the state variables shown in FIG. 16 as in the case of the first embodiment.

On the other hand, the state evaluation function outputs an evaluation value in response to an input state of the operation model M. The function is defined such that the more easily an erroneous design of a pipeline mechanism can be detected in the operation model M (the state in which the pipeline mechanism is easily charged a load), the larger an output value becomes.

Practically, for example, in a pipeline processor, it may be verified that the instructions executed before an instruction which has caused a trap are completed while the instructions to be executed after the trap-causing instruction remain unprocessed. To attain this, the state evaluation function should be defined such that the state in which the largest possible number of instructions are provided for the pipeline and the state which generates a trap is defined as a test item. Such state evaluation functions are defined by the following equation.

$$V(q) = N_{pipe}(q) \cdot \delta_{trap}(q) \tag{1}$$

where q indicates the state of the operation model M; $N_{pipe}(q)$ indicates the number of instructions existing in the pipeline in state q; and $\delta_{trap}(q)$ indicates the delta function which is set to 1 when a trap is generated, and to 0 otherwise.

The state evaluation function as shown in the equation above is stored in the input information holding unit 3501 in a predetermined data format.

As described above, after storing the operation model M and the state evaluation function in the input information holding unit 3501, the attainable state listing unit 3502 shown in FIG. 35 performs the processes in steps 3602 through 3606. Through the processes, all states reached from the initial state in the operation model M can be listed through the processes.

First, in step 3602, the state set U reached from the initial state refers to a free set φ. The state set S is defined as the initial state. The initial state is, as in the case according to the first embodiment, the state in which there are no instructions to be processed in the states of all state variables forming the operation model M. For example, if the operation model M corresponds to the pipeline structure shown in FIG. 18, then the above described initial state is stored as the data structure shown in FIG. 30.

Then, a series of processes in steps 3603 through 3606 are repeatedly performed. The series of processes correspond to a series of processes in steps 1302 through 1305 on the flowchart shown in FIG. 13 according to the first embodiment. One executing operation of the series of processes corresponds to the time required for one instruction cycle in the pipeline for the operation model M.

In the process in step 3603 among a series of processes, as in the process in step 1302 shown in FIG. 13 according to the first embodiment, added are the contents of the set S of the states first reached at a time (1-instruction cycle) preceding the present time in the operation model M to the set U of the states reached by the present time (instruction cycle). The initial value of the state set S is a set of the initial state set in step 3602.

In step 3604, each state at the next time (next instruction cycle) reached through a basic transition is calculated as the next time state set S' from each state contained in the set S of the state first reached at a time (instruction cycle) before the present time in the operation model M.

In step 3605, as in step 1304 shown in FIG. 13 according to the first embodiment, the state not contained in the set U of the state reached by the present time (instruction cycle) among the states contained in the next time state set S' is the set S of the state first reached at the next time.

In step 3606, as in step 1305 shown in FIG. 13 according to the first embodiment, it is determined whether or not the set S of the state first reached at the next time is a free set φ.

If the determination in step 3606 indicates NO, then a series of the processes in steps 3603 through 3606 are repeatedly performed to retrieve from the set S of the state first reached at the next time the test state which can be reached through the basic transition at the next time.

By repeating the series of the processes in steps 3603 through 3606 shown in FIG. 36, listed are all states reached only by the basic transition from the initial state shown in, for example, FIG. 30.

FIG. 37 is a flowchart showing the operation of the process in step 3604 shown in FIG. 36. The flowchart corresponds to that shown in FIG. 14 according to the first embodiment.

In step 3701, the next time state set S' is a free set φ.

In step 3702, fetched from the set S of the state first reached at a time (an instruction cycle) before the present time are a state s which is an element of the set and an instruction string $T_s$ reaching the state s. If, as in the process in step 1402 shown in FIG. 14 according to the first embodiment, the state set S refers to an initial state, then the state s is stored in the memory not shown in FIG. 14 in the attainable state listing unit 3502 shown in FIG. 35 as data in the initial state shown in, for example, FIG. 30. No instruction string $T_s$ reaches the state s.

In step 3703, as in step 1403 shown in FIG. 14 according to the first embodiment, a set of input states set in the "input set" (FIG. 16) of all state variables forming the operation model M stored in the input information holding unit 704 shown in FIG. 7 is defined as an input state set X. The input state set X contains the state in which there are no input instructions.

In step 3705, as in step 1404 shown in FIG. 14 according to the first embodiment, the state s' at the next time (next instruction cycle) of each state variable can be calculated using the "transition function" of each state variable forming part of the operation model M stored in the input information holding unit 704 shown in FIG. 7 according to a state s fetched from the state set S in step 3702 and an input state x fetched from the input state set X in step 3704. An instruction string to add the input state x to the instruction string $T_s$ reaching the state s is calculated as the instruction string $T_s'$ reaching the next time state s'.

In step 3706, the state evaluation function V (s') is calculated after receiving the next time state s' in the operation model M. Practically, if the state evaluation function V (s') is defined by, for example, the above described equation (1), then the value of $\delta_{trap}(q)$ is set to 1 when the state s' refers to a state in which a trap occurs, and to 0 otherwise. Then, if counted is the number of the state variables assigned characters other than O corresponding to any instruction for the state s' having the data format as shown in, for example, FIG. 31 as in the first embodiment of the present invention, then calculated is the number $N_{pipe}(s')$ of the instruction in the pipeline in the state s'. Then, according to the equation (1), the state evaluation function V (s') is calculated.

In step 3707, added to the next time state set S' are the next time state s', the instruction string $T_s$ reaching the state, and the calculation result of the state evaluation function V (s') in the state.

In step 3708, as in step 1409 shown in FIG. 14 according to the first embodiment, it is determined whether or not there is no input state x to be fetched from the input state set X defined in step 3703.

If the determination in step 3708 indicates NO, then the processes in steps 3704 through 3708 are performed to calculate the next time state s' of the state s in response to a new input state x, the instruction string $T_s$ reaching the state, and the state evaluation function V (s') in the state. Then, the results are added to the next time state set S'.

As a result of repeatedly processing a series of processes in steps 3704 through 3708, it is determined, as in step 1410 shown in FIG. 14 according to the first embodiment, whether or not there are no states s to be fetched from the set of states first reached at a time (one instruction cycle) before the present time if it is determined in step 3708 that there are no input states x to be fetched from the input state set X defined in step 3703.

If the determination in step 3709 indicates NO, then the processes in steps 3702 through 3708 are performed. As a result, calculated are the state s' at the next time of the state s, the instruction string $T_s$ reaching the state, and the state evaluation function V (s') in the state using a new state s and all input states contained in the input state set X. The results are added to the next time state set S'.

The determination in step 3709 indicates YES and the process in step 3604 shown in FIG. 36 terminates if it is determined that there are no states s to be fetched from the state set S after repeating a series of processes in steps 3702 through 3709.

If the processes in steps 3602 through 3606 are performed by the attainable state listing unit 3502 shown in FIG. 35, then all states reached from the initial state in the operation model M are listed.

Then, the process in step 3607 shown in FIG. 36 is performed by the test instruction string listing unit 3503 shown in FIG. 35.

In this step, among plural sets of states s, instruction strings $T_s$ reaching the states, and state evaluation functions V (s) in the states, as being entered in the set U of states reached from the initial state through a series of the above described processes, states of a predetermined number are selected sequentially from largest state evaluation function V (s). The instruction strings reaching the states are fetched from the set U and output as the test instruction string 3504 (FIG. 35).

According to the second embodiment, a qualitatively represented test item can be specified in the format of a state evaluation function, and the corresponding test instruction string 3504 can be generated automatically and efficiently.

<3rd Embodiment>

Described below is the third embodiment of the present invention.

According to the third embodiment, a state time series can be specified as input information for use in specifying a test item for an operation model.

The entire configuration according to the third embodiment of the present invention is shown in FIG. 35 as in the second embodiment.

According to the third embodiment, the input information holding unit 3501 stores input information comprising the operation model M and a set of the state time series for the model.

The attainable state listing unit 3502 lists all states reached from the initial state in the operation model M stored in the input information holding unit 3501.

The test instruction string listing unit 3503 selects from each of the states reached from the initial state and listed by the attainable state listing unit 3502 a state matching one in the state time series in the state time series set stored in the input information holding unit 3501 among the state time series comprising each of the states, and lists the test instruction string 3504 reaching the state time series.

The operation according to the third embodiment having the above mentioned configuration is described below in detail by referring to the operational flowchart shown in FIGS. 38 through 40.

Figure 38:
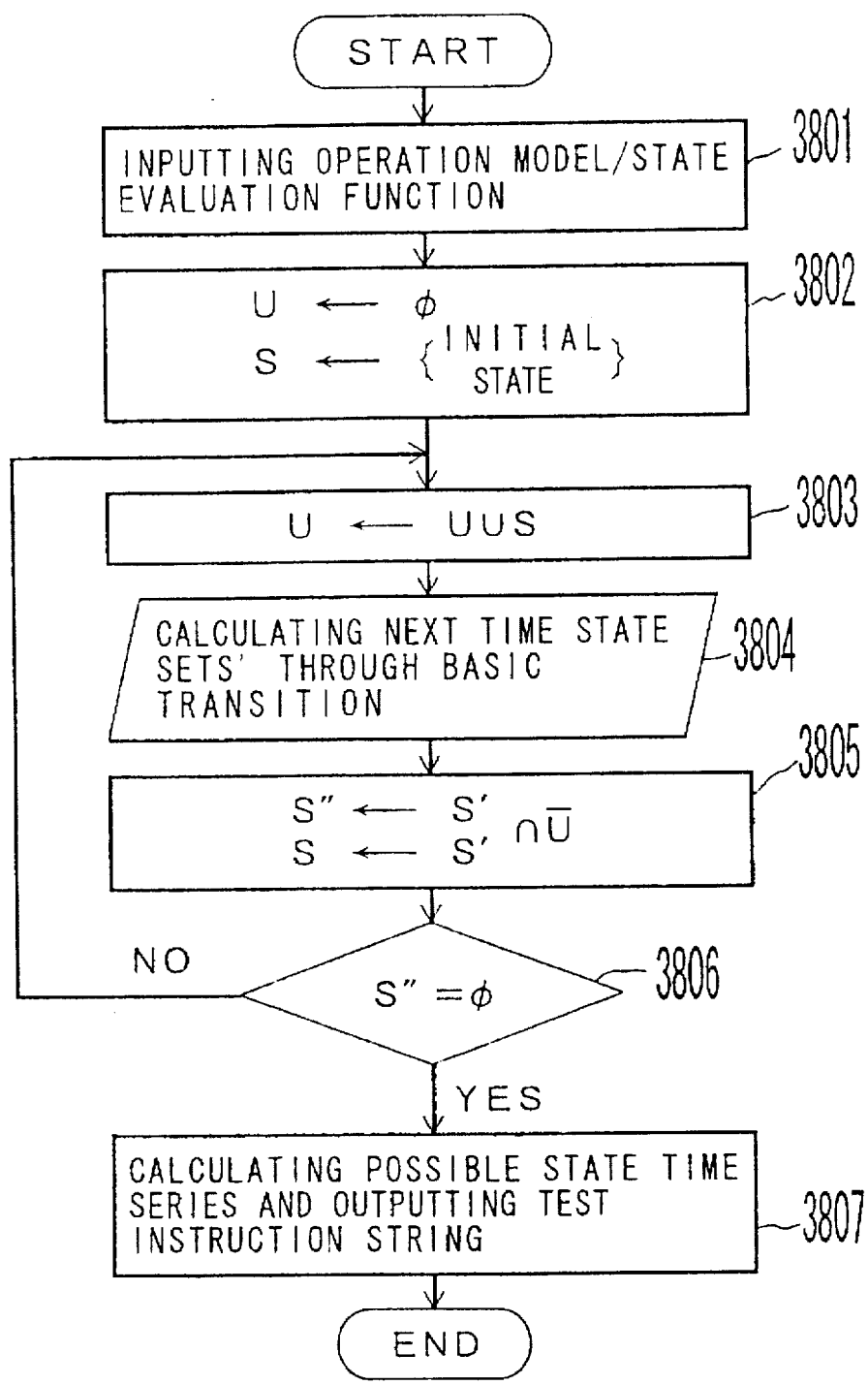
FIG. 38 is a flowchart showing the operation of the third embodiment.

FIG. 38 is the flowchart showing the entire operation according to the third embodiment.

First, as shown in the process in step 3801 shown in FIG. 38, the input information holding unit 3501 shown in FIG. 35 stores the operation model M output by the state number minimizing unit 703 shown in FIG. 7 according to the first embodiment and a predetermined state time series.

The operation model M is stored in the input information holding unit 3501 as a set of the structures of the state variables shown in FIG. 16 as in the first and second embodiments.

On the other hand, the state time series refers to that realized by the operation model M in any period, and defines the state time series of the operation model M in a predetermined period as the operation condition of the pipeline mechanism corresponding to the test item. Generally, a plurality of state time series can be assigned to one test item.

Practically, in a pipeline processor, a buffer can be provided between an instruction execution result write unit (for example, the write-back unit 1808 in the pipeline configuration shown in FIG. 18 according to the first embodiment) and a register file. Using the buffer, an actual writing-back operation can be corrected to be arranged in the order of the steps in the program, thereby realizing a precise trap. To verify such a pipeline mechanism, generated is a state in which the completion order of instructions is rearranged in a few instruction cycles so that a test instruction string which may produce a trap can be generated after storing data in the buffer. According to the third embodiment, the input information holding unit 3501 receives and stores a set of state time series satisfying such requirements.

As described above, after storing the operation model M and a set of state time series in the input information holding unit 3501, the attainable state listing unit 3502 shown in FIG. 35 performs the processes in steps 3802 through 3806. Through these processes, listed are all states reached from the initial state in the operation model M. These processes correspond to a series of processes in steps 3602 through 3606 shown in FIG. 36 according to the second embodiment.

In step 3802, as in step 3602 shown in FIG. 36 according to the second embodiment, the state set U reached from the initial state is a free set ϕ. The initial state is set in the state set S.

Then, a series of the processes in steps 3803 through 3806 are repeatedly performed. The processes correspond to a series of processes in steps 1302 through 1305 shown in FIG. 13 according to the first embodiment or a series of processes in steps 3603 through 3606 shown in FIG. 36 according to the second embodiment.

The process in step 3803 in the above described series of processes, as in step 1302 in FIG. 13 according to the first embodiment, added are the contents of the set S of the states reached one time (one instruction cycle) before the present time (instruction cycle) in the operation model M to the set U of the states reached before the present time. The initial state of the state set S is a set of initial states set in step 3802.

In step 3804, each state at the next time (next instruction cycle) reached through a basic transition is calculated as the next time state set S' from each state contained in the set S of the state first reached at a time (instruction cycle) before the present time in the operation model M.

In step 3805, the state contained in the next time state set S' is a set S of the states reached at the next time. In this process, unlike the process in step 1304 shown in FIG. 13 according to the first embodiment and the process in step 3605 shown in FIG. 36 according to the second embodiment, the states contained in the next time state set S' and also contained in the set U of the states reached by the present time (instruction cycle) are recognized as the set S of the states reached at the next time. This is because a state time series as well as a state at a specified time should be considered and therefore the state transition sequence should be stored in the third embodiment. Accordingly, a plurality of the same states reached can be assigned different labels.

In step 3805, the state not contained in the set U of the state reached by the present time (instruction cycle) among the states contained in the next time state set S' is stored as the state S".

Then, in step 3806, it is determined whether or not the state S" is a free set ϕ. That is, when no new states are generated after all state transitions and the determination in step 3806 indicates the operation of the attainable state listing unit 3502 terminates.

If the determination in step 3806 indicates NO in step 3806, then a series of the processes in steps 3803 through 3806 are repeatedly performed to retrieve from the set S of the state reached at the next time the state which can be reached through the basic transition at the next time.

Listed are all states reached only through the basic transition from the initial state shown in FIG. 30 by repeating a series of processes in steps 3803 through 3806 shown in FIG. 38.

Figure 39:
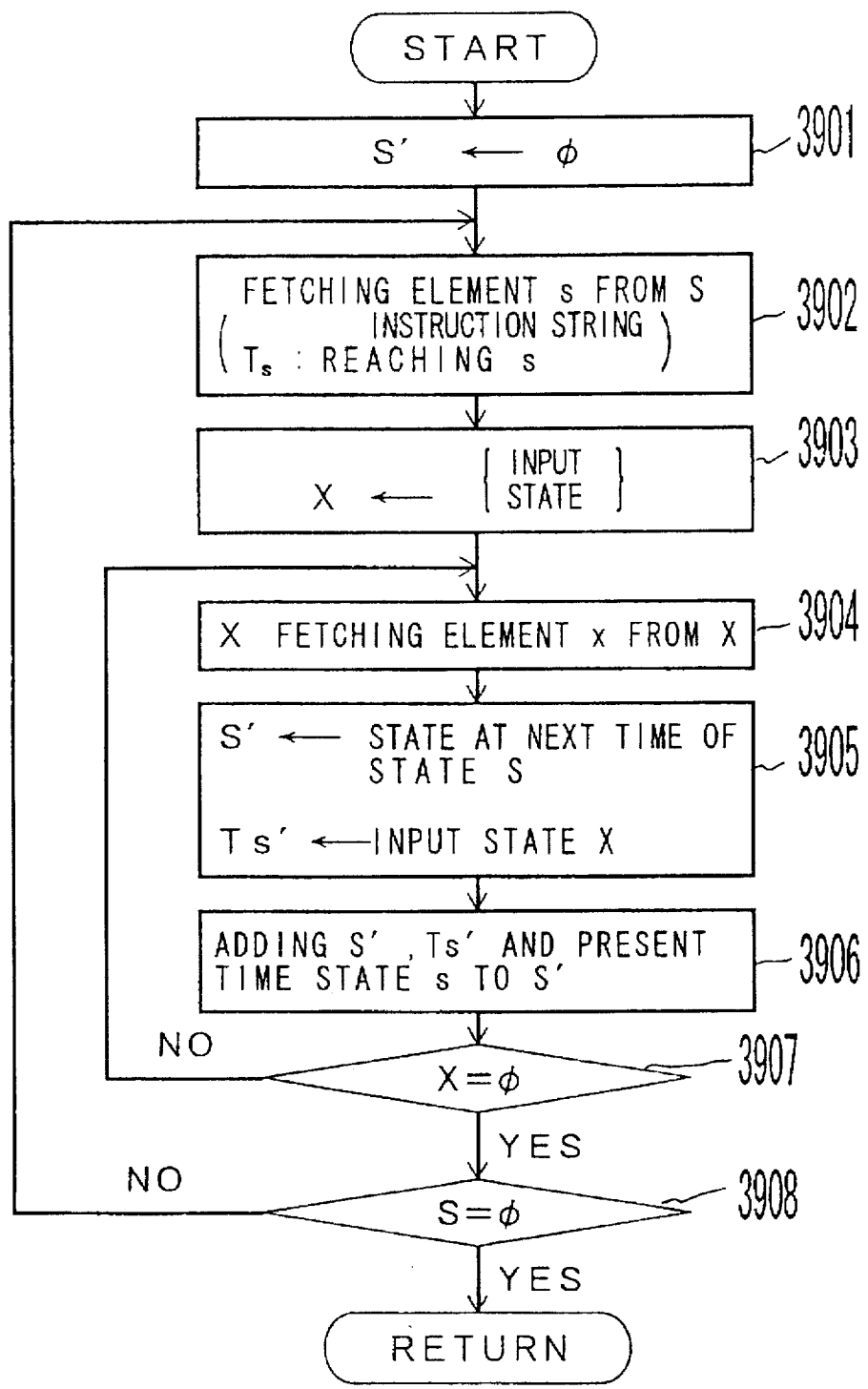
FIG. 39 is a flowchart showing the calculation of the next time state set S' according to the basic transition in the third and fourth embodiments.

FIG. 39 is a flowchart showing the operation of the process in step 3804 shown in FIG. 38. The operational flowchart corresponds to that shown in FIG. 14 according to the first embodiment or that shown in FIG. 37 according to the second embodiment.

In step 3901, the next time state set S' is a free set ϕ.

In step 3902, as in step 1402 shown in FIG. 14 according to the first embodiment, fetched from the set S of the state first reached at a time (an instruction cycle) before the present time are a state s which is an element of the set and an instruction string $T_s$ reaching the state s.

In step 1903, as in step 1403 shown in FIG. 14 according to the first embodiment, a set of input states set in the "input set" (FIG. 16) of all state variables forming the operation model M stored in the input information holding unit 704 shown in FIG. 7 is defined as an input state set X.

In step 3905, as in step 1404 shown in FIG. 14 according to the first embodiment, the state s' at the next time (next instruction cycle) of each state variable can be calculated using the "transition function" of each state variable forming part of the operation model M stored in the input information holding unit 704 shown in FIG. 7 according to a state s fetched from the state set S in step 3902 and an input state x fetched from the input state set X in step 3904. An instruction string to add the input state x to the instruction string $T_s$ reaching the state s is calculated as the instruction string $T_{s'}$ reaching the next time state s'.

In step 3906, added to the next time state set S' are the next time state s', the instruction string $T_{s'}$ reaching the state, and the state s at a time before the state, that is, the present time. The state s at the present time is stored so that the preceding states can be sequentially traced back from each state reached in step 3807 shown in FIG. 38 described later.

In step 3907, as in step 1409 shown in FIG. 14 according to the first embodiment, it is determined whether or not there is no input state x to be fetched from the input state set X defined in step 3903.

If the determination in step 3907 indicates NO, then the processes in steps 3904 through 3907 are performed to calculate the next time state s' of the state s in response to a new input state x, the instruction string $T_{s'}$ reaching the state, and the state at one time before, that is, the state s at present time. Then, the results are added to the next time state set S'.

As a result of repeatedly processing a series of processes in steps 3904 through 3907, it is determined, as in step 1410 shown in FIG. 14 according to the first embodiment, whether or not there are no states s to be fetched from the set of states reached at a time (one instruction cycle) before the present time if it is determined in step 3907 that there are no input states x to be fetched from the input state set X defined in step 3903.

If the determination in step 3908 indicates NO, then the processes in steps 3902 through 3907 are performed. As a result, calculated are the state s' at the next time of the state s, the instruction string $T_{s'}$ reaching the state, and the state at one time before, that is, the state s at present time using a new state s and all input states contained in the input state set X. The results are added to the next time state set S'.

The process in step 3804 shown in FIG. 38 terminates if it is determined that there are no states s to be fetched from the state set S after repeating a series of processes in steps 3902 through 3908.

If the processes in steps 3802 through 3806 are performed by the attainable state listing unit 3502 shown in FIG. 35, then all states reached from the initial state in the operation model M are listed.

Then, the process in step 3807 shown in FIG. 38 is performed by the test instruction string listing unit 3503 shown in FIG. 35.

In this step, selected from state time series in the set U of states reached from the initial state through a series of the above described processes, with the sets comprising states s, instruction strings $T_s$ reaching the state, and the states at one time before, that is, the states s at present time, are state time series matching a state time series in a set of state time series stored in the input information holding unit 3501. Listed then are the test instruction strings 3504 corresponding to the state time series.

Figure 40:
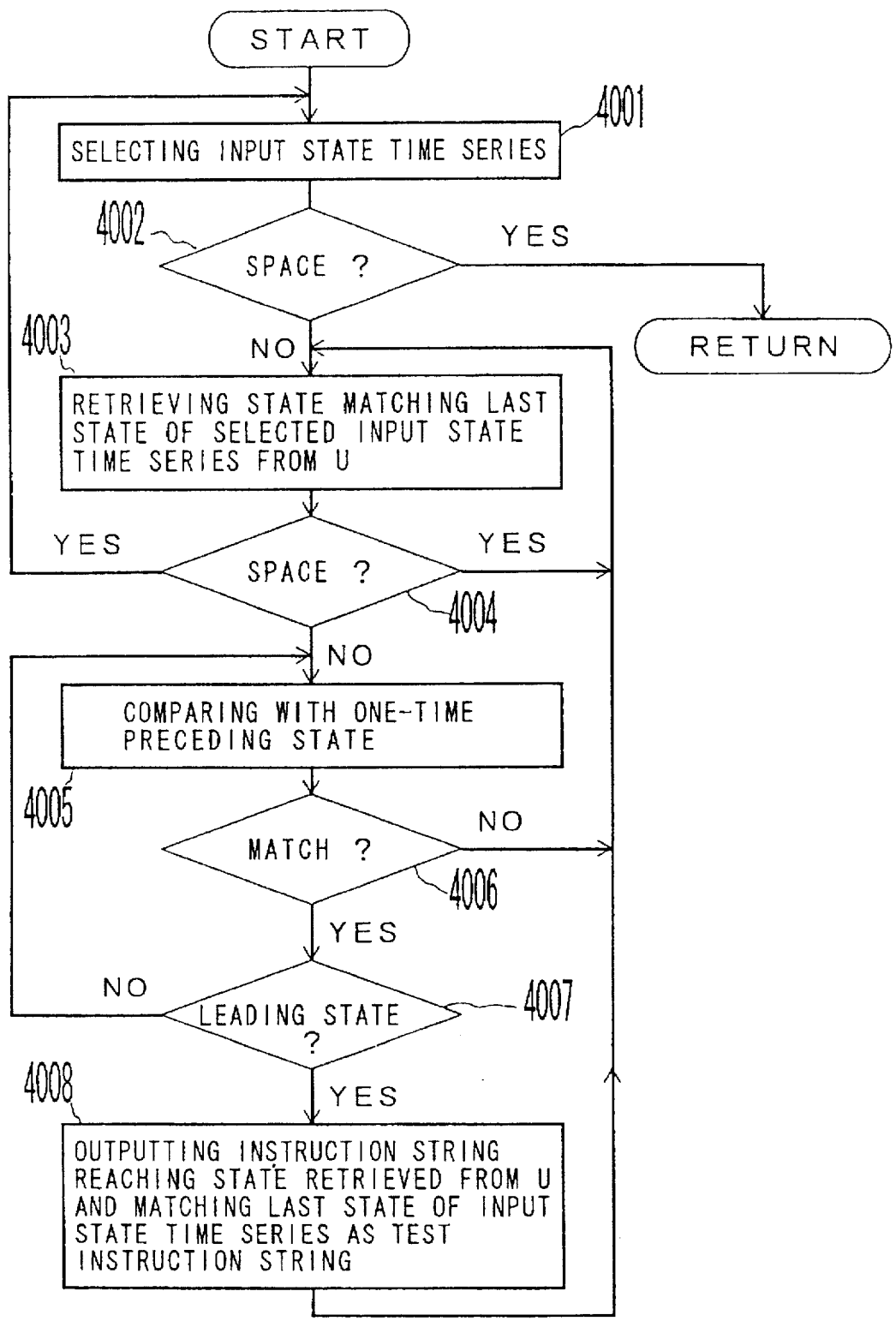
FIG. 40 is a flowchart showing the operation of calculating a state time-series and outputting a test instruction string realized in the third embodiment.

FIG. 40 is a flowchart showing in detail the operation in step 3807.

That is, in step 4001, a state time series is selected from the set of the state time series input to the input information holding unit 3501 shown in FIG. 35.

If the selection is performed successfully and the determination in step 4002 indicates NO, then, in step 4806, the state which is among a plurality of states forming the selected state time series and matches the last state is retrieved from the set U of all states reached from the initial state in the operation model M and listed in the processes terminating in step 3806.

If the retrieval is performed successfully and the determination in step 4004 indicates NO, then a series of processes in steps 4005 through 5007 are repeatedly performed, and it is checked, while tracing back the states sequentially for each time (1 instruction cycle) from the retrieved state, whether or not the state time series indicating the retrieved state as the last state matches the state time series presently selected in step 4001.

That is, first in step 4005, the state at one time before the state stored in the set U with the states retrieved in step 4003 is compared with the state at one time before the last state of the state time series presently selected in step 4001.

In step 4006, it is determined whether or not the comparison in step 4005 outputs a coincidental result.

If the comparison in step 4005 indicates a coincidental result and the determination in step 4006 indicates then it is determined in step 4007 whether or not the state used in the comparison in step 4005 performed immediately before for the state time series presently selected in step 4001 refers to the leading state of the state time series.

If the determination in step 4007 indicates NO, then the processes in steps 4005 through 4007 are performed again, and the state traced back from the state retrieved in step 4003, which is the state at one time before the state stored in the set U with the state, is compared with the state at one time before the state used in the previous comparison for the state time series presently selected in step 4001.

By repeatedly performing a series of processes in steps 4005 through 4006 until the determination in step 4007 indicates YES, it is checked whether or not the state time series obtained by tracing back from the state retrieved in step 4003 matches the state time series presently selected in step 4001.

Thus, if the determination in step 4007 indicates YES, then the state time series obtained by tracing back from the state retrieved in step 4003 matches the state time series presently selected in step 4001.

In this case, in step 4008, the instruction string stored in the set U with the last state retrieved in step 4003 and reaching its last state is output as the test instruction string 3504 in FIG. 35.

Then, back in step 4003, it is checked whether or not the state matching the last state exists among a plurality of states forming the state time series selected in step 4001. This is because, as described above in the explanation of step 3805 shown in FIG. 38, a plurality of the same states reached can be assigned different labels in the state set U.

In repeating a series of the processes, the determination in step 4006 indicates NO if the state traced back from the state retrieved in step 4003 does not match the state traced back from the last state for the state time series presently selected in step 4001. In this case, stopped is the tracing from the state retrieved in step 4003, and it is checked whether or not the state matching the last state in a plurality of states forming the state time series selected in step 4001 exists in the set U back in step 4003.

As a result of the process in step 4003, the determination in step 4004 indicates YES if the state matching the last state in a plurality of states forming the state time series selected in step 4001 does not exist any more or from the very beginning in the set U. At this time, another state time series is selected from the set of state time series input to the input information holding unit 3501 back in step 4001, and the processes in and after step 4002 are performed.

Finally, as a result of the process in step 4001, the determination in step 4002 indicates YES and the process in step 3807 shown in FIG. 38 terminates if the state time series to be selected does not exist any more in the set of the state time series input to the input information holding unit 3501 shown in FIG. 35.

According to the above described third embodiment, the test instruction string 3504 generating a specific state for a predetermined period can be generated automatically and efficiently.

<4th embodiment>

Described below is the fourth embodiment of the present invention.

According to the fourth embodiment, an evaluation function of a state time series can be specified as input information for use in specifying a test item for an operation model.

The entire configuration according to the fourth embodiment of the present invention is shown in FIG. 35 as in the second embodiment.

According to the fourth embodiment, the input information holding unit 3501 stores input information comprising the operation model M and an evaluation function of the state time series for the model.

The attainable state listing unit 3502 lists all states reached from the initial state in the operation model M stored in the input information holding unit 3501.

The test instruction string listing unit 3503 selects from each of the states reached from the initial state and listed by the attainable state listing unit 3502 the last state in the state time series of a predetermined number corresponding to a predetermined number of state time series stored in the input information holding unit 3501 from the largest calculation value of the evaluation functions among the state time series comprising each of the states, and lists the test instruction string 3504 reaching each of the last states.

The operation according to the fourth embodiment having the above mentioned configuration is described below in detail by referring to the operational flowchart shown in FIGS. 41 through 42.

FIG. 41 is the flowchart showing the entire operation according to the fourth embodiment.

First, as shown in the process in step 4101 shown in FIG. 41, the input information holding unit 3501 shown in FIG. 35 stores the operation model M output by the state number minimizing unit 703 shown in FIG. 7 according to the first embodiment and a function of a predetermined state time series.

The operation model M is stored in the input information holding unit 3501 as a set of the structures of the state variables shown in FIG. 16 as in the first through third embodiments.

On the other hand, the evaluation functions of the state time series refer to a function for use in outputting the evaluation functions in response to state time series realized by the operation model M in any period. The function is defined such that the more easily an erroneous design of a pipeline mechanism can be detected in the operation model M (the state time series with which the pipeline mechanism is easily charged a load), the larger an output value becomes.

Practically, some pipeline processors have register renaming mechanisms of dynamically renumbering registers between the program registers and the physical registers. Such processors have the problem of insufficient number of physical registers (renaming space) for the renaming process. If a processor is designed to solve the problem, a test instruction string requiring the largest possible renaming space should be generated to exactly verify the successful protection against the insufficiency. An evaluation function satisfying such requirements is input and stored in the input information holding unit 3501. More practically, the evaluation function in this example limits the sum of the states in the state time series of the renaming spaces used in the respective states in the state time series.

As described above, after storing the operation model M and a set of state time series in the input information holding unit 3501, the attainable state listing unit 3502 shown in FIG. 35 performs the processes in steps 4102 through 4106. Through these processes, listed are all states reached from the initial state in the operation model M. These processes correspond to a series of processes in steps 3802 through 3806 shown in FIG. 38 according to the third embodiment.

In step 4102, as in step 3802 shown in FIG. 38 according to the third embodiment, the state set U reached from the initial state is a free set φ. The initial state is set in the state set S.

Then, a series of the processes in steps 4103 through 4106 are repeatedly performed.

In step 4103, as in step 3803 shown in FIG. 38 according to the third embodiment, added are the contents of the set S of the states reached one time (one instruction cycle) before the present time (instruction cycle) in the operation model M to the set U of the states reached before the present time. The initial state of the state set S is a set of initial states set in step 4102.

In step 4104, as in step 3804 shown in FIG. 38 according to the third embodiment, each state at the next time (next instruction cycle) reached through a basic transition is calculated as the next time state set S' from each state contained in the set S of the state first reached at a time (instruction cycle) before the present time in the operation model M. FIG. 39 is a flowchart showing in detail the operation according to the third embodiment.

In step 4105, as in step 3805 shown in FIG. 38 according to the third embodiment, the state contained in the next time state set S' is a set S of the states reached at the next time. In this process, the states contained in the next time state set S' and also contained in the set U of the states reached by the present time are recognized as the set S of the states reached at the next time. This is because a state time series as well as a state at a specified time should be considered and therefore the state transition sequence should be stored in the fourth embodiment. Accordingly, a plurality of the same states reached can be assigned different labels.

In step 4105, as in step 3805 shown in FIG. 38 according to the third embodiment, the state not contained in the set U of the state reached by the present time among the states contained in the next time state set S' is stored as the state S".

Then, in step 4106, as in step 3806 shown in FIG. 38 according to the third embodiment, it is determined whether or not the state S" is a free set φ. That is, when no new states are generated after all state transitions and the determination in step 4106 indicates the operation of the attainable state listing unit 3502 terminates.

If the determination in step 4106 indicates NO, then a series of the processes in steps 4103 through 4106 are repeatedly performed to retrieve from the set S of the state reached at the next time the state which can be reached through the basic transition at the next time.

Listed are all states reached only through the basic transition from the initial state shown in FIG. 30 by repeating a series of processes in steps 4103 through 4106 shown in FIG. 41.

In step 4107, The evaluation function of the state time series is calculated from the state time series comprising plural sets of state s in the set U of states reached from the initial state through a series of processes, instruction string $T_s$ reaching the state, and the state at one time before, that is, the state s at present time.

Figure 42:
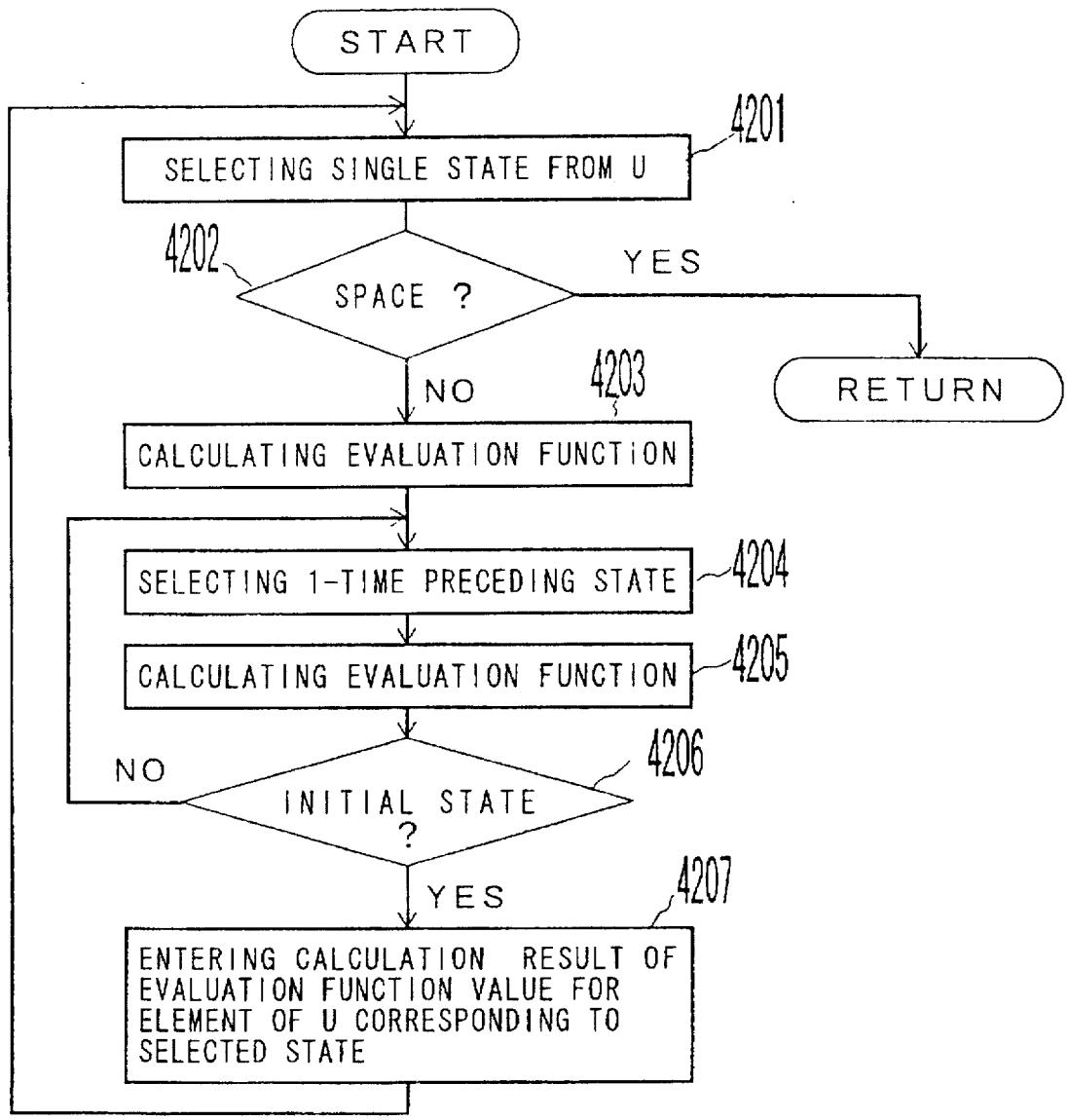
FIG. 42 is a flowchart showing the operation of selecting a state time-series and calculating the evaluation function in the fourth embodiment.

FIG. 42 is a flowchart showing in detail the operation of the process in step 41.

That is, first in step 4201, an attainable state is selected from the set U of all states reached from the initial state in the operation model M and listed through the processes in and before step 4106.

If the selection is successfully performed and the determination in step 4202 indicates NO, then the evaluation function of the state time series being traced back at present is calculated in step 4203 using the state selected in step 4201. Practically, the renaming space in the state is calculated and is accumulated in the calculation result of the evaluation function of the state time series being traced back at present. The above described renaming space calculation can be realized as the summing up of the renaming spaces, over all state variables in the state, set on the operation table in the data format shown in, for example, FIGS. 16 and 17 corresponding to each state variable for one state in the data format shown in, for example, FIG. 31 as in the first embodiment.

Then, a series of the processes in steps 4204 through 4206 are repeated to trace back the state at each time (1 instruction cycle) sequentially from the state selected in step 4201. Thus, the evaluation function for the state time series generated by the trace back is sequentially calculated until the initial state is reached.

First, the state at one time before the state selected in step 4201 and stored in the set U is selected.

Then, in step 4205, as in step 4203, calculated is the evaluation function of the state time series being traced back at present using the state selected step 4204. That is, the renaming space in the state selected in step 4204 is calculated and accumulated in the calculation result of the evaluation function of the state time series being traced back at present.

In step 4206, it is determined whether or not the state selected in step 4204 is the initial state in the operation model M.

If the determination in step 4206 indicates NO, then control is returned to step 4204, and the state time series is traced back.

If the determination in step 4206 indicates YES, then the trace back of the state time series is completed with the state selected in step 4201 recognized as the last state, and the final calculation result of the evaluation function for the state time series is calculated.

Then, in step 4207, entered in the element position corresponding to the state selected in step 4201 is the above described calculation result of the evaluation function for the state time series whose last state is the selected state described above.

Afterwards, control is returned to the process in step 4201, and another attainable state is selected from the set U. Then, the processes in and after step 4202 are repeatedly performed.

If there are no attainable states to be selected in the set U and the determination in step 4202 indicates YES, then the process in step 4107 in FIG. 41 terminates.

Finally, in step 4108 shown in FIG. 41, among plural sets in the set U of states reached from the initial state through a series of the above described processes, as consisting of attainable states (last state in each state time series), instruction strings reaching the attainable state, and the calculation results of the state evaluation functions of the state time series whose last state is the above described attainable states, attainable states of a predetermined number are selected from largest evaluation function. The instruction strings reaching the attainable states are fetched from the set U and output as the test instruction string 3504 (FIG. 35).

According to the above described fourth embodiment, the test instruction string 3504 which is in a test state represented qualitatively for a predetermined period can be generated automatically and efficiently.

<Other Embodying Aspects>

Finally described are other embodying aspects of the present invention.

First, according to the present invention, a test instruction string for use in verifying the pipeline control mechanism can be generated by adding an instruction string to set the initial state of a processor and an instruction string to store an end state.

Furthermore, the present invention can be applied not only to the automatic generation of a test instruction string but also to a general technology of analyzing an operation model corresponding to a pipeline forming part of a processor. Particularly, an optimized pipeline can be reconfigured corresponding to the operation model obtained as a result of performing the process of minimizing the number of states on the operation model.

What is claimed is:

1. An automatic instruction string generation method for verifying an operation model and logic of a processor in which an operation of a pipeline is represented based on specification information about a configuration of the pipeline of the processor and each instruction executed by the processor, said automatic instruction string generation method comprising:

configuring the operation model of the processor by the operation of the pipeline, and by representing states of components of the pipeline and a transition relation among the states using a plurality of state variables;

listing test states in which a conflict occurs among a plurality of state variables contained in the operation model; and generating a test instruction string for a process in which a state of the operation model indicates a transition from an initial state to one of the test states.

2. An automatic instruction string generation device for verifying an operation model and logic of a processor in which an operation of a pipeline is represented based on specification information about a configuration of the pipeline of the processor and each instruction executed by the processor, said automatic instruction string generation device comprising:

specification information holding means for holding specification information about the configuration of the pipeline of the processor and each instruction executed by the processor;

operation model configuring means for configuring the operation model which represents the operation of the pipeline based on the specification information held by said specification information holding means and represents states of components of the pipeline and a transition relation of the states using a plurality of state variables;

test state listing means for listing test states of a plurality of states of the state variables contained in the operation model configured by said operation model configuring means; and test instruction string generating means for generating a test instruction string for a process in which a state of the operation model configured by said operation model configuring means indicates a transition from an initial state to each of the test states listed by said test state listing means.

3. An automatic processor operation model generating method for generating an operation model of a processor in which an operation of a pipeline is represented based on specification information about a configuration of the pipeline of the processor and each instruction executed by the processor, said automatic processor operation model generating method comprising:

configuring the operation model as an initial operation model by representing an operation of the pipeline of the processor, and by representing states of components of the pipeline and a transition relation among the states using a plurality of state variables; and configuring a minimized operation model by minimizing a number of states of each of the state variables through a grouping process performed on the states of each of the state variables contained in the initial operation model based on attitudes of the states.

4. An automatic processor operation model generating device for generating an operation model of a processor in which an operation of a pipeline is represented based on specification information about a configuration of the pipeline of the processor and each instruction executed by the process, said automatic processor operation model generating device comprising:

specification information holding means for holding specification information about the configuration of the pipeline of the processor and each instruction executed by the processor;

operation model configuring means for configuring an initial operation model which represents the operation of the pipeline based on the specification information held by said specification information holding means and represents states of components of the pipeline and a transition relation of the states using a plurality of state variables; and state number minimizing means for configuring a minimized operation model by minimizing based on attitudes of the states of the components of the pipelines, a number of states of each of the state variables through a grouping process performed on the states of each of the state variables contained in the initial operation model configured by said initial operation model configuring means.

5. An automatic logic verification test instruction string generating method for verifying logic used in a processor in which an operation of a pipeline is represented based on specification information about a configuration of the pipeline of the processor and each instruction executed by the processor, said automatic logic verification test instruction string generation method comprising:

inputting input information defining an operation model which represents the operation of the pipeline and represents states of components of the pipeline and a transition relation among the states using a plurality of state variables, and the input information also defining at least one test state in which a conflict occurs among a plurality of state variables contained in the operation model;

listing test instruction strings for processes in which a state of the operation model indicates a transition from a predetermined input state to any test state held in said input information holding means without including conflict causing states of the state variables forming the operation model; and repeating a process of calculating a next time state which is reached after the states of the state variables forming the operation model enter a new test state of a listed test instruction string, and listing the test instruction strings with the next time state set as the predetermined input state.

6. An automatic logic verification test instruction string generating device for verifying logic of a processor in which an operation of a pipeline is represented based on specification information about a configuration of the pipeline of the processor and each instruction executed by the processor, said automatic logic verification test instruction generating device comprising:

input information holding means for holding input information defining an operation model which represents the operation of the pipeline and represents states of components of the pipeline and a transition relation among the states using a plurality of state variables, and the input information also defining at least one test state in which a conflict occurs among a plurality of state variables contained in the operation model;

test instruction string listing means for listing test instruction strings for processes in which a state of the operation model indicates a transition from a predetermined input state to any test state held in said input information holding means without including conflict causing states of the state variables forming the operation model and held in said input information holding means; and next time state calculating means for calculating a next time state reached after the states of the state variables forming the operation model enter a test state of one of the test instruction strings listed by said test instruction string listing means, and listing the test instruction strings with the next time state set as the predetermined input state.

7. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting input information defining an operation model which represents the operation of the pipeline and represents states of components of the pipeline and a transition relation among the states using a plurality of state variables, and the input information also defining a state evaluation function having as input a plurality of state variables contained in the operation model;

listing attainable states, reached from an initial state of the state variables forming the operation model, when a value of the state evaluation function satisfies a predetermined condition; and listing instruction strings reaching one of the attainable states as test instruction strings.

8. An automatic logic verification test instruction generating device for verifying logic used in a processor in which an operation of a pipeline is represented based on specification information about a configuration of the pipeline of the processor and each instruction executed by the processor, said automatic logic verification test instruction generating device comprising:

input information holding means for holding input information defining an operation model which represents the operation of the pipeline and represents states of components of the pipeline and a transition relation among the states using a plurality of state variables, and input information also defining a state evaluation function having as input a plurality of state variables contained in the operation model;

attainable state listing means for listing attainable states, reached from an initial state of the state variables forming the operation model, when a value of the state evaluation function satisfies a predetermined condition; and test instruction string listing means for listing instruction strings reaching one of the attainable states listed by said attainable state listing means as test instruction strings.

9. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting input information defining an operation model which represents the operation of the pipeline and represents states of components of the pipeline and a transition relation among the states using a plurality of state variables, and the input information also defining a state evaluation function having as input a plurality of state variables contained in the operation model;

listing states reached from an initial state of the state variables forming the operation model;

calculating a value of the state evaluation function for a listed state;

listing instruction strings reaching the listed state;

selecting a state in which a calculated value satisfies a predetermined condition from listed states;

selecting an instruction string for a selected state from listed instruction strings; and selecting a selected instruction string as a test instruction string.

10. An automatic logic verification test instruction generating device for verifying logic of a processor in which an operation of a pipeline is represented based on specification information about a configuration of the pipeline of the processor and each instruction executed by the processor, said automatic logic verification test instruction generating device comprising:

input information holding means for holding as input information the operation model which represents the operation of the pipeline and represents states of components of the pipeline and a transition relation among the states using a plurality of state variables, and also holding as input information a state evaluation function having as input a plurality of state variables contained in the operation model;

attainable state listing means for listing states reached from an initial state of a plurality of state variables forming the operation model input as the input information;

state evaluation function calculating means for calculating a value of the state evaluation function for a listed state listed by said attainable state listing means;

test instruction string listing means for listing instruction strings reaching a state listed by said attainable state listing means; and test instruction output means for selecting a state in which a value calculated by said state evaluation function calculating means satisfies a predetermined condition from states listed by said attainable state listing means, selected an instruction string for a selected state from instruction strings listed by said instruction string listing means, and outputting a selected instruction string as a test instruction string.

11. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting as input information the operation model which represents the operation of the pipeline, and represents states of components of the pipeline and a transition relation among the states using a plurality of state variables, and also inputting as input information a state time series of a plurality of state variables contained in the operation model;

listing state time series reached from an initial state of a plurality of state variables forming the operation model input as the input information, said state time series being input as the input information; and listing instruction strings realizing listed state time series as test instruction strings.

12. An automatic logic verification test instruction generating device for verifying logic of a processor in which an operation of a pipeline is represented based on specification information about a configuration of the pipeline of the processor and each instruction executed by the processor, said automatic logic verification test instruction generating device comprising:

input information holding means for holding as input information the operation model which represents the operation of the pipeline, and represents states of components of the pipeline and a transition relation among the states using a plurality of state variables, and also inputting as input information a state time series of a plurality of state variables contained in the operation model;

attainable state time series listing means for listing state time series reached from an initial state of a plurality of state variables forming the operation model input as the input information, said state time series being input as the input information; and test instruction string listing means for listing instruction strings realizing state time series listed by said attainable state time series listing means as test instruction strings.

13. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting as input information the operation model which represents the operation of the pipeline, and represents states of components of the pipeline and a transition relation among the states using a plurality of state variables, and also inputting as input information a state time series of a plurality of state variables contained in the operation model;

listing states reached from an initial state of a plurality of state variables forming the operation model input as the input information;

listing instruction strings reaching a listed state;

retrieving a state time series matching the state time series input as the input information while tracing back the state time series from the listed state;

selecting an instruction string reaching a last state of a retrieved state time series from listed instruction strings; and outputting a selected instruction string as a test instruction string.

14. An automatic logic verification test instruction string generating device for verifying logic of a processor in which an operation of a pipeline is represented based on specification information about a configuration of the pipeline of the processor and each instruction executed by the processor, said automatic logic verification test instruction generating device comprising:

input information holding means for holding as input information the operation model which represents the operation of the pipeline, and represents states of components of the pipeline and a transition relation among the states using a plurality of state variables, and also inputting as input information a state time series of a plurality of state variables contained in the operation model;

attainable state listing means for listing states reached from an initial state of a plurality of state variables forming the operation model input as the input information;

instruction string listing means for listing instruction strings reaching a state listed by said attainable state listing means;

state time series retrieving means for retrieving a state time series matching the state time series input as the input information while tracing back the state time series from the state listed by said attainable state listing means; and test instruction string output means for selecting an instruction string reaching a last state of a state time series retrieved by said state time series retrieving means from listed instruction strings listed by said instruction string listing means, and outputting a selected instruction string as a test instruction string.

15. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting as input information the operation model which represents the operation of the pipeline, and represents states of components of the pipeline and a transition relation among the states using a plurality of state variables, and also inputting as input information an evaluation function of a state time series of a plurality of state variables contained in the operation model;

listing state time series reached from an initial state of a plurality of state variables forming the operation model input as the input information, a value of said evaluation function of the state time series satisfying a predetermined condition; and listing instruction strings realizing listed state time series as test instruction strings.

16. An automatic logic verification test instruction generating device for verifying logic of a processor in which an operation of a pipeline is represented based on specification information about a configuration of the pipeline of the processor and each instruction executed by the processor, said automatic logic verification test instruction generating device comprising:

input information holding means for inputting as input information the operation model which represents the operation of the pipeline, and represents states of components of the pipeline and a transition relation among the states using a plurality of state variables, and also inputting as input information an evaluation function of a state time series of a plurality of state variables contained in the operation model;

attainable state time series listing means for listing state time series reached from an initial state of a plurality of state variables forming the operation model input as the input information, a value of said evaluation function of the state time series satisfying a predetermined condition; and test instruction string listing means for listing instruction strings realizing state time series listed by said attainable state time series listing means as test instruction strings.

17. An automatic logic verification test instruction string generation method for verifying logic of a processor in which an operation of a pipeline is represented based on specification information about a configuration of the pipeline of the processor and each instruction executed by the processor, said automatic logic verification test instruction string generation method comprising:

inputting as input information the operation model which represents the operation of the pipeline, and represents states of components of the pipeline and a transition relation among the states using a plurality of state variables, and also inputting as input information an evaluation function of a state time series of a plurality of state variables contained in the operation model;

listing states reached from an initial state of a plurality of state variables forming the operation model input as the input information;

listing instruction strings reaching a listed state;

calculating the evaluation function for state time series obtained by tracing back the state time series from the listed states;

selecting time series of states in which a calculated value satisfies a predetermined condition from the state time series obtained by tracing back the state time series from the listed states;

selecting an instruction string reaching a last state of a selected state time series from listed instruction strings; and outputting a selected instruction string as a test instruction string.

18. An automatic logic verification test instruction generating device for verifying logic of a processor in which an operation of a pipeline is represented based on specification information about a configuration of the pipeline of the processor and each instruction executed by the processor, said automatic logic verification test instruction generating device comprising:

input information holding means for inputting as input information the operation model which represents the operation of the pipeline, and represents states of components of the pipeline and a transition relation among the states using a plurality of state variables, and also inputting as input information an evaluation function of a state time series of a plurality of state variables contained in the operation model;

attainable state listing means for listing states reached from an initial state of a plurality of state variables forming the operation model input as the input information;

instruction string listing means for listing instruction strings reaching a state listed by said attainable state listing means;

state time series evaluation function calculating means for calculating the evaluation function for state time series obtained by tracing back the state time series from the states listed by said attainable state listing means; and test instruction string output means for selecting time series of states in which a value calculated by said state time series evaluation function calculating means satisfies a predetermined condition from the state time series obtained by tracing back from the state time series obtained by tracing back the state time series from the states listed by said attainable state listing means, selecting an instruction string reaching a last state of a selected state time series from instruction strings listed by said instruction string listing means, and outputting a selected instruction string as a test instruction string.

* * * * *